US011909907B2

(12) United States Patent
Qiao et al.

(10) Patent No.: US 11,909,907 B2
(45) Date of Patent: *Feb. 20, 2024

(54) CHARGING POLICY INFORMATION FOR A HOME SESSION MANAGEMENT FUNCTION

(71) Applicant: Ofinno, LLC, Reston, VA (US)

(72) Inventors: Weihua Qiao, Herndon, VA (US); Esmael Hejazi Dinan, McLean, VA (US); Kyungmin Park, Vienna, VA (US); Peyman Talebi Fard, Sterling, VA (US); Jayshree Bharatia, Plano, TX (US); Jinsook Ryu, Oakton, VA (US)

(73) Assignee: Ofinno, LLC, Reston, VA (US)

( * ) Notice: Subject to any disclaimer, the term of this patent is extended or adjusted under 35 U.S.C. 154(b) by 128 days.

This patent is subject to a terminal disclaimer.

(21) Appl. No.: 17/245,756

(22) Filed: Apr. 30, 2021

(65) Prior Publication Data

US 2021/0250446 A1 Aug. 12, 2021

Related U.S. Application Data

(63) Continuation of application No. 16/671,657, filed on Nov. 1, 2019, now Pat. No. 10,999,447.

(Continued)

(51) Int. Cl.
*H04M 15/00* (2006.01)
*H04W 4/24* (2018.01)
*H04W 28/24* (2009.01)

(52) U.S. Cl.
CPC ....... *H04M 15/8038* (2013.01); *H04M 15/59* (2013.01); *H04W 4/24* (2013.01); *H04W 28/24* (2013.01)

(58) Field of Classification Search
CPC ....... H04W 28/24; H04W 4/24; H04W 60/06; H04W 76/12; H04W 8/08; H04W 80/10;
(Continued)

(56) References Cited

U.S. PATENT DOCUMENTS

| 2016/0353268 A1 | 12/2016 | Senarath et al. | |
| 2019/0297148 A1 * | 9/2019 | Zong | H04W 60/04 |
| 2021/0076318 A1 * | 3/2021 | Zong | H04W 8/12 |

OTHER PUBLICATIONS

3GPP TS 23.203 V15.3.0 (Jun. 2018); 3rd Generation Partnership Project; Technical Specification Group Services and System Aspects; Policy and charging control architecture (Release 15).

(Continued)

*Primary Examiner* — Liton Miah
(74) *Attorney, Agent, or Firm* — Garrison Prinslow; Kavon Nasabzadeh; Philip R. Smith

(57) ABSTRACT

A home session management function (SMF) of a home public land mobile network (PLMN) receives, from a visited SMF of a visited PLMN from a visited SMF of a visited PLMN, a request for creation of a packet data unit (PDU) session of a wireless device. The request comprises first charging policy information determined based on a first policy of the visited PLMN. The home SMF sends, to the visited SMF and based on the request, a second charging policy information comprising: a charging method for the PDU session; and a charging parameter indicating a charging level for the PDU session.

18 Claims, 30 Drawing Sheets

Related U.S. Application Data

(60) Provisional application No. 62/754,964, filed on Nov. 2, 2018.

(58) Field of Classification Search
CPC . H04L 12/14; H04L 12/1403; H04L 12/1407; H04M 15/66; H04M 15/8038; H04M 15/59; H04M 15/61; H04M 15/62; H04M 15/64; H04M 15/65
See application file for complete search history.

(56) References Cited

OTHER PUBLICATIONS

3GPP TS 23.502 V15.2.0 (Jun. 2018); 3rd Generation Partnership Project; Technical Specification Group Services and System Aspects; Procedures for the 5G System; Stage 2 (Release 15).
3GPP TS 23.503 V15.2.0 (Jun. 2018); 3rd Generation Partnership Project; Technical Specification Group Services and System Aspects; Policy and Charging Control Framework for the 5G System; Stage 2 (Release 15).
3GPP TS 29.244 V14.0.0 (Jun. 2017); 3rd Generation Partnership Project; Technical Specification Group Core Network and Terminals; Interface between the Control Plane and the User Plane of EPC Nodes; Stage 3 (Release 14).
3GPP TS 32.240 V15.1.0 (Mar. 2018); 3rd Generation Partnership Project; Technical Specification Group Services and System Aspects; Telecommunication management; Charging management; Charging architecture and principles (Release 15).
3GPP TS 32.255 V15.0.0 (Sep. 2018); 3rd Generation Partnership Project; Technical Specification Group Services and System Aspects; Telecommunication management; Charging management; 5G data connectivity domain charging; stage 2 (Release 15).
3GPP TS 32.290 V15.0.0 (Jun. 2018); 3rd Generation Partnership Project; Technical Specification Group Services and System Aspects; Telecommunication management; Charging management; 5G system; Services, operations and procedures of charging using Service Based Interface (SBI) (Release 15).
3GPP TS 32.291 V0.4.0 (Jun. 2018); 3rd Generation Partnership Project; Technical Specification Group Services and System Aspects; Telecommunication management; Charging management; 5G system, Charging service; stage 3 (Release 15).
3GPP TR 32.899 V15.1.0 (Mar. 2018); 3rd Generation Partnership Project; Technical Specification Group Services and System Aspects; Telecommunication management; Charging management; Study on charging aspects of 5G system architecture phase 1 (Release 15).
3GPP TSG SA WG5 (Telecom Management) Meeting #119 Ad-Hoc S5-184210; Jun. 26-28, 2018, Stockholm (Sweden) revision of S5-184033; Source: Huawei Technologies; Title: pCR TS 32.255 Proposal on Roaming Requirement; Document for: Approval; Agenda Item: 5.2.1.
3GPP TSG SA WG5 (Telecom Management) Meeting #119 Ad-Hoc S5-184211; Jun. 26-28, 2018, Stockholm (Sweden) revision of S5A-184142; Source: Ericsson; Title: pCR to TR 32.255 Roaming handling clarification; Document for: Approval; Agenda Item: 5.2.1.
3GPP TSG SA WG5 (Telecom Management) Meeting #120 S5-185383; Aug. 20-24, 2018, Belgrade (Serbia) revision of S5-185224; Source: Nokia, Nokia Shanghai Bell; Title: pCR TS 32.255 Clarification on Charging Data generation in case of Roaming; Document for: Approval; Agenda Item: 7.4.1.
3GPP TSG SA WG5 (Telecom Management) Meeting #120 S5-185384; Aug. 20-24, 2018, Belgrade (Serbia); Source: Nokia, Nokia Shanghai Bell; Title: pCR TS 32.255 Clarification on Roaming flows description; Document for: Approval; Agenda Item: 7.4.1.
3GPP TSG SA WG5 (Telecom Management) Meeting #120 S5-185385; Aug. 20-24, 2018, Belgrade (Serbia); Source: Nokia, Nokia Shanghai Bell; Title: pCR TS 32.255 Introduce CDR generation for roaming ; Document for: Approval; Agenda Item: 7.4.1.
3GPP TSG SA WG5 (Telecom Management) Meeting #120 S5-185386; Aug. 20-24, 2018, Belgrade (Serbia) revision of S5-185227; Source: Nokia, Nokia Shanghai Bell; Title: pCR TS 32.255 Update charging information for roaming; Document for: Approval; Agenda Item: 7.4.1.
3GPP TSG-SA5 Meeting #120 S5-185393; Belgrade, Serbia, Aug. 20-24, 2018; Revision of S5-185215; Change Request 32.290 CR 0004 rev 1 Current version: 15.0.0; Title: Introduce Use of NRF Framework; Source to WG: Nokia, Nokia Shanghai Bell; Source to TSG: S5; Work item code: 5GS_Ph1-SBI_CH Date: Aug. 22, 2018; Category: B Release: Rel-15.
3GPP TSG SA WG5 (Telecom Management) Meeting #120 S5-185464; Aug. 20-24, 2018, Belgrade (Serbia) revision of S5-185316; Source: Nokia, Nokia Shanghai Bell; Title: pCR TS 32.255 Introduce CHF selection; Document for: Approval; Agenda Item: 7.4.1.

* cited by examiner

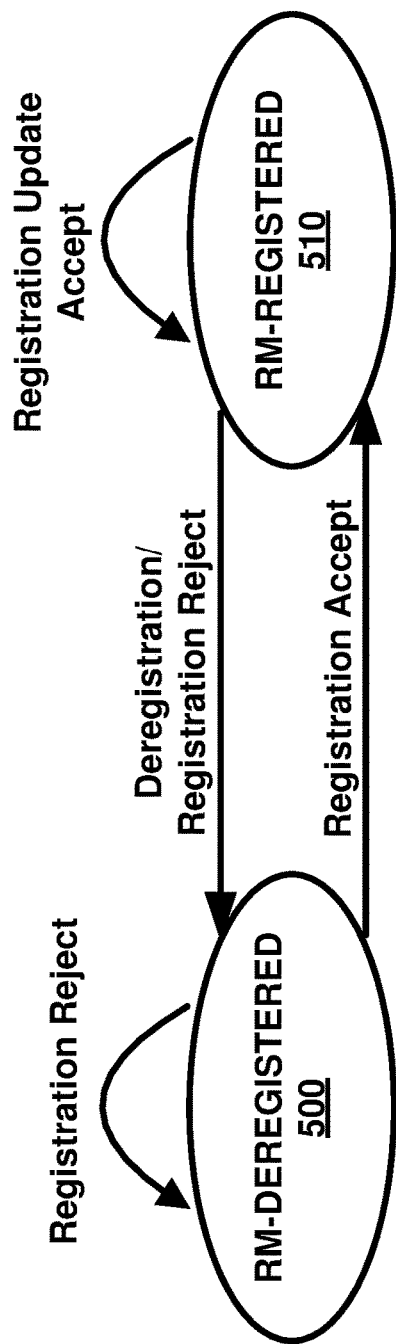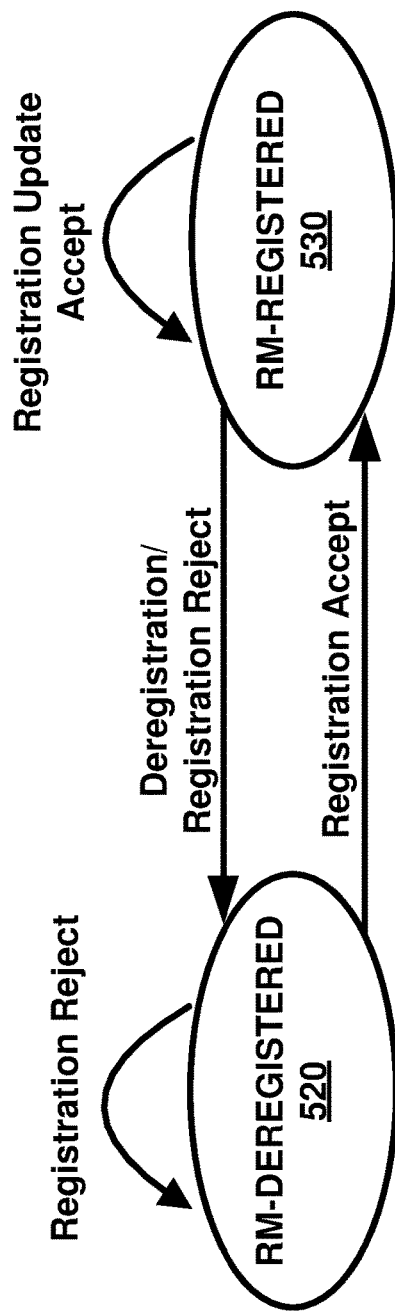
FIG. 5A
FIG. 5B

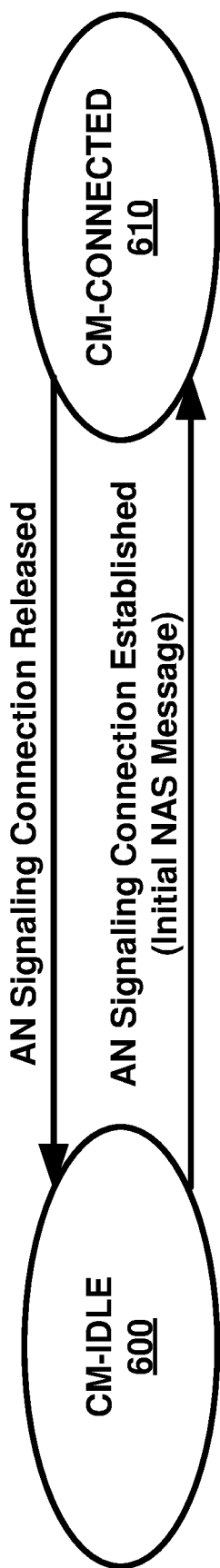
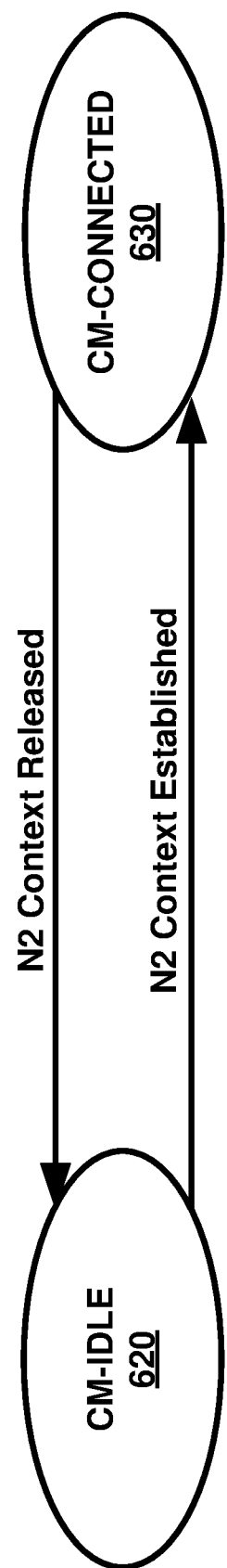

```
<xs:annotation>
<xs:documentation>========================</xs:documentation>
<xs:documentation>Definition of Groups</xs:documentation>
<xs:documentation>========================</xs:documentation>
</xs:annotation>

<xs:element name="ChargingMethod" type="xs:unsignedInt" />
<xs:element name="ChargingLevel" type="xs:unsignedInt" />
<xs:element name="ChargingRate" type="xs:string" />
<xs:element name="AddressOfCHF" type="xs:hexBinary" />
<xs:group name="ChargingPolicyInformation">
  <xs:sequence>
    <xs:element ref="ChargingMethod" />
    <xs:element ref="ChargingLevel" />
    <xs:element ref="ChargingRate" />
    <xs:element ref="AddressOfCHF" />
  </xs:sequence>
</xs:group>
```

FIG. 19

Receive, by a V-CHF from a V-SMF, a 1st message requesting charging policy information for a PDU session of a wireless device, the 1st message comprising PDU session information
2710

Select, by the V-CHF a H-CHF based on the PDU session information
2720

Send, by the V-CHF to the H-CHF, a 2nd message requesting charging policy information for the PDU session, where the 2nd message comprises a 1st charging policy information determined by the V-CHF
2730

Receive, by the V-CHF from the H-CHF, a 3rd message comprising a 2nd charging policy information, where the 2nd charging policy information is determined by the home charging function based on the 1st charging policy information
2740

Determine, by the V-CHF based on the 2nd charging policy information, a 3rd charging policy information, where the 3rd charging policy information comprises: a charging method, a charging level, and/or a charging rate
2750

Send, by the V-CHF to the V-SMF, a 4th message comprising the 3rd charging policy information
2760

FIG. 27

Receive, by a V-PCF from an V-SMF, a 1st message requesting charging policy information for a PDU session of a wireless device, the 1st message comprising PDU session information
2810

Send, by the V-PCF to a V-CHF, a 2nd message comprising the PDU session information
2820

Receive, by the V-PCF from the V-CHF, a 3rd message comprising a 1st charging policy information; wherein the 1st charging policy information is determined by the V-CHF based on the PDU session information
2830

Send, by the V-PCF to a H-PCF, a 4th message comprising the 1st charging policy information
2840

Receive, by the V-PCF from the H-PCF, a 5th message comprising 1st charging control rule(s), where the 1st charging control rule(s) are determined by the H-PCF based on the 1st charging policy information
2850

Determine, by the V-PCF based on the 1st charging control rule(s), 2nd charging control rule(s) for the PDU session, where the 2nd charging control rule(s) comprise: a charging method, a charging level, and/or a charging rate
2860

Send, by the V-PCF to the V-SMF, a 6th message comprising the 2nd charging control rule(s)
2870

FIG. 28

Receive, by a V-SMF from a H-SMF, a 1st message comprising an updated charging control rule for a PDU session, where the updated charging control rule comprises: a charging method; a charging level; and/or a charging rate
2910

Send, by the V-SMF to a V-CHF, a 2nd message updating a charging session for the PDU session, the 2nd message comprising the updated charging control rule
2920

Receive, by the V-SMF from the V-CHF, a 3rd message comprising an authorized credit for the updated charging control rule
2930

Send, by the V-SMF to the H-SMF, a 4th message acknowledging the first message
2940

FIG. 29

```
┌─────────────────────────────────────────────────────────────────┐
│ Receive, by a 1st SMF from a 2nd SMF, a 1st message requesting  │
│ creation of a PDU session of a wireless device, where the 1st   │
│ message comprises a 1st charging policy information             │
│                          3010                                    │
└─────────────────────────────────────────────────────────────────┘
                               ▼
┌─────────────────────────────────────────────────────────────────┐
│ Send, by the 1st SMF to a H-CHF, a 2nd message requesting       │
│ establishment of a charging session for the PDU session, where  │
│ the 2nd message comprises the 1st charging policy information   │
│                          3020                                    │
└─────────────────────────────────────────────────────────────────┘
                               ▼
┌─────────────────────────────────────────────────────────────────┐
│ Receive, by the 1st SMF from the H-CHF, a 3rd message           │
│ comprising a 2nd charging policy information, where the 2nd     │
│ charging policy information is determined by the H-CHF based    │
│ on the 1st charging policy information                          │
│                          2030                                    │
└─────────────────────────────────────────────────────────────────┘
                               ▼
┌─────────────────────────────────────────────────────────────────┐
│ Determine, by the 1st SMF based on the 2nd charging policy      │
│ information, a 3rd charging policy information for the PDU      │
│ session, where the 3rd charging policy information comprises:   │
│ a charging method; a charging level; and a charging rate        │
│                          3040                                    │
└─────────────────────────────────────────────────────────────────┘
                               ▼
┌─────────────────────────────────────────────────────────────────┐
│ Send, by the 1st SMF to the 2nd SMF, a 4th message comprising   │
│ the 3rd charging policy information.                            │
│                          3050                                    │
└─────────────────────────────────────────────────────────────────┘
```

FIG. 30

CHARGING POLICY INFORMATION FOR A HOME SESSION MANAGEMENT FUNCTION

CROSS-REFERENCE TO RELATED APPLICATIONS

This application is a continuation of U.S. patent Ser. No. 16/671,657, filed Nov. 1, 2019, which claims the benefit of U.S. Provisional Application No. 62/754,964, filed Nov. 2, 2018, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A and FIG. 5B depict two registration management state models in UE 100 and AMF 155 as per an aspect of embodiments of the present disclosure.

FIG. 6A and FIG. 6B depict two connection management state models in UE 100 and AMF 155 as per an aspect of embodiments of the present disclosure.

FIG. 19 is a diagram depicting an example definition of information element for charging policy information as per an aspect of an embodiment of the present disclosure.

FIG. 27 is a flow diagram as per an aspect of an example embodiment of the present disclosure.

FIG. 28 is a flow diagram as per an aspect of an example embodiment of the present disclosure.

FIG. 29 is a flow diagram as per an aspect of an example embodiment of the present disclosure.

FIG. 30 is a flow diagram as per an aspect of an example embodiment of the present disclosure.

DETAILED DESCRIPTION OF EXAMPLES

Example embodiments of the present invention enable implementation of enhanced features and functionalities in 5G systems. More particularly, the embodiments of the technology disclosed herein may relate to policy and charging control in roaming scenarios (e.g. for 5G or future communication system). Throughout the present disclosure, UE, wireless device, and mobile device are used interchangeably.

Figure 1:
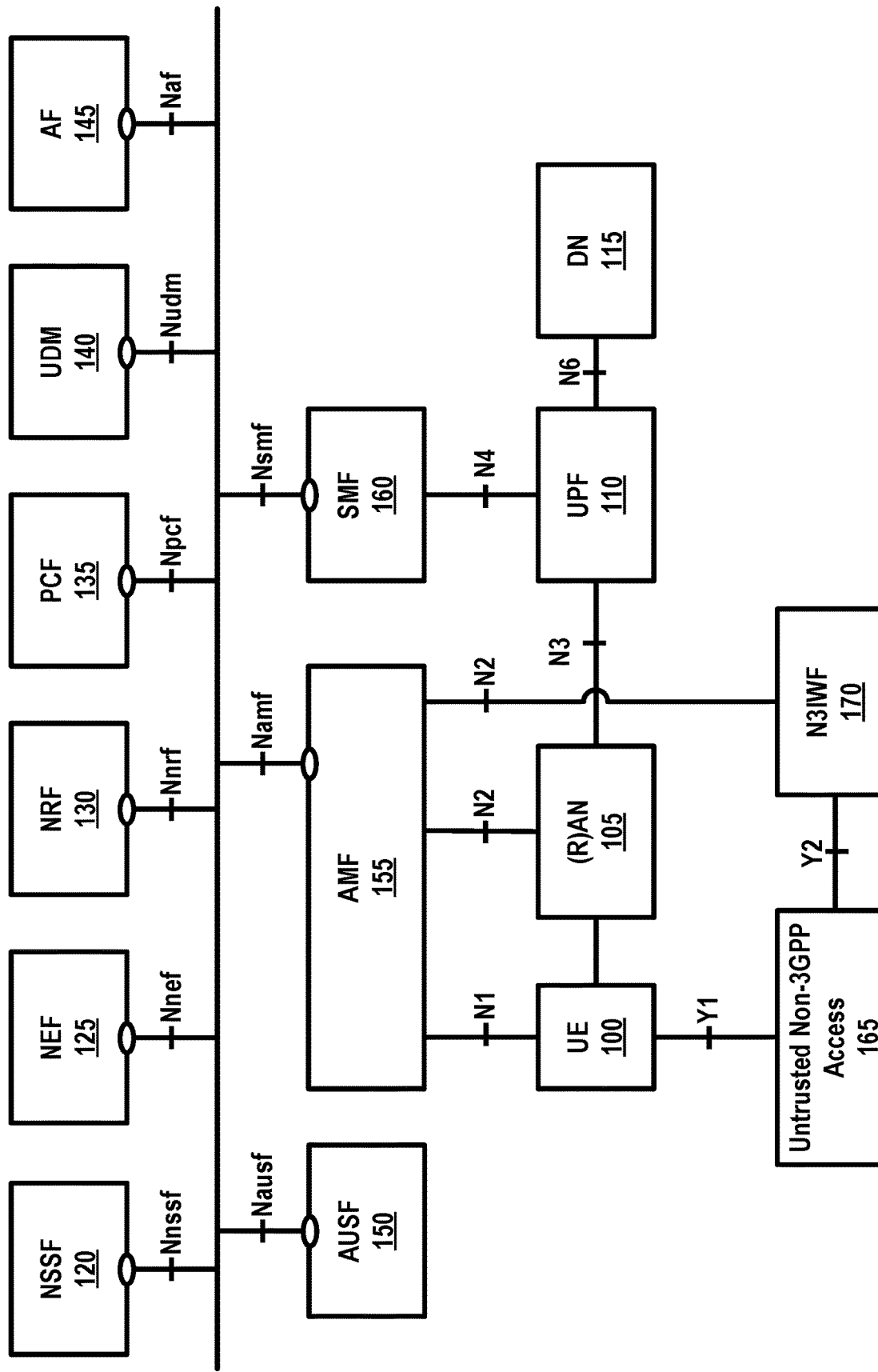
FIG. 1 is a diagram of an example 5G system architecture as per an aspect of an embodiment of the present disclosure.
Figure 2:
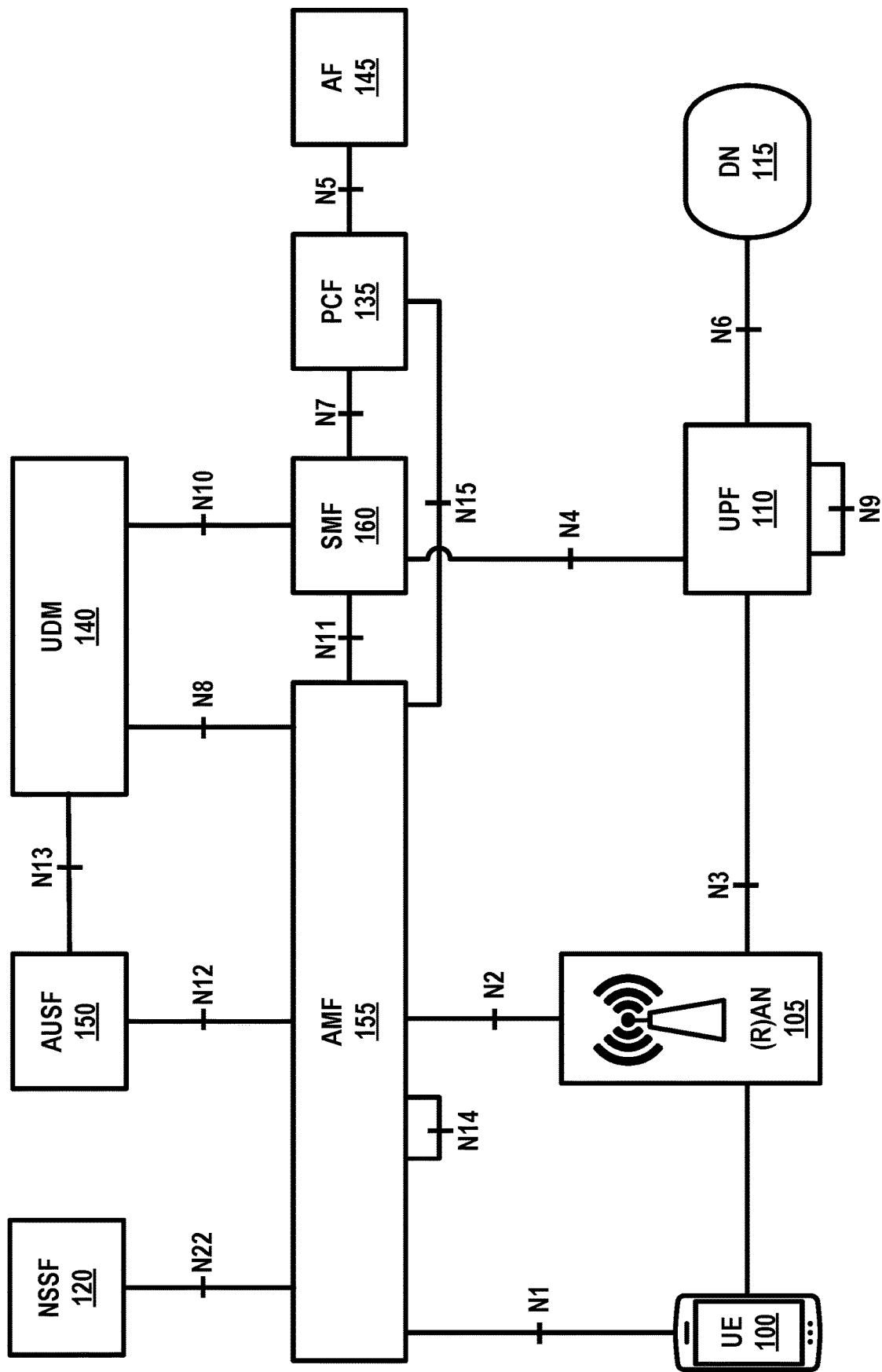
FIG. 2 is a diagram of an example 5G System architecture as per an aspect of an embodiment of the present disclosure.

The following acronyms are used throughout the present disclosure:
  5th generation mobile networks
  5G Core Network
  5G System
  5G Access Network
  5G QoS Indicator
  AF Application Function
  AMBR Aggregate Maximum Bit Rate
  AMF Access and Mobility Management Function
  AN Access Network
  APN Access Point Name
  ARP Allocation and Retention Priority
  BD Billing Domain
  CDR Charging Data Record
  CHF Charging Function
  CN Core Network
  CP Control Plane
  DDoS Distributed Denial of Service
  DL Downlink
  DN Data Network
  DN-AAA Data Network Authentication Authorization and Accounting
  DNN Data Network Name
  EPS Evolved Packet System
  FDD Frequency Division Duplex
  FQDN Fully Qualified Domain Name
  GPSI Generic Public Subscription Identifier
  GW Gateway
  HTTP Hypertext Transfer Protocol
  H-CHF Home Charging Function
  H-NRF Home Network Repository Function H-PCF Home Policy Control Function
HPLMN Home Public Land Mobile Network
H-SMF Home Session Management Function
H-UPF Home User Plane Function
ID Identifier
IMS IP Multimedia core network Subsystem
IP Internet Protocol
IP-CAN IP Connectivity Access Network
L2 Layer 2 (data link layer)
L3 Layer 3 (network layer)
LADN Local Area Data Network
LAN local area network
MAC Media Access Control
MICO Mobile Initiated Connection Only
N3IWF Non-3GPP InterWorking Function
NAS Non Access Stratum
NAT Network address translation
NEF Network Exposure Function
NF Network Function
NR New Radio
NG-RAN NR Radio Access Network
NRF Network Repository Function
NSI Network Slice Instance
NSSAI Network Slice Selection Assistance Information
NSSF Network Slice Selection Function
NWDAF Network Data Analytics Function
OAM Operation Administration and Maintenance
PCC Policy and Charging Control
PCF Policy Control Function
PCO Protocol Configuration Option
PDU Packet Data Unit
PEI Permanent Equipment Identifier
PLMN Public Land Mobile Network
QFI QoS Flow Identifier
QoS Quality of Service
RA Random Access
RAN Radio Access Network
RAT Radio Access Technology
RRC Radio Resource Control
RM Registration Management
SBA Service Based Architecture
SM Session Management
SMF Session Management Function
SMSF SMS Function
S-NSSAI Single Network Slice Selection Assistance information
SS Synchronization Signal
SSC Session and Service Continuity
SUPI Subscriber Permanent Identifier
TA Tracking Area
TAI Tracking Area Identity
TCP Transmission Control Protocol
UDR Unified Data Repository
UDM Unified Data Management
UDP User Datagram Protocol
UE User Equipment
UL Uplink
UL CL Uplink Classifier
UPF User Plane Function
V-CHF Visited Charging Function
V-NRF Visited Network Repository Function
V-PCF Visited Policy Control Function
VPLMN Visited Public Land Mobile Network
V-SMF Visited Session Management Function
V-UPF Visited User Plane Function
XML Extensible Markup Language Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
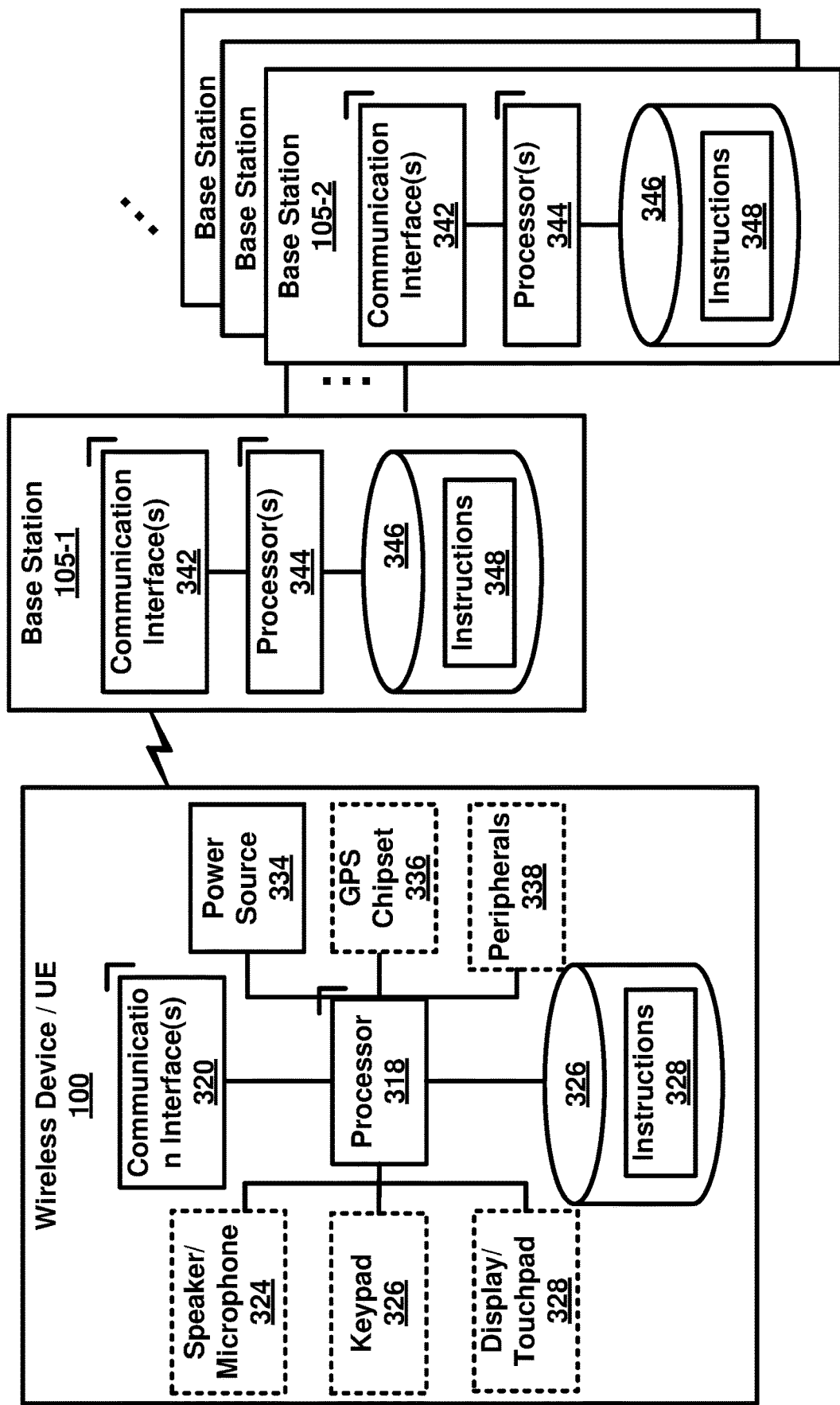
FIG. 3 is a system diagram of an example wireless device and a network node in a 5G system as per an aspect of an embodiment of the present disclosure.
Figure 4:
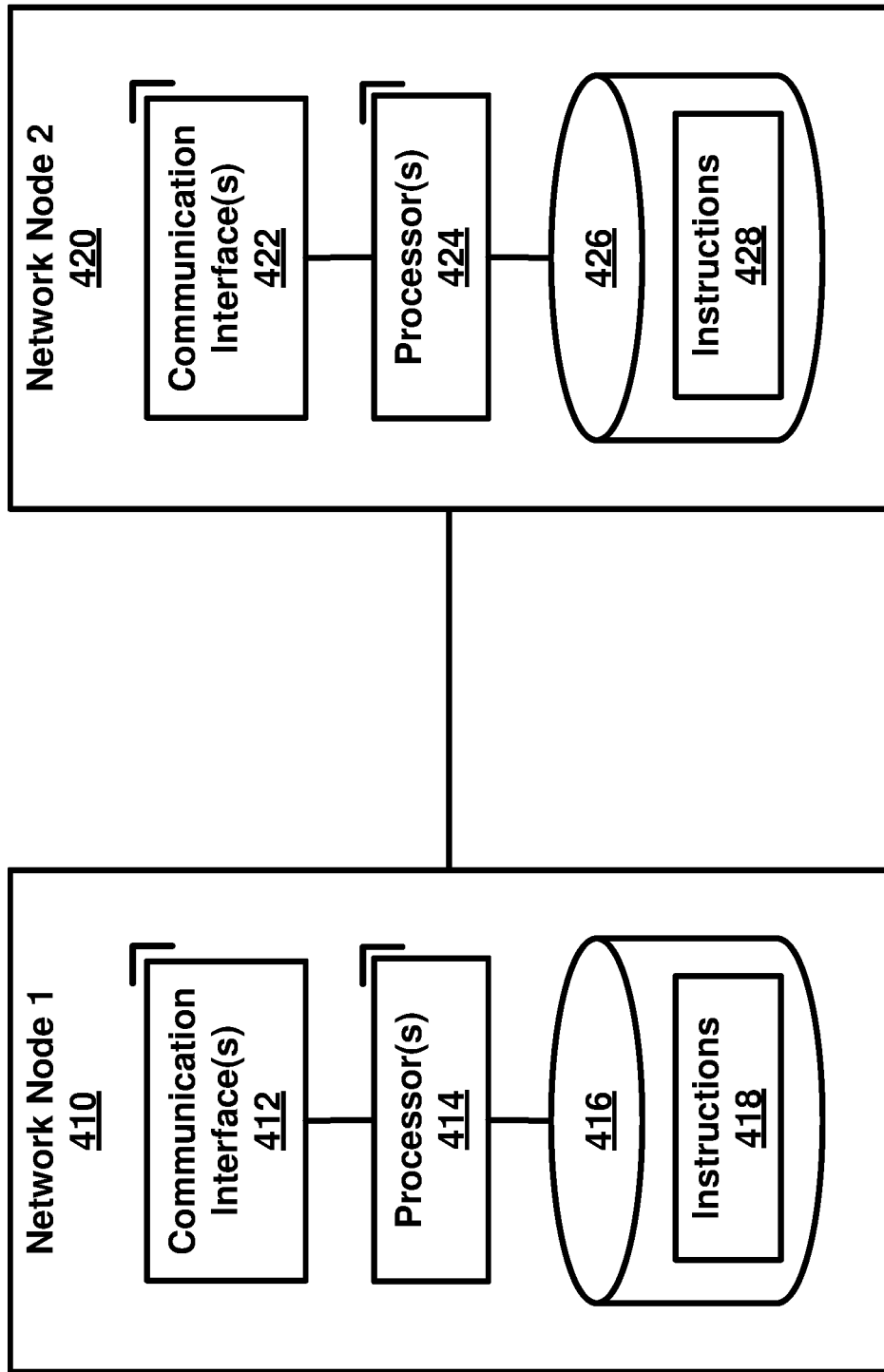
FIG. 4 is a system diagram of an example network nodes as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of an SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, a network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(*s*) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
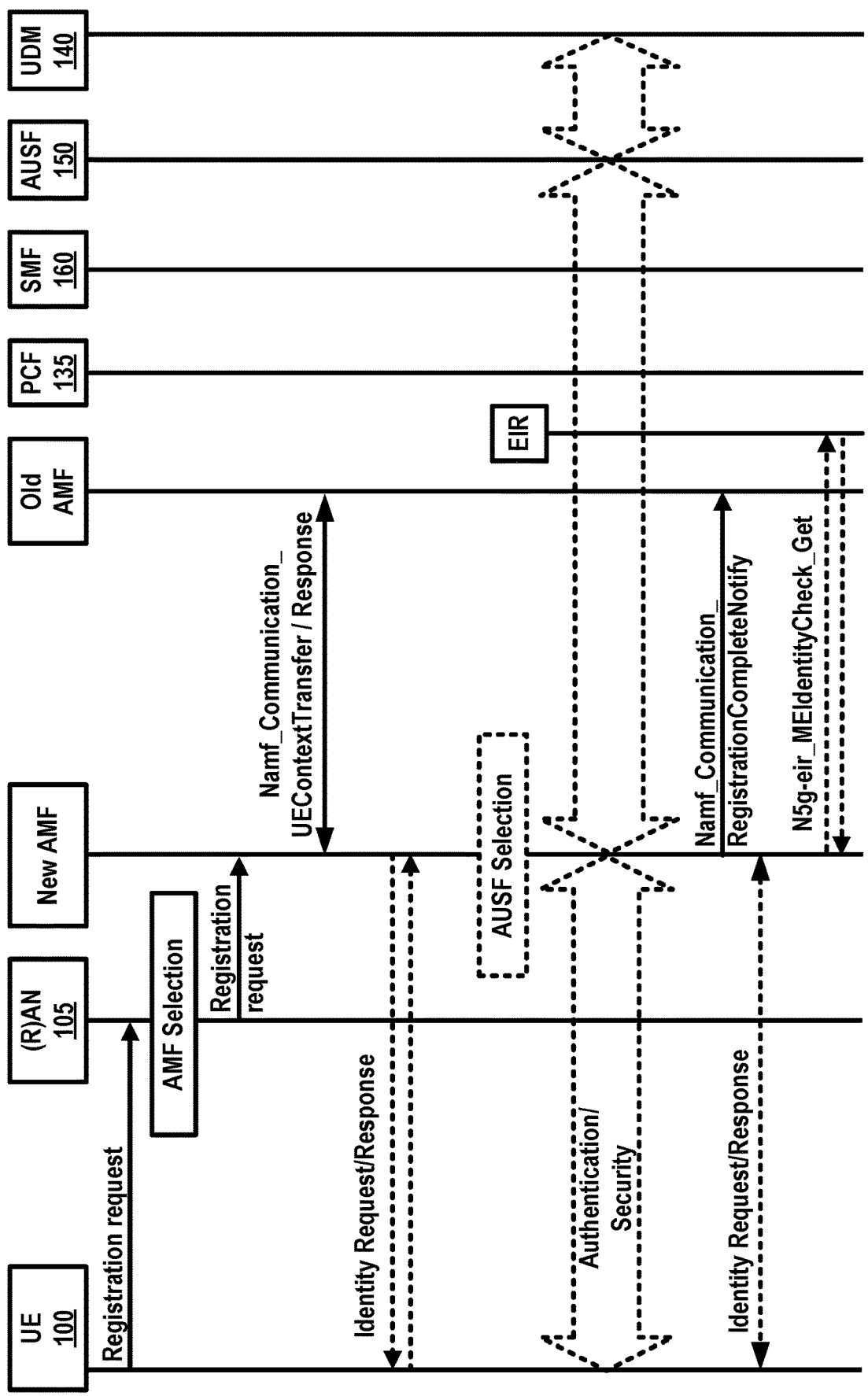
FIG. 8 and FIG. 9 are example call flows for registration procedure as per an aspect of an embodiment of the present disclosure.
Figure 9:
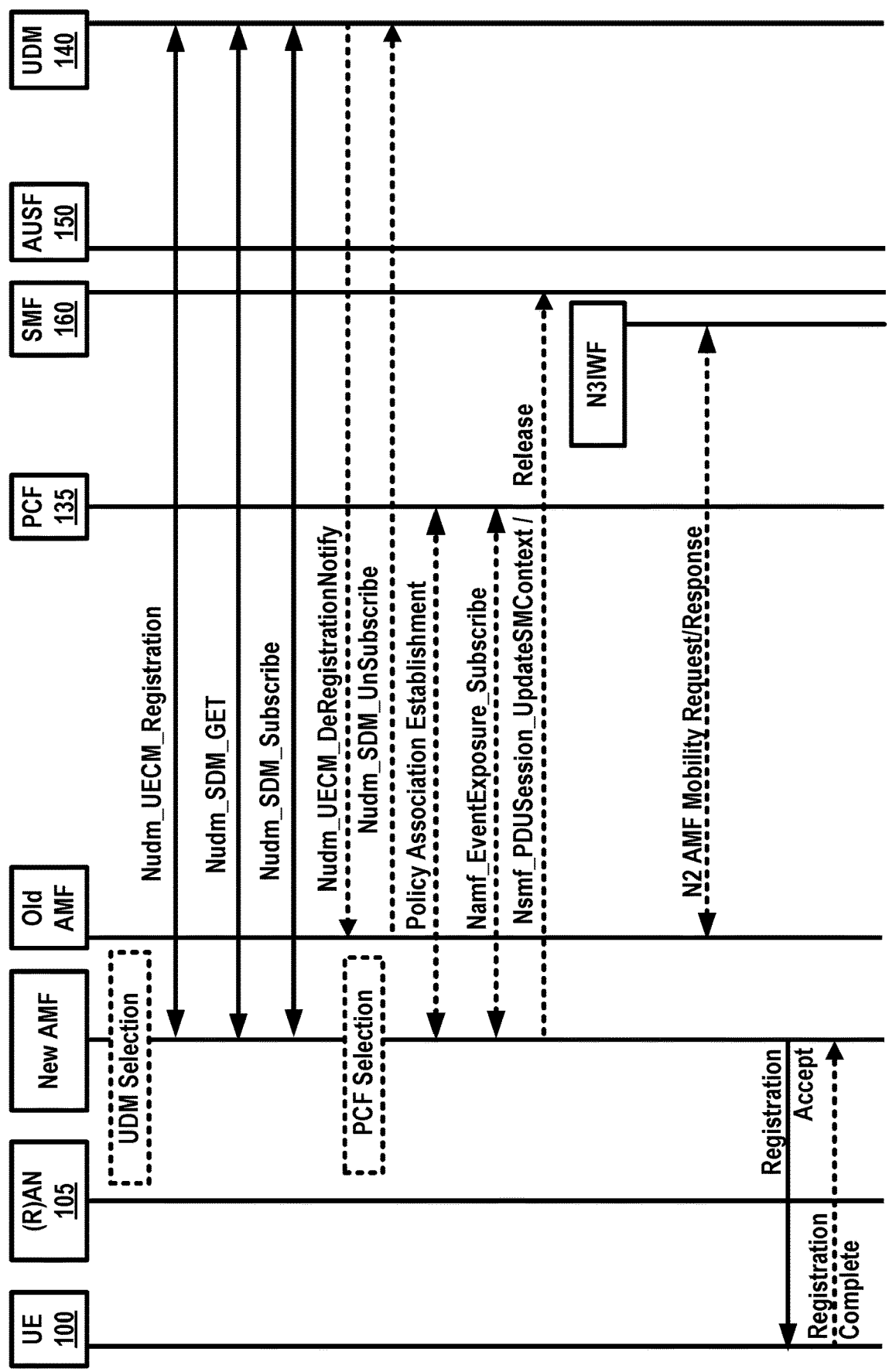

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
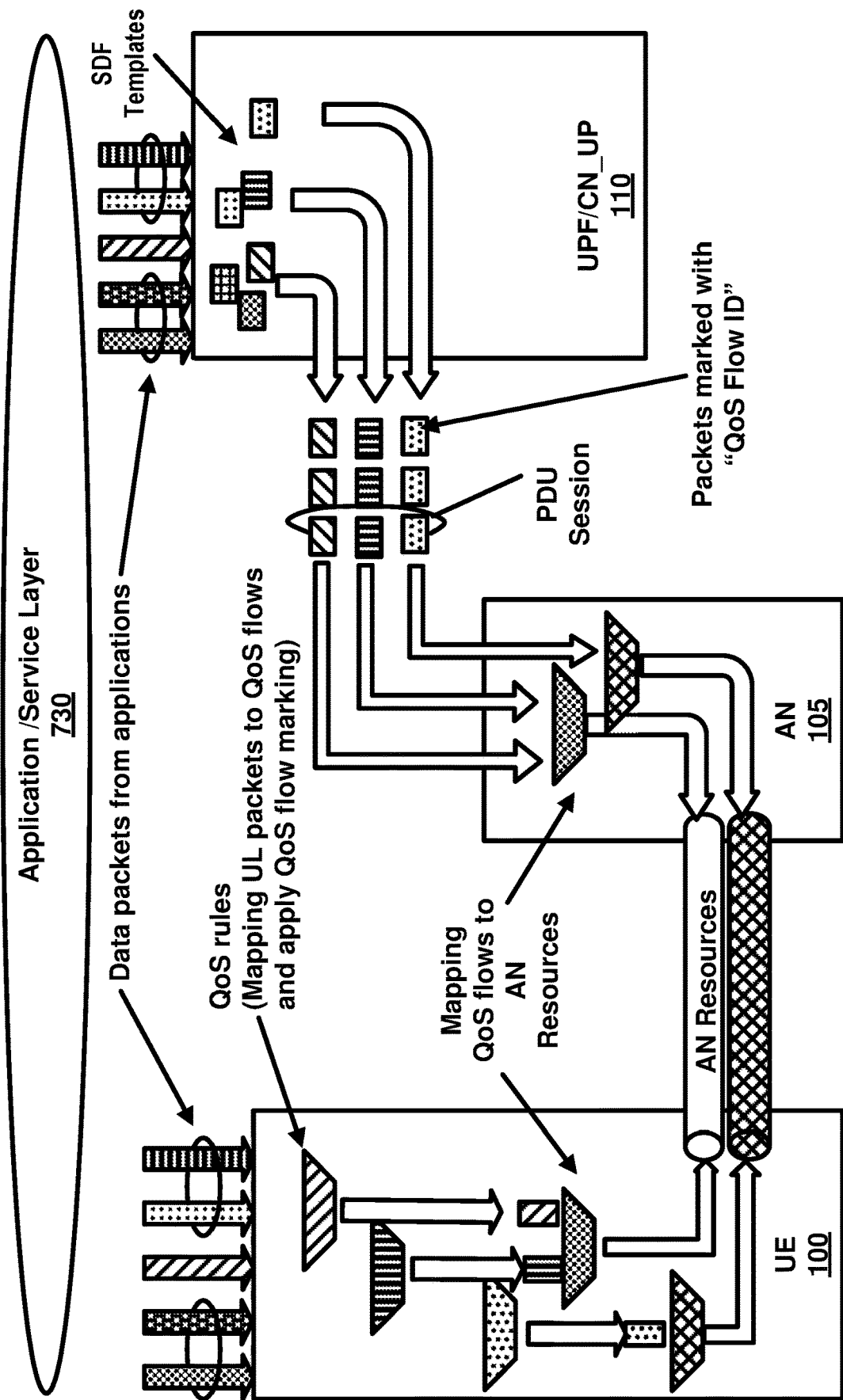
FIG. 7 is a diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEF 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer.

The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection.

In an example, the (R)AN 105 may send to the new AMF 155 an N2 message (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request). In an example, if the UE's 5G-GUTI was included in the registration request and the serving AMF 155 has changed since last registration procedure, the new AMF 155 may invoke the Namf_Communication_UEContextTransfer service operation on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure may be initiated by the AMF 155 sending an identity request message to the UE 100 requesting the SUCI.

In an example, the UE 100 may respond with an identity response message including the SUCI. The UE 100 may derive the SUCI by using the provisioned public key of the HPLMN.

In an example, the AMF 155 may decide to initiate UE 100 authentication by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration, the AMF 155 may skip the authentication and security setup, or the AMF 155 may accept that the authentication may fail and may continue the registration procedure.

In an example, the authentication may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check by invoking the N5g-eir_EquipmentIdentityCheck Get service operation.

In an example, the new AMF 155, based on the SUPI, may select a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get. The UDM 140 may retrieve this information from UDR by Nudr_UDM_Query (access and mobility subscription data). After a successful response is received, the AMF 155 may subscribe to be notified using Nudm_SDM_Subscribe when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select a PCF 135.

In an example, the new AMF 155 may perform a policy association establishment during registration procedure. If the new AMF 155 contacts the PCF 135 identified by the (V-) PCF ID received during inter-AMF 155 mobility, the new AMF 155 may include the PCF-ID in the Npcf_AMPolicyControl_Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation for UE 100 event subscription.

In an example, the AMF 155 may send to the SMF 160 an Nsmf_PDUSession_UpdateSMContext. In an example, the AMF 155 may invoke the Nsmf_PDUSession_UpdateSM- Context if the PDU session(s) to be re-activated is included in the registration request. The AMF 155 may send Nsmf_P-DUSession_UpdateSMContext request to SMF 160(*s*) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155 may send to a N3IWF an N2 AMF 155 mobility request. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response.

In an example, the new AMF 155 may send to the UE 100 a registration accept (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete message. In an example, the UE 100 may send the registration complete message to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
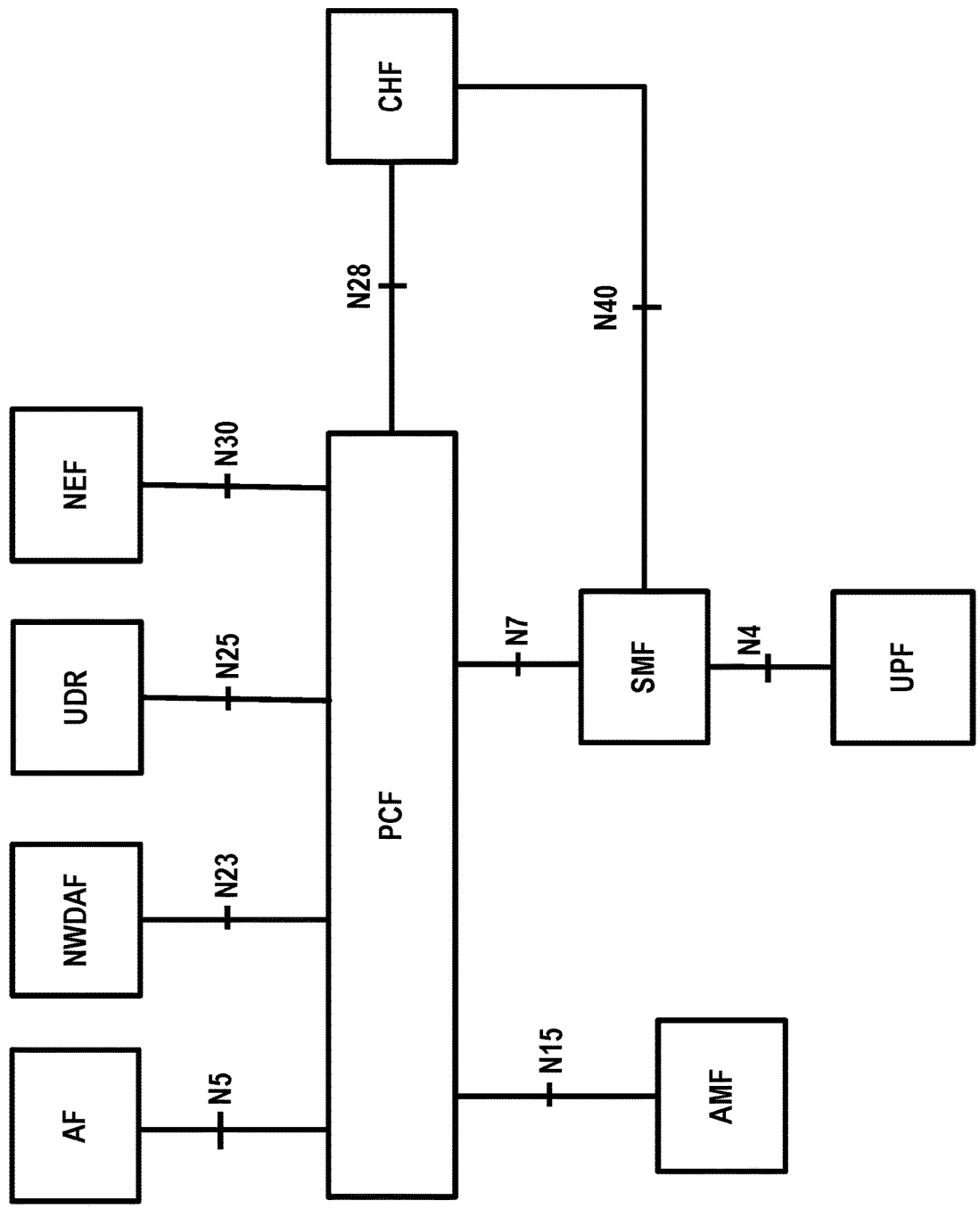
FIG. 10 is a diagram of an example 5G policy and charging control system architecture as per an aspect of an embodiment of the present disclosure.

In an example, FIG. 10 is a diagram of 5G policy and charging control system architecture. The reference architecture of policy and charging control framework for the 5G system may comprise one or more of the following network functions: policy control function (PCF), session management function (SMF), user plane function (UPF), access and mobility management function (AMF), network exposure functionality (NEF), network data analytics function (NWDAF), charging function (CHF), application function (AF) and unified data repository (UDR).

As an example, the CHF may support at least one charging method: offline charging, online charging, or converged charging.

As an example, the offline charging may be a process where charging information for network resource usage may be collected concurrently with that resource usage. At the end of the process, CDR files may be generated by the network, which may be transferred to a network operator's billing domain (BD) for the purpose of subscriber billing and/or inter-operator accounting (or additional functions, e.g. statistics, at the operator's discretion). The BD typically comprises post-processing systems such as the operator's billing system or billing mediation device. As an example conclusion, offline charging may be a mechanism where charging information does not affect, in real-time, the service rendered.

As an example, online charging may be a process where charging information for network resource usage may be collected concurrently with that resource usage in the same fashion as in offline charging. However, authorization for the network resource usage may be obtained by the network prior to the actual resource usage to occur. As an example, the charging information utilized in online charging may be not necessarily identical to the charging information employed in offline charging. As an example conclusion, online charging may be a mechanism where charging information may affect, in real-time, the service rendered and therefore a direct interaction of the charging mechanism with the control of network resource usage may be required.

As an example, converged charging may be a process where online and offline charging may be combined.

Figure 11:
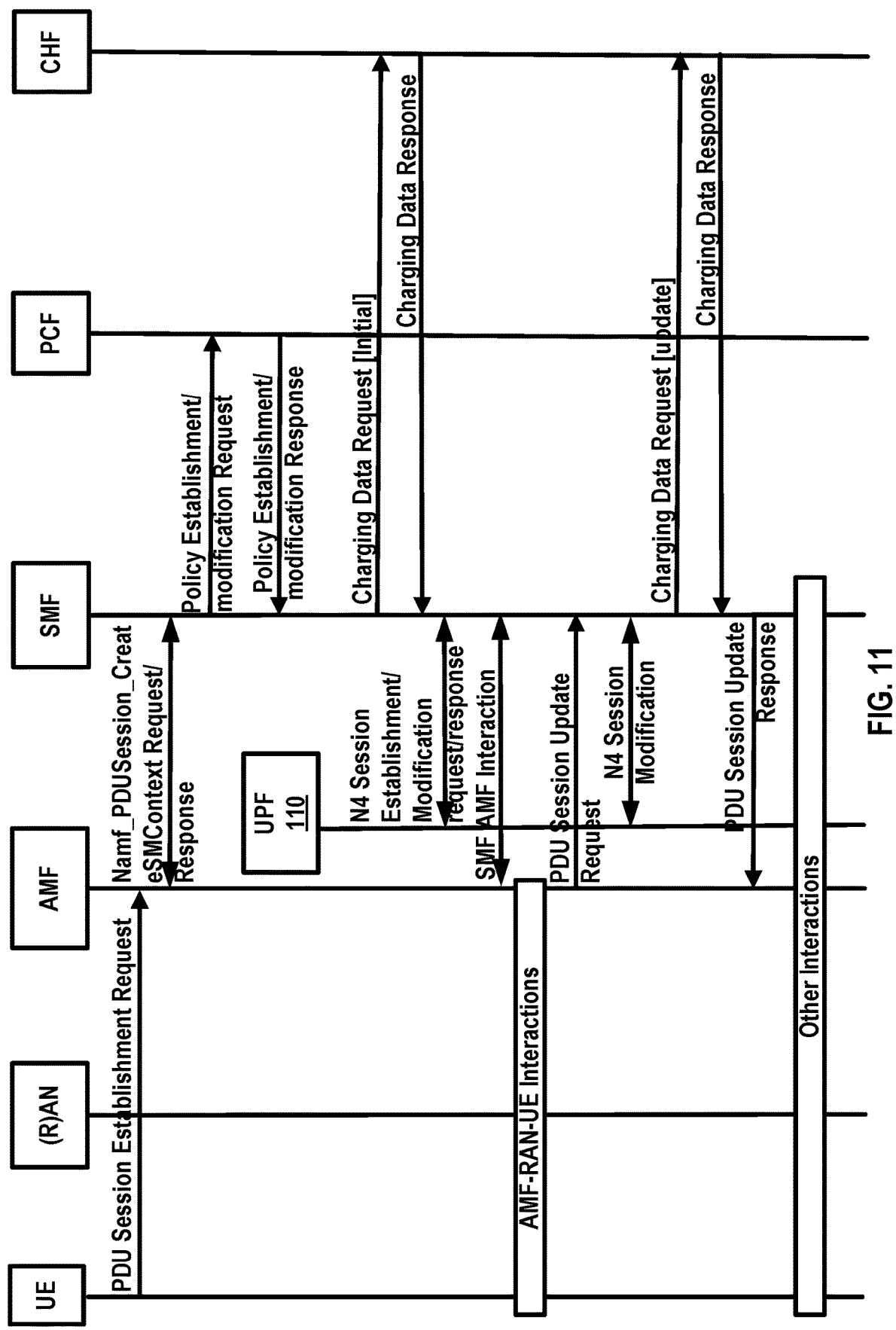
FIG. 11 is an example call flow for PDU session establishment charging as per an aspect of an embodiment of the present disclosure.

FIG. 11 is an example call flow for PDU session establishment charging as per an aspect of an embodiment of the present disclosure.

In an example, a UE may initiate a PDU Session establishment procedure comprising one or more of: PDU Session ID, PDU Type, SSC mode, User location information and Access Technology Type Information.

In response to the message received from the UE, an AMF may select an SMF and send to the selected SMF a message (e.g. Namf_PDUSession_CreateSMContext Request), the SMF may send to the AMF a response message (e.g. Namf_PDUSession_CreateSMContext Response).

In an example, the SMF may select a PCF and send to the PCF a message (e.g. SM Policy Association Establishment Request) to request PCC rules, and the PCF may provide PCC rules in a response message (e.g. SM Policy Association Establishment response).

In an example, the SMF may create a Charging Id for the PDU session and may send a Charging Data Request[initial] message to a CHF for authorization for the subscriber to start the PDU session which is triggered by start of PDU session charging event.

In an example, the CHF may open CDR for this PDU session and may acknowledge by sending Charging Data Response [Initial] to the SMF.

In an example, the SMF select a UPF and may initiate an N4 Session Establishment/Modification procedure with the selected UPF.

The SMF may interact with the AMF, in an example, the SMF may send to the AMF a Namf_Communication_N1N2MessageTransfer message comprising one or more of: PDU Session ID, QoS Profile(s), CN Tunnel Info, and S-NSSAI from the Allowed NSSAI.

In an example, the AMF may interact with (R)AN and UE by sending to the (R)AN a N2 PDU Session Request message comprising the information received from the SMF, indicating the PDU session establishment is accepted.

In an example, the (R)AN may send to the AMF a N2 PDU Session Response message comprising one or more of: PDU Session ID, N2 SM information (PDU Session ID, AN Tunnel Info, List of accepted/rejected QFI(s)), wherein the AN Tunnel Info may be corresponding to the Access Network address of the N3 tunnel corresponding to the PDU Session.

In an example, the AMF may send to the SMF a Nsmf_PDUSession_UpdateSMContext Request message comprising the N2 SM information received from (R)AN to the SMF.

In an example, the SMF may initiate an N4 Session Modification procedure with the UPF. The SMF may provide AN Tunnel Info to the UPF as well as the corresponding forwarding rules. The UPF may send to the SMF a response message.

In an example, the SMF may request quota from CHF, e.g. "start of service data flow" event may need quota from CHF. The SMF may send a message to the CHF (e.g. Charging Data Request [update]). As an example, for online charging or converged charging, the SMF may request quota from CHF when allocated quota is consumed or a trigger is met to request a quota.

As an example, the UPF may report resource usage of a PDU session to the SMF. As an example, the UPF may report resource usage of a wireless device to the SMF. by enforcing the charging control rules, the SMF may send to the CHF a message (e.g. Charging Data Request [update]) comprising resource usage information received from the UPF.

In an example, the CHF may update CDR for this PDU session. The CHF may acknowledge the SMF by sending a Charging Data Response message.

In an example, the SMF may send to the AMF a Nsmf_PDUSession_UpdateSMContext Response message.

In an example, other interactions may be performed between SMF, AMF, (R)AN and UE for the PDU session establishment procedure.

Implementation of the existing technologies may have issues in supporting charging control. The existing technologies may have issues that where and how a PCF receive charging related information. The existing technologies may have issues that how the PCF select a CHF. The existing technologies may have issues that how the CHF determine a charging method (e.g. online charging, offline charging, or converged charging). Example embodiments provides the enhanced mechanisms to indicate charging policy information from a CHF to a PCF. Example embodiments provides the enhanced mechanisms to indicate charging policy information from a network function to a PCF. Example embodiments provides the enhanced mechanisms that the PCF makes policy decision based on the received charging policy information. Example embodiments provides the enhanced mechanisms to indicate charging type from an SMF to a CHF. Example embodiments provides the enhanced mechanisms to select a CHF by the PCF. Example embodiments provides the enhanced mechanisms that the CHF determines a charging method.

In existing systems, a PCF may send a charging control rule to an SMF. Implementation of the existing technologies does not provide charging control information to the PCF to determine charging control rule. Implementation of the existing technologies may have issues that how a charging function (CHF), a PCF and an SMF coordinated rightly. With implementation of existing signaling methods, the PCF may not be coordinated with the CHF and may select an improper charging method. Implementation of the existing technologies does not provide flexibility in configuring various types of charging control by the PCF. CHF may have various charging methods, and there is a need to dynamically coordinate the charging method between a CHF and a PCF.

Example embodiments provides enhanced mechanisms to coordinate charging policy information between a CHF and a PCF. In an example embodiment, a PCF may make policy decisions based on received charging policy information from a CHF. Example embodiments provides an enhanced method in configuring various types of charging control by the PCF. Example embodiments provides an enhanced method to select a proper charging method by the PCF. Example embodiments provides an enhanced method for selecting a CHF by the PCF.

Implementation of the existing technologies may have issues in supporting charging control in roaming scenario. The existing technologies may have issues that how a visited SMF coordinate with a home SMF for charging related information. The existing technologies may have issues that how a visited PCF coordinate with a home PCF for charging related information. The existing technologies may have issues that how a visited CHF coordinate with a home CHF for charging related information. The existing technologies may have issues to support charging between a visited PLMN and home PLMN considering different charging policy in visited PLMN and home PLMN.

Example embodiments provides enhanced mechanisms to coordinate charging policy information between a visited SMF and a home SMF. Example embodiments provides enhanced mechanisms to coordinate charging policy information between a visited PCF and a home PCF. Example embodiments provides enhanced mechanisms to coordinate charging policy information between a visited CHF and a home CHF.

Figure 12:
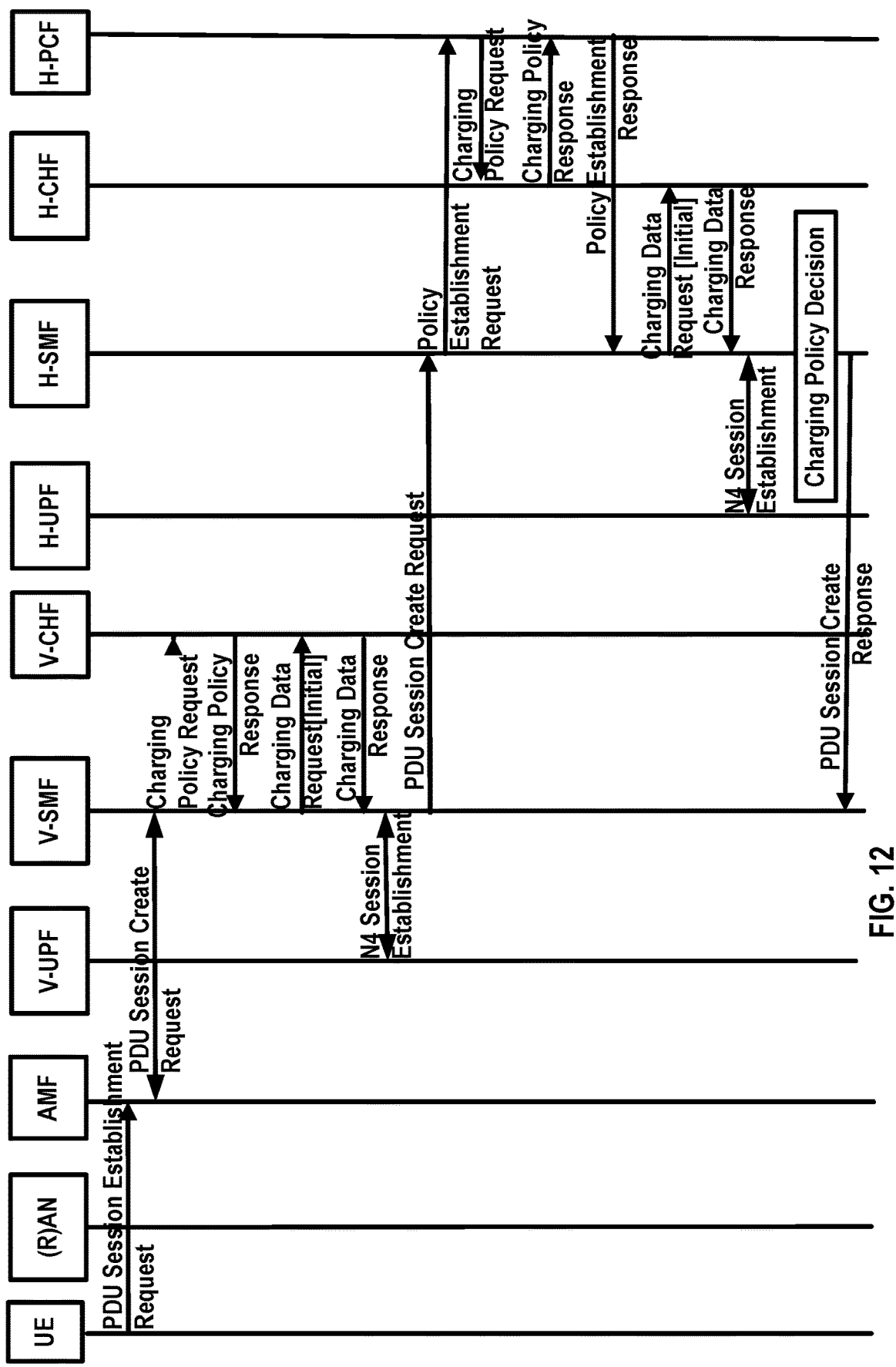
FIG. 12 and FIG. 13 are example call flows of charging policy information negotiation between a V-SMF and a H-SMF as per an aspect of an embodiment of the present disclosure.
Figure 13:
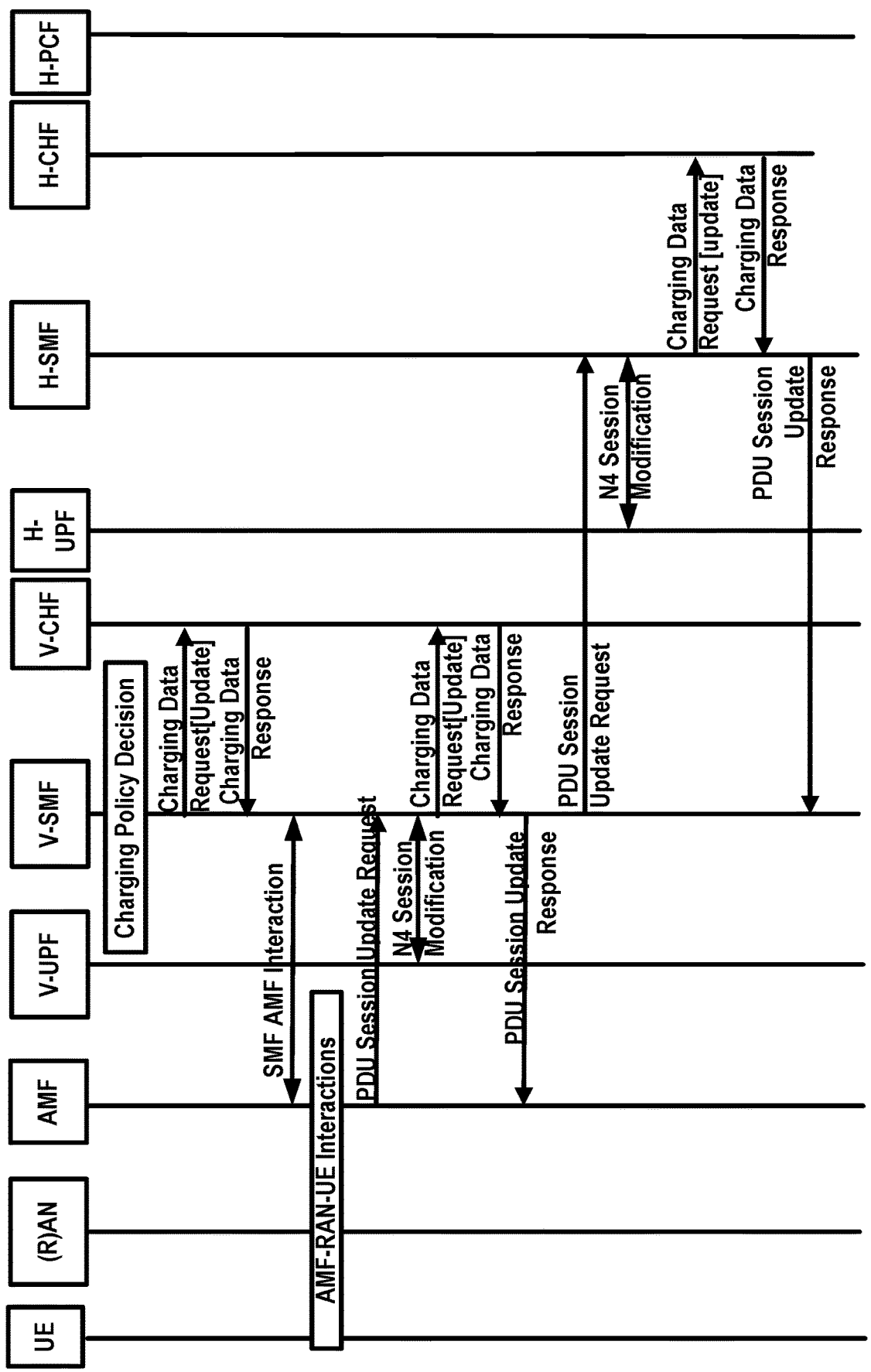

FIG. 12 and FIG. 13 are example call flows of charging policy information negotiation between a V-SMF and a H-SMF as per an aspect of an embodiment of the present disclosure.

A UE may send to an AMF a NAS message comprising at least one of: S-NSSAI(s), DNN, PDU Session ID, Request type, or N1 SM container (PDU session establishment request). The UE may initiate a UE requested PDU session establishment procedure by the transmission of a NAS message comprising a PDU session establishment request message within the N1 SM container. The PDU session establishment request message may comprise at least one of: a PDU session ID, Requested PDU Session Type, or a Requested SSC mode, etc. In response to the message received from the UE, the AMF may select a visited SMF (e.g. V-SMF) and may also select an SMF in HPLMN (e.g. H-SMF) by using the S-NSSAI with the value defined by the HPLMN. The AMF may send to the V-SMF a message (e.g. PDUSession_CreateSMContext Request) comprising at least one of: SUPI, DNN, S-NSSAI(s) and/or network slice instance identifier(s), PDU Session ID, AMF ID, Request Type, visited PCF identifier, home PCF identifier, Priority Access, User location information, Access Type, PEI, or an N1 SM container, wherein the N1 SM container may comprise a PDU Session Establishment Request. As an example, the message sent to the V-SMF may comprise the identity of the H-SMF and both the S-NSSAI from the Allowed NSSAI and the corresponding Subscribed S-NSSAI. In response to the message received from the AMF, the V-SMF may send to the AMF a response message (e.g. PDUSession_CreateSMContext Response) comprising at least one of: Cause, SM Context ID or N1 SM container (PDU Session Reject (Cause)).

Figure 24:
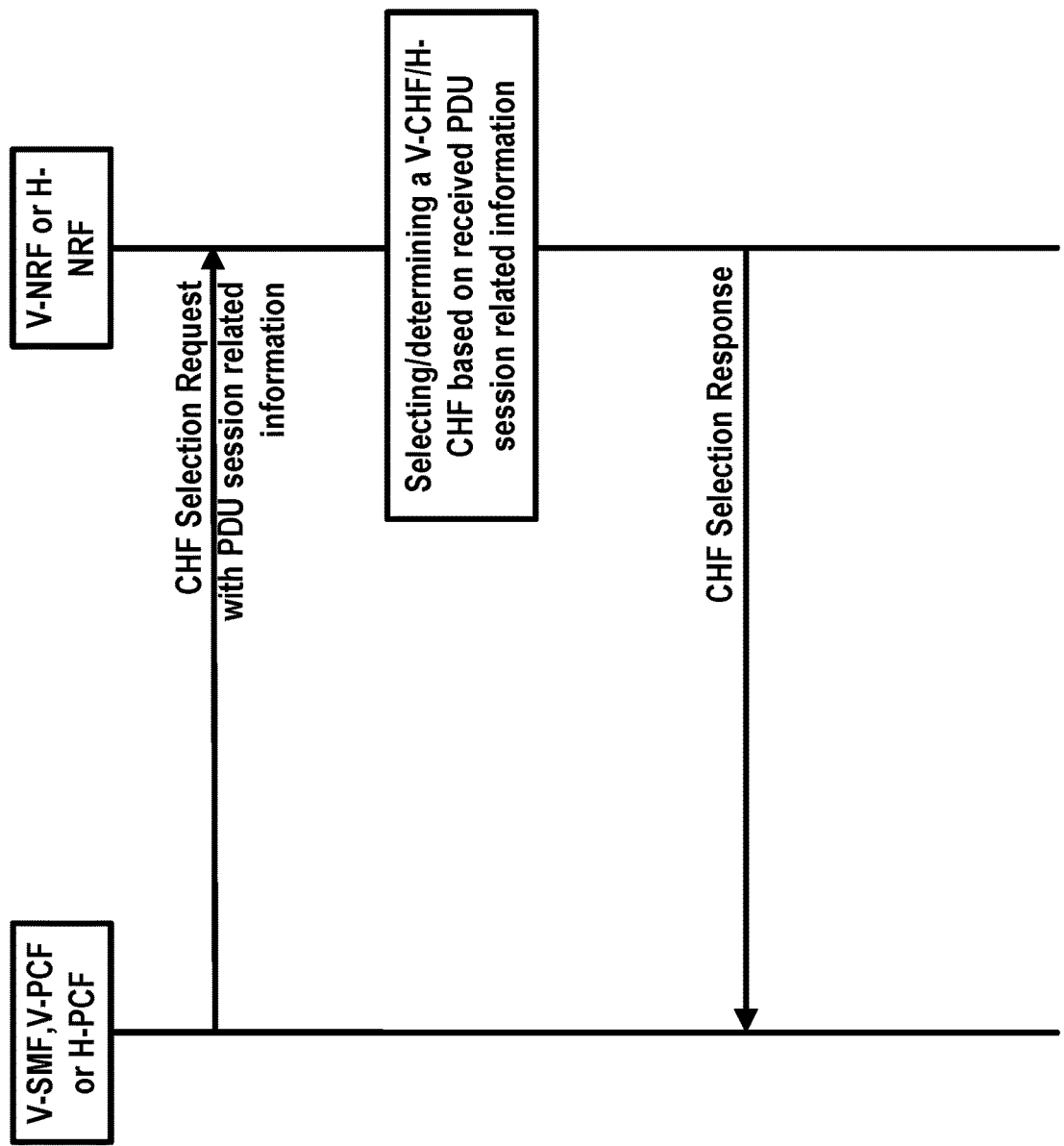
FIG. 24 is an example call flow of selecting a V-CHF or a H-CHF by a V-NRF or a H-NRF as per an aspect of an embodiment of the present disclosure.

The UE may be identified as a roaming wireless device (e.g. PLMN ID of the received SUPI may be different from VPLMN PLMN ID), a visited CHF (e.g. V-CHF) may be selected accordingly. In an example, the V-SMF may select a V-CHF by a Visited NRF (e.g. V-NRF). FIG. 24 is an example call flow of selecting a V-CHF by a V-NRF, which may comprise one or more actions. In an example action, the V-SMF may send to a V-NRF a message (e.g. a CHF Selection Request message, or a Nnrf_NFDiscovery_Request message) comprising an information element indicating a request to select a V-CHF. The message sent from the V-SMF to the V-NRF may comprise PDU session related information. The PDU session related information may comprise at least one of: at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); the PLMN identifier; an application identifier; the DNN, the S-NSSAI(s) and/or network slice instance identifier(s), the PDU Session ID, the user location information, or the information of the V-SMF for the PDU session (e.g. V-SMF identifier, IP address and/or FQDN of the V-SMF). In an example action, in response to the message received from the V-SMF, the V-NRF may determine/select at least one V-CHF based on the information received from the V-SMF, and/or the UE subscription information received from a UDR, and/or local configuration and operator policies, and/or other information for the PDU session. As an example, the V-NRF may select a V-CHF based on one or more combination information received from the V-SMF. As an example, the V-NRF may select a V-CHF based on the UE IP address (e.g. UE IPv4 address and/or UE IPv6 network prefix). As an example, the V-NRF may select a CHF based on the Type of PDU Session (e.g. IPv4, IPv6, IPv4v6, Ethernet, Unstructured). As an example, the V-NRF may select a V-CHF based on the PDU Session ID. As an example, the V-NRF may select a V-CHF based on the Access Type and/or the RAT type. As an example, the V-NRF may select a V-CHF based on the application identifier. As an example, the V-NRF may select a V-CHF based on the information of the V-SMF for the PDU session (e.g. V-SMF identifier, IP address or FQDN of the V-SMF). As an example, the V-NRF may select a V-CHF based on the user location information. In an example action, the V-NRF may send to the V-SMF a message (e.g. a CHF Selection Response message, or a Nnrf_NFDiscovery_Request Response message) comprising the information of the at least one selected V-CHF (e.g. V-CHF identifier, IP address and/or FQDN of the at least one selected V-CHF).

The V-SMF may send to the V-CHF a message (e.g. charging policy request, or a charging data request) requesting at least one charging policy information. The message sent to the V-CHF may comprise at least one of: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the allocated application instance identifier; the DNN, the S-NSSAI(s) and/or network slice instance identifier(s), the PDU Session ID, the user location information, the information of the V-SMF for the PDU session (e.g. V-SMF identifier, IP address or FQDN of the V-SMF), at least one service data flow filter for at least one service data flow; at least one QFI for at least one QoS flow; or at least one identifier for at least one subsystem (e.g. an identifier of an IMS subsystem).

In response to the message received from the V-SMF, the V-CHF may determine/generate/create/derive a first charging policy information based on the information received from the V-SMF. The first charging policy information may comprise an information element indicating a first charging method/charging type, wherein the first charging method/charging type may comprise at least one of: online charging, offline charging, or converged charging. The first charging policy information may comprise an information element indicating a first charging level, wherein the first charging level may comprise at least one of: an information element indicating a PDU session charging; an information element indicating a flow based charging; an information element indicating a QoS flow based charging; an information element indicating a service level charging; or an information element indicating a subsystem level charging (e.g. IMS). The first charging policy information may comprise an information element indicating at least one first charging rate. The first charging policy information may comprise an information element indicating at least one first identifier or address of a CHF. The first charging policy information may comprise at least one of: the PDU Session ID, the at least one service data flow filter, the at least one QFI, the application identifier; the allocated application instance identifier; the DNN, the S-NSSAI(s) and/or network slice instance identifier(s), or the UE identity. The first charging policy information may be applied to at least one of: a PDU session identified by a PDU session identifier; a service data flow identified by at least one service data flow filter; a QoS flow identified by an QFI; an application identified by an application identifier and/or an application instance identifier; a wireless device identified by at least one UE identity (e.g.

SUPI, PEI, and/or GPSI); a data network identified by a DNN; or a network slice identified by a S-NSSAI and/or a network slice instance identifier.

As an example, the V-CHF may determine the first charging policy information based on the UE identity, e.g. the V-CHF may determine an online charging and/or a QoS flow based charging and/or a charging rate and/or an IP address (e.g. IPv4 address and/or IPv6 network prefix) of V-CHF for an SUPI. As an example, the V-CHF may determine the first charging policy information based on the type of PDU session, e.g. the V-CHF may determine an offline charging and/or a PDU session charging and/or a flat charging rate and/or an IPv4 address of V-CHF for an IPv4 type PDU session. As an example, the V-CHF may determine the first charging policy information based on the Access Type and/or the RAT Type, e.g. the V-CHF may determine an online charging and/or a flow based charging and/or a charging rate and/or an IP address (e.g. IPv4 address and/or IPv6 network prefix) of V-CHF for an 3GPP access and/or 3GPP-NR-FDD RAT type. As an example, the V-CHF may determine the first charging policy information based on the PLMN identifier, e.g. the V-CHF may determine an offline charging and/or a PDU session charging and/or a flat charging rate and/or an FQDN of V-CHF for an PLMN identifier "12345". As an example, the V-CHF may determine the first charging policy information based on the application identifier, e.g. the V-CHF may determine an online charging and/or a service level charging and/or a charging rate and/or an identifier of V-CHF for an application identifier "skype". As an example, the V-CHF may determine the first charging policy information based on the DNN, e.g. the V-CHF may determine an offline charging and/or a subsystem level charging and/or a flat charging rate and/or an IPv4 address of V-CHF for an DNN "IMS". As an example, the V-CHF may determine the first charging policy information based on the network slice, e.g. the V-CHF may determine an online charging and/or a PDU session charging and/or a charging rate and/or an IPv6 network prefix of V-CHF for an S-NSSAI and/or network slice instance(s). As an example, the V-CHF may determine the first charging policy information based on the PDU session identifier, e.g. the V-CHF may determine an online charging and/or PDU session charging and/or a charging rate and/or an IPv4 address of V-CHF for an PDU session identifier "PDU session 1". As an example, the V-CHF may determine the first charging policy information based on the user location information, e.g. the V-CHF may determine an offline charging and/or a QoS flow based charging and/or a charging rate and/or an IP address (e.g. IPv4 address and/or IPv6 network prefix) of V-CHF for a wireless device located within "registration area 1". As an example, the V-CHF may determine the first charging policy information based on the information of the V-SMF for the PDU session (e.g. V-SMF identifier, IP address or FQDN of the V-SMF).

The V-CHF may send a response message (e.g. charging policy response, or a charging data response) to the V-SMF comprising the first charging policy information. The message sent to the V-SMF may comprise at least one of: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the allocated application instance identifier; the DNN, the S-NSSAI(s) and/or network slice instance identifier(s), the PDU Session ID, the user location information, the information of the V-SMF for the PDU session (e.g. V-SMF identifier, IP address or FQDN of the V-SMF), at least one service data flow filter for at least one service data flow; at least one QFI for at least one QoS flow; or at least one identifier for at least one subsystem (e.g. an identifier of an IMS subsystem).

As an example, HTTP protocol may be used for the communication between the V-CHF and the V-SMF. FIG. 19 shows example definitions of information element for the first charging policy information comprising charging method, charging level, charging rate and address of V-CHF, wherein XML structure of simple elements and/or groups may be used as HTTP message content. As an example, the transaction (e.g. a charging policy request message and a charging policy response message; or a charging data request message and a charging data response message) between V-SMF and V-CHF may establish a charging control session between the V-SMF and V-CHF. The V-SMF and V-CHF may establish a charging control session for a wireless device, and/or a PDU session, and/or a DNN, and/or a network slice, and/or a QoS flow.

The V-SMF may send to the V-CHF a message (e.g. a charging data request [Initial] message), indicating the UE may be an in-bound roamer. The V-CHF may open a CDR comprising an indication of in-bound roamer. The V-CHF may send to the V-SMF a response message (e.g. charging data response), and the response message may comprise a first roaming charging profile applied to the visited PLMN. The first roaming charging profile may comprise at least one of: a set of chargeable events and associated category; a set of thresholds configured in a charging characteristics for QoS flow based charging (QBC); or a default partial record mechanism indicated as the one used by the V-CHF.

The V-SMF may send to a V-UPF a message (e.g. N4 Session Establishment/Modification Request) comprising packet detection, enforcement and reporting rules to be installed on the V-UPF for the PDU Session. If CN Tunnel Info is allocated by the V-SMF, the CN Tunnel Info may be provided to V-UPF. The V-UPF may acknowledge the V-SMF by sending e.g. an N4 Session Establishment/Modification Response. If CN Tunnel Info is allocated by the V-UPF, the CN Tunnel Info may be provided to the V-SMF.

The V-SMF may send to the H-SMF a message (e.g. Nsmf_PDUSession_Create Request) comprising at least one of: SUPI, GPSI (if available), DNN, S-NSSAI with the value defined by the HPLMN, PDU Session ID, V-SMF ID, V-CN-Tunnel-Info, PDU Session Type, PCO, Number Of Packet Filters, User location information, Access Type, home PCF identifier, SM PDU DN Request Container, DNN Selection Mode, or the first roaming charging profile. The message sent to the H-SMF from the V-SMF may comprise the first charging policy information. As an example, the first roaming charging profile sent to the H-SMF may comprise the first charging policy information.

If dynamic PCC is deployed and a home PCF identifier is provided by the V-SMF, the H-SMF may perform PCF selection procedure by selecting a H-PCF (e.g. based on the home PCF identifier received). The H-SMF may perform an SM Policy Association Establishment procedure (e.g. by sending a policy establishment request message to the H-PCF) to establish a PDU Session with the selected H-PCF and get the default PCC Rules for the PDU Session. The PDU session may be identified by the PDU Session ID. The message sent to the H-PCF by the H-SMF may comprise at least one of: at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; DNN, S-NSSAI(s) and/or network slice instance identifier(s), PDU Session ID, user location information, or information of the H-SMF for the PDU session (e.g. H-SMF identifier, IP address or FQDN of the SMF). The message sent to the H-PCF by the H-SMF may comprise the first charging policy information. The message sent to the H-PCF by the H-SMF may comprise the first roaming charging profile.

In response to the message received from the H-SMF, the H-PCF may select a H-CHF based on the information received from the H-SMF, and/or the UE subscription information received from a UDR, and/or local configuration and operator policies, and/or other information for the PDU session. As an example, the H-PCF may select a H-CHF based on one or more combination information received from the H-SMF. As an example, the H-PCF may select a H-CHF based on the PLMN identifier received from the H-SMF. As an example, the H-PCF may select a H-CHF based on the network slice information (e.g. S-NSSAI(s) and/or network slice instance identifier(s)). As an example, the H-PCF may select a H-CHF based on the user location information. As an example, the H-PCF may select a H-CHF based on the information of the H-SMF. As an example, the H-PCF may select a H-CHF based on the Access Type and the RAT type received from the H-SMF. As an example, the H-PCF may select a H-CHF based on the first charging policy information. As an example, the H-PCF may select a H-CHF based on a charging method (e.g. online charging; offline charging; or converged charging). As an example, the H-PCF may select a H-CHF based on a charging level (e.g. PDU session charging; flow based charging; QoS flow based charging; service level charging; or subsystem level charging). As an example, the H-PCF may select a H-CHF based on a charging rate. As an example, the H-PCF may select a H-CHF based on first roaming charging profile. As an example, the H-PCF may select a H-CHF based on a set of chargeable events and associated category. As an example, the H-PCF may select a H-CHF based on a set of thresholds configured in a charging characteristics for QoS flow based charging (QBC). As an example, the H-PCF may select a H-CHF based on a default partial record mechanism e.g. indicated as the one used by the V-CHF.

In an example, the H-PCF may select a H-CHF by an H-NRF. FIG. 24 is an example call flow of selecting a H-CHF by an H-NRF, which may comprise one or more actions. In an example action, the H-PCF may send to an H-NRF a message (e.g. a CHF Selection Request message, or a Nnrf_NFDiscovery_Request message) comprising an information element indicating a request to select a H-CHF. The message sent from the H-PCF to the H-NRF may comprise PDU session related information. The PDU session related information may comprise at least one of: at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); the PLMN identifier; an application identifier; the DNN, the S-NSSAI(s) and/or network slice instance identifier(s), the PDU Session ID, the user location information, the information of the SMF for the PDU session (e.g. SMF identifier, IP address and/or FQDN of the SMF), or the information of the H-PCF (e.g. H-PCF identifier, IP address and/or FQDN of the H-PCF). The message sent to the H-NRF by the H-PCF may comprise the first charging policy information. The message sent to the H-NRF by the H-PCF may comprise the first roaming charging profile. In an example action, in response to the message received from the H-PCF, the H-NRF may determine/select at least one H-CHF based on the information received from the H-PCF, and/or the UE subscription information received from a UDR, and/or local configuration and operator policies, and/or other information for the PDU session. As an example, the H-NRF may select a H-CHF based on one or more combination information received from the H-PCF. As an example, the H-NRF may select a H-CHF based on the UE IP address (e.g. UE IPv4 address and/or UE IPv6 network prefix). As an example, the H-NRF may select a H-CHF based on the Type of PDU Session (e.g. IPv4, IPv6, IPv4v6, Ethernet, Unstructured). As an example, the H-NRF may select a H-CHF based on the PDU Session ID. As an example, the H-NRF may select a H-CHF based on the Access Type and/or the RAT type. As an example, the H-NRF may select a H-CHF based on the application identifier. As an example, the H-NRF may select a H-CHF based on the information of the H-SMF for the PDU session (e.g. H-SMF identifier, IP address or FQDN of the H-SMF). As an example, the H-NRF may select a H-CHF based on the user location information. As an example, the H-NRF may select a H-CHF based on the information of the H-PCF (e.g. H-PCF identifier, IP address and/or FQDN of the H-PCF). As an example, the H-NRF may select a H-CHF based on the first charging policy information. As an example, the H-NRF may select a H-CHF based on a charging method (e.g. online charging; offline charging; or converged charging). As an example, the H-NRF may select a H-CHF based on a charging level (e.g. PDU session charging; flow based charging; QoS flow based charging; service level charging; or subsystem level charging). As an example, the H-NRF may select a H-CHF based on a charging rate. As an example, the H-NRF may select a H-CHF based on first roaming charging profile. As an example, the H-NRF may select a H-CHF based on a set of chargeable events and associated category. As an example, the H-NRF may select a H-CHF based on a set of thresholds configured in a charging characteristics for QoS flow based charging (QBC). As an example, the H-NRF may select a H-CHF based on a default partial record mechanism e.g. indicated as the one used by the V-CHF. In an example action, the H-NRF may send to the H-PCF a message (e.g. a H-CHF Selection Response message, or a Nnrf_NFDiscovery_Request Response message) comprising the information of the at least one selected H-CHF (e.g. H-CHF identifier, IP address and/or FQDN of the at least one selected H-CHF).

The H-PCF may send to the H-CHF a message (e.g. charging policy request) requesting one or more charging policy information. The message sent to the H-CHF may comprise at least one of: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the allocated application instance identifier; the DNN, the S-NSSAI(s) and/or network slice instance identifier(s), the PDU Session ID, the user location information, the information of the SMF for the PDU session (e.g. H-SMF identifier, IP address or FQDN of the H-SMF), or the H-PCF identifier.

The message sent to the H-CHF by the H-PCF may comprise the first charging policy information. The message sent to the H-CHF by the H-PCF may comprise the first roaming charging profile.

In response to the message received from the H-PCF, the H-CHF may determine/generate/create/derive second charging policy information based on the information received from the H-PCF. The second charging policy information may comprise an information element indicating a second charging method/charging type, wherein the second charging method/charging type may comprise at least one of: online charging, offline charging, or converged charging. The second charging policy information may comprise an information element indicating a second charging level, wherein the second charging level may comprise at least one of: an information element indicating a PDU session charging; an information element indicating a flow based charging; an information element indicating a QoS flow based charging; an information element indicating a service level charging; or an information element indicating a subsystem level charging (e.g. IMS). The second charging policy information may comprise an information element indicating at least one second charging rate. The second charging policy information may comprise an information element indicating at least one second identifier or address of a CHF. The second charging policy information may comprise at least one of: the PDU Session ID, the at least one service data flow filter, the at least one QFI, the application identifier; the allocated application instance identifier; the DNN, the S-NSSAI(s) and/or network slice instance identifier(s), or the UE identity. The second charging policy information may be applied to at least one of: a PDU session identified by a PDU session identifier; a service data flow identified by at least one service data flow filter; a QoS flow identified by an QFI; an application identified by an application identifier and/or an application instance identifier; a wireless device identified by at least one UE identity (e.g. SUPI, PEI, and/or GPSI); a data network identified by a DNN; or a network slice identified by a S-NSSAI and/or a network slice instance identifier.

As an example, the H-CHF may determine the second charging policy information (e.g. second charging method/charging type, second charging level, second charging rate) based on the first charging policy information (e.g. first charging method/charging type, first charging level, first charging rate). As an example, the second charging policy information may be the same as the first charging policy information. As an example, the second charging policy information may be different from the first charging policy information. As an example, the H-CHF may determine the second charging method/charging type (e.g. online charging) based on the first charging method/charging type (e.g. converged charging). As an example, the H-CHF may determine the second charging level (e.g. PDU session charging) based on the first charging level (e.g. PDU session charging). As an example, the H-CHF may determine the second charging rate (e.g. a flat rate) based on the first charging rate (e.g. a flat rate). As an example, the H-CHF may determine the second identifier or address of the CHF (e.g. H-CHF) based on the first identifier or address of the CHF (e.g. V-CHF). As an example, the H-CHF may determine the second charging policy information based on the first roaming charging profile. As an example, the H-CHF may determine the second charging method/charging type (e.g. online charging) based on the set of chargeable events and associated category of the first roaming charging profile. As an example, the H-CHF may determine the second charging level (e.g. QoS flow based charging) based on a set of thresholds configured in a charging characteristics for QoS flow based charging (QBC) of the first roaming charging profile. As an example, the H-CHF may determine the second charging policy information based on the UE identity, e.g. the H-CHF may determine an online charging and/or a QoS flow based charging and/or a charging rate and/or an IP address (e.g. IPv4 address and/or IPv6 network prefix) of H-CHF for an SUPT. As an example, the H-CHF may determine the second charging policy information based on the type of PDU session, e.g. the H-CHF may determine an offline charging and/or a PDU session charging and/or a flat charging rate and/or an IPv4 address of H-CHF for an IPv4 type PDU session. As an example, the H-CHF may determine the second charging policy information based on the Access Type and/or the RAT Type, e.g. the H-CHF may determine an online charging and/or a flow based charging and/or a charging rate and/or an IP address (e.g. IPv4 address and/or IPv6 network prefix) of H-CHF for an 3GPP access and/or 3GPP-NR-FDD RAT type. As an example, the H-CHF may determine the second charging policy information based on the PLMN identifier, e.g. the H-CHF may determine an offline charging and/or a PDU session charging and/or a flat charging rate and/or an FQDN of H-CHF for an PLMN identifier "12345". As an example, the H-CHF may determine the second charging policy information based on the application identifier, e.g. the H-CHF may determine an online charging and/or a service level charging and/or a charging rate and/or an identifier of H-CHF for an application identifier "skype". As an example, the H-CHF may determine the second charging policy information based on the DNN, e.g. the H-CHF may determine an offline charging and/or a subsystem level charging and/or a flat charging rate and/or an IPv4 address of H-CHF for an DNN "IMS". As an example, the H-CHF may determine the second charging policy information based on the network slice, e.g. the H-CHF may determine an online charging and/or a PDU session charging and/or a charging rate and/or an IPv6 network prefix of H-CHF for an S-NSSAI and/or network slice instance(s). As an example, the H-CHF may determine the second charging policy information based on the PDU session identifier, e.g. the H-CHF may determine an online charging and/or PDU session charging and/or a charging rate and/or an IPv4 address of H-CHF for an PDU session identifier "PDU session 1". As an example, the H-CHF may determine the second charging policy information based on the user location information, e.g. the H-CHF may determine an offline charging and/or a QoS flow based charging and/or a charging rate and/or an IP address (e.g. IPv4 address and/or IPv6 network prefix) of H-CHF for a wireless device located within "registration area 1". As an example, the H-CHF may determine the second charging policy information based on the information of the SMF for the PDU session (e.g. H-SMF identifier, IP address or FQDN of the H-SMF). As an example, the H-CHF may determine the second charging policy information based on the H-PCF identifier.

The H-CHF may send a response message (e.g. charging policy response) to the H-PCF comprising the second charging policy information. The message sent to the H-PCF may comprise at least one of: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the DNN, the S-NSSAI(s) and/or network slice instance identifier(s), or the PDU Session ID. As an example, HTTP protocol may be used for the communication between the H-CHF and the H-PCF. FIG. 19 shows example definitions of information element for the charging policy information comprising charging method, charging level, charging rate and address of H-CHF, wherein XML structure of simple elements and/or groups may be used as HTTP message content. As an example, the transaction (e.g. a charging policy request message and a charging policy response message) between H-PCF and H-CHF may establish a charging control session between the H-PCF and the H-CHF. The H-PCF and the H-CHF may establish a charging control session for a wireless device, and/or a PDU session, and/or a DNN, and/or a network slice.

In response to the message received from the H-CHF, the H-PCF may make policy decision based on the received second charging policy information and may determine/generate/create/derive one or more PCC rules and/or one or more charging control rule based on the second charging policy information. The one or more PCC rules may comprise one or more charging control rules. The one or more PCC rules and/or the one or more charging control rules may be applied to at least one PDU session identified by a PDU session identifier, and/or a QoS flow identified by an QFI, and/or at least one service data flow identified by at least one service data flow filter, and/or at least one application identified by an application identifier, and/or a wireless device identified by a UE identity, and/or a data network identified by a DNN, and/or a network slice identified by an S-NSSAI and/or a network slice instance identifier. The one or more PCC rules determined by the H-PCF may comprise at least one of: one or more charging control rule; at least one policy control rule comprising at least one QoS control rule and/or at least one gating control rule; at least one usage monitoring control rule; at least one application detection and control rule; at least one traffic steering control rule; or at least one service data flow detection information (e.g. service data flow template). As an example, the one or more charging control rule may be used for charging control and may comprise at least one of: an information element indicating a third charging method/charging type, wherein the third charging method/charging type may comprise at least one of: online charging, offline charging, or converged charging; an information element indicating at least one third charging level; an information element indicating at least one third charging rate; an information element indicating at least one third identifier or address of a CHF.

As an example, the policy control rule may be used for policy control, wherein the at least one QoS control rule may be used for QoS control and the at least one gating control rule may be used for gating control. As an example, the QoS control rule may be used to authorize QoS on a service data flow. As an example, the gating control rule may be used to discard packets that don't match any service data flow of the gating control rule and/or associated PCC rules. As an example, the usage monitoring control rule may be used to monitor, both volume and time usage, and report the accumulated usage of network resources. As an example, the application detection and control rule may comprise a request to detect a specified application traffic, report to a PCF on a start or stop of application traffic and to apply a specified enforcement and charging actions. As an example, the traffic steering control rule may be used to activate/deactivate traffic steering policies for steering a subscriber's traffic to appropriate operator or 3rd party service functions (e.g. NAT, antimalware, parental control, DDoS protection) in an (S)Gi-LAN. As an example, the service data flow detection information (e.g. service data flow template) may comprise a list of service data flow filters or an application identifier that references the corresponding application detection filter for the detection of the service data flow. As an example, the service data flow detection information (e.g. service data flow template) may comprise combination of traffic patterns of the Ethernet PDU traffic.

As an example, the H-PCF may determine the one or more charging control rules based on the second charging policy information and/or other information (e.g. local configuration and operator policies, or subscription information). As an example, the PCF may determine the third charging method/charging type of the charging control rule based on the second charging method/charging type of the second charging policy information. The third charging method/charging type may be the same as the second charging method/charging type or may be different. As an example, the H-PCF may determine an online charging method of the charging control rule based on the online charging method of the charging policy information. As an example, the H-PCF may determine a converged charging method of the charging control rule based on the converged charging method of the second charging policy information. As an example, the H-PCF may determine an offline charging method of the charging control rule based on a converged charging method of the second charging policy information. As an example, the H-PCF may determine an online charging method of the charging control rule based on an offline charging method of the second charging policy information and/or an online charging method of a local configuration and operator policies. As an example, the H-PCF may determine the third charging level (e.g. PDU session charging) of the charging control rule based on the second charging level of the second charging policy information (e.g. PDU session charging). The third charging level of the charging control rule may be the same as the second charging level of the second charging policy information. The third charging level of the charging control rule may be different with the second charging level of the second charging policy information. As an example, the H-PCF may determine the third charging rate of the charging control rule based on the second charging rate of the second charging policy information. The third charging rate may be the same as the second charging rate or may be different. As an example, the H-PCF may determine a charging rate 1 in the charging control rule based on the charging rate 1 of the second charging policy information. As an example, the H-PCF may determine a charging rate 1 in the charging control rule based on a charging rate 2 in the second charging policy information and a charging rate 1 in the subscription information (e.g. from a UDR). As an example, the H-PCF may determine the third identifier or address of a CHF in the charging control rule based on the second identifier or address of a CHF of the second charging policy information. The third identifier or address of the CHF may be the same as the second identifier or address of a CHF or may be different. As an example, the H-PCF may determine an IPv4 address of a CHF (e.g. H-CHF) of the charging control rule based on the IPv4 address of the CHF (e.g. H-CHF) in the second charging policy information. As an example, the H-PCF may determine an IPv6 network prefix address of a CHF of the charging control rule based on the an IPv4 address and the IPv6 network prefix address of the CHF of the second charging policy information. As an example, the H-PCF may determine an identifier of a CHF in the charging control rule based on an FQDN of the CHF of the second charging policy information. As an example, the H-PCF may connect with one or more H-CHFs. The H-PCF may request to the one or more H-CHFs and receive charging policy information from the one or more H-CHFs respectively. The H-PCF may determine each charging control rule based on each charging policy information respectively. As an example, the H-PCF may determine charging control rule 1 based on charging policy information 1 received from H-CHF 1, and determine charging control rule 2 based on charging policy information 2 received from H-CHF 2. As an example, the H-PCF may determine charging control rule 3 and charging control rule 4 based on charging policy information 3 received from H-CHF 3, and determine charging control rule 5 and charging control rule 6 based on charging policy information 4 received from H-CHF 4.

The H-PCF may send to the H-SMF a response message (e.g. SM Policy Association Establishment Response) comprising the one or more PCC rules comprising the one or more charging control rules. As an example, the response message may comprise one or more PCC rules associate with one H-CHF (e.g. one or more PCC rules comprising one or more charging control rules may be derived from charging policy information received from H-CHF 1). As an example, the response message may comprise one or more PCC rules associate with more than one H-CHFs (e.g. PCC rule 1 comprises one or more charging control rules 1, and PCC rule 2 comprises one or more charging control rules 2, where PCC rule 1 and/or charging control rules 1 may be derived from charging policy information received from H-CHF 1, and PCC rule 2 and/or charging control rules 2 may be derived from charging policy information received from H-CHF 2. As an example, charging control rules 1 may comprise an address of H-CHF 1, charging control rules 2 may comprise an address of CHF 2). The response message may comprise at least one of the following information elements which the one or more PCC rules applied to: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the DNN, the S-NSSAI(s) and/or network slice instance identifier(s), or the PDU Session ID.

In response to the message received from the H-PCF, the H-SMF may install the one or more PCC rules comprising the one or more charging control rules and other information received. The H-SMF may select one of H-CHF and enforce the one or more charging control rules associated with the H-CHF by comprising one or more actions. In an example action, the H-SMF may select one of H-CHF based on one or more the identifier or address of CHFs in the one or more charging control rules. In an example action, the H-SMF may construct a message (e.g. charging data request [initial]) based on the one or more charging control rules and other information elements. In an example action, the H-SMF may send the constructed message to the H-CHF to establish a charging session. The identifier or address of the H-CHF in the one or more charging control rule may be used by the H-SMF to establish a charging session. The message sent to the H-CHF may comprise a requested charging policy information. The requested charging policy information may comprise at least one of: an information element indicating a requested charging method/charging type, wherein the requested charging method/charging type may comprise at least one of: online charging, offline charging, or converged charging; the requested charging method/charging type may be determined by the H-SMF based on the third charging method/charging type of the one or more charging control rules and/or the first charging method/charging type of the first charging policy information; an information element indicating at least one requested charging level, wherein the requested charging level may be determined by the H-SMF based on the third charging level of the one or more charging control rules and/or the first charging level of the first charging policy information; an information element indicating at least one requested charging rate, wherein the at least one requested charging rate may be determined by the H-SMF based on the third charging rate of the one or more charging control rules and/or the first charging rate of the first charging policy information; an information element indicating a PDU session identified by a PDU session identifier; an information element indicating a QoS flow identified by an QFI; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; an information element indicating a network slice identified by a S-NSSAI and/or a network slice instance identifier. With the requested charging method/charging type, as an example, the H-SMF may indicate to the H-CHF an online charging method; as an example, the H-SMF may indicated to the H-CHF an offline charging method; as an example, the H-SMF may indicate to the H-CHF a converged charging method. The message sent to the H-CHF by the H-SMF may comprise the first charging policy information. The message sent to the H-CHF by the H-SMF may comprise the first roaming charging profile.

In response to the message received from the H-SMF, the H-CHF may verify the information received and determine whether to accept the charging session request. As an example, the H-CHF may accept the request. The H-CHF may determine an accepted/authorized charging policy information based on the requested charging policy information and/or the first charging policy information. As an example, the accepted/authorized charging policy information may be the same as the requested charging policy information. As an example, the accepted/authorized charging policy information may be different from the requested charging policy information. As an example, the accepted/authorized charging policy information may be the same as the first charging policy information. As an example, the accepted/authorized charging policy information may be different from the first charging policy information. As an example, the H-CHF may determine the accepted/authorized charging method/charging type (e.g. online charging) based on the requested charging method/charging type and/or the first charging method/charging type (e.g. converged charging). As an example, the H-CHF may determine the accepted/authorized charging level (e.g. PDU session charging) based on the requested charging level (e.g. QoS flow based charging) and/or the first charging level (e.g. PDU session charging). As an example, the H-CHF may determine the accepted/authorized charging rate (e.g. a flat rate) based on the requested charging rate (e.g. a charging rate 1) and/or the first charging rate (e.g. a flat rate). As an example, the H-CHF may determine the accepted/authorized charging policy information based on the first roaming charging profile. As an example, the H-CHF may determine the accepted/authorized charging method/charging type (e.g.

online charging) based on the set of chargeable events and associated category of the first roaming charging profile. As an example, the H-CHF may determine the accepted/authorized charging level (e.g. QoS flow based charging) based on a set of thresholds configured in a charging characteristics for QoS flow based charging (QBC) of the first roaming charging profile.

The H-CHF may send to the H-SMF a response message (e.g. charging data response). The response message may comprise at least one of: an information element indicating a success cause value to indicate the request is accepted; an information element indicating an accepted/authorized charging method/charging type, wherein the accepted charging method/charging type may comprise at least one of: online charging, offline charging, or converged charging; an information element indicating at least one accepted/authorized charging level (e.g. PDU session charging; flow based charging; QoS flow based charging; service level charging; or subsystem level charging (e.g. IMS); an information element indicating at least one accepted/authorized charging rate (e.g. rating group); an information element indicating at least one granted unit (e.g. granted volume and/or granted time for online charging or converged charging); an information element indicating final unit action (e.g. redirect the traffic to a web portal when the final granted unit has been consumed by the wireless device); an information element indicating a PDU session identified by a PDU session identifier; an information element indicating a QoS flow identified by an QFI; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; or an information element indicating a network slice identified by a S-NSSAI and/or a network slice instance identifier.

As an example, the H-CHF may reject the request, and may send to the H-SMF a response message (e.g. charging data response) comprising a proposed/accepted charging policy information. The response message may comprise at least one of: an information element indicating a reject cause value to indicate the request is rejected; an information element indicating an accepted/proposed charging method/charging type (e.g. online charging, offline charging, or converged charging); an information element indicating at least one accepted/authorized charging level (e.g. PDU session charging; flow based charging; QoS flow based charging; service level charging; or subsystem level charging (e.g. IMS); or an information element indicating at least one accepted/authorized charging rate.

In response to the message received from the H-CHF, the H-SMF may take different actions based on the result of the response. As an example, when receiving a reject response message from the H-CHF, the H-SMF may resend to the H-CHF a second request message (e.g. charging data request [update]) comprising the accepted/authorized charging policy information proposed by the H-CHF. The H-CHF may accept the second request by sending to the H-SMF a second response message (e.g. charging data response) comprising a success cause value indicating the request is accepted. As an example, when receiving a reject response message from the H-CHF, the H-SMF may select a second H-CHF from the information (e.g. charging policy rules) received from the H-PCF and send a request message (e.g. charging data request) to the second H-CHF to establish a charging session. As an example, after receiving a success response message from the H-CHF, the H-SMF may enforce the PCC rules and/or charging control rules required by the H-PCF and/or charging function required by the H-CHF by determining/generating/creating/deriving at least one of the following user plane rules based on the one or more PCC rules and/or the one or more charging control rules received from the H-PCF and/or the information (e.g. charging policy information) received from the H-CHF: at least one packet detection rule; at least one forwarding action rule; at least one QoS enforcement rule; or at least one usage reporting rule.

As an example, the packet detection rule may comprise data/traffic packet detection information, e.g. one or more match fields against which incoming packets are matched and may apply other user plane rules (e.g. forwarding action rule, QoS enforcement rule, and usage reporting rule) to the data/traffic packets matching the packet detection rule. As an example, the forwarding action rule may comprise an apply action parameter, which may indicate whether a UP function may forward, duplicate, drop or buffer the data/traffic packet respectively. As an example, the usage reporting rule may be used to measure the network resources usage in terms of traffic data volume, duration (i.e. time) and/or events, according to a measurement method in the usage reporting rule. As an example, the QoS enforcement rule may comprise instructions to request the UP function to perform QoS enforcement of the user plane traffic. As an example, the H-SMF may determine a packet detection rule based on the service data flow detection information (e.g. service data flow template) received from the H-PCF. As an example, the H-SMF may determine a forwarding action rule based on the policy control rule and/or usage monitoring control rule received from the H-PCF and/or the final unit action received from the H-CHF. As an example, the H-SMF may determine a QoS enforcement rule based on the policy control rule (e.g. QoS control rule) received from the H-PCF. As an example, the H-SMF may determine a usage reporting rule based on the usage monitoring control rule received from the H-PCF and/or the at least one granted unit (e.g. granted volume and/or granted time for online charging or converged charging) received from the H-CHF. As an example, the H-SMF may enforce the one or more PCC rules and/or the one or more charging control rules required by the H-PCF and/or charging function required by the H-CHF by selecting a H-UPF and sending to the H-UPF a message (e.g. N4 session establishment/modification request) comprising the at least one of the following user plane rules: at least one packet detection rule; at least one forwarding action rule; at least one QoS enforcement rule; or at least one usage reporting rule.

In response to the message received from the H-SMF, the H-UPF may install the user plane rules, send to the H-SMF a response message (e.g. N4 session establishment/modification response), and enforce the user plane rules received from the H-SMF. As an example, the H-UPF may enforce the at least one packet detection rule by matching a user data/traffic packet with service data flow template (e.g. service data flow filters and/or application identifiers), and may apply other user plane rules (e.g. forwarding action rule, QoS enforcement rule, and usage reporting rule) to the data/traffic packets matched the packet detection rule. As an example, the H-UPF may enforce the at least one forwarding action rule by forwarding, duplicating, dropping or buffering a data/traffic packet respectively. As an example, the H-UPF may redirect the traffic to a web portal of the operator. As an example, the H-UPF may enforce the at least one usage reporting rule by measuring network resources usage in terms of traffic data volume, duration (i.e. time) and/or events, according to a measurement method in the usage reporting rule; the H-UPF may report the network resources usage to the H-SMF when the quota/threshold reached, and/or event and/or another trigger is (are) met. As an example, the H-UPF may enforce the at least one QoS enforcement rule by applying at least one of QoS parameters: 5QI, ARP, MBR, GBR to a service data flow; as an example, the H-UPF may enforce the at least one QoS enforcement rule by applying at least one of QoS parameters: Session AMBR and default 5QI/ARP combination to a PDU session.

As an example, the H-SMF and/or H-UPF may enforce the charging control rules by performing at least one of the following actions: receiving, by the H-SMF, a charging control rule from a H-PCF; determining, by the H-SMF, at least one user plane rules comprising at least one of: at least one packet detection rule; at least one forwarding action rule; at least one QoS enforcement rule; or at least one usage reporting rule; sending, by the H-SMF to the H-UPF the at least one user plane rules; enforcing, by the H-UPF, the at least one user plane rules; reporting, by the H-UPF, usage report information to the H-SMF; sending, by the H-SMF, the usage report information to the H-CHF. As an example, the usage report information may comprise network resources usage in terms of traffic data volume, duration (i.e. time) applied to at least one of: a wireless device, a PDU session, a service data flow, an application, a network slice, or a data network.

The H-SMF may determine a home charging policy information based on the accepted/authorized charging policy information received from the H-CHF and/or the first charging policy information received from the V-SMF. The home charging policy information may comprise at least one of: an information element indicating a home charging method/charging type (e.g. online charging, offline charging, or converged charging); an information element indicating at least one home charging level (e.g. PDU session charging; flow based charging; QoS flow based charging; service level charging; or subsystem level charging (e.g. IMS); an information element indicating at least one home charging rate (e.g. rating group); an information element indicating a PDU session identified by a PDU session identifier; an information element indicating a QoS flow identified by an QFI; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; or an information element indicating a network slice identified by a S-NSSAI and/or a network slice instance identifier.

As an example, the home charging policy information may be the same as the accepted/authorized charging policy information. As an example, the home charging policy information may be different from the accepted/authorized charging policy information. As an example, the home charging policy information may be the same as the first charging policy information. As an example, the home charging policy information may be different from the first charging policy information. As an example, the H-SMF may determine the home charging method/charging type (e.g. online charging) based on the accepted/authorized charging method/charging type (e.g. online charging) and/or based on the first charging method/charging type (e.g. converged charging). As an example, the H-SMF may determine the home charging level (e.g. PDU session charging) based on the accepted/authorized charging level (e.g. PDU session charging) and/or the first charging level (e.g. PDU session charging). As an example, the H-SMF may determine the home charging rate (e.g. a charging rate 1) based on the accepted/authorized charging rate (e.g. a flat rate) and/or the first charging rate (e.g. a flat rate). As an example, the H-SMF may determine a home charging policy information based on the first roaming charging profile. As an example, the H-SMF may determine the home charging method/charging type (e.g. online charging) based on the set of chargeable events and associated category of the first roaming charging profile. As an example, the H-SMF may determine the home charging level (e.g. QoS flow based charging) based on a set of thresholds configured in a charging characteristics for QoS flow based charging (QBC) of the first roaming charging profile. As an example, the H-SMF may determine a home roaming charging profile based on the first roaming charging profile.

The H-SMF may send to the V-SMF a response message (e.g. Nsmf_PDUSession_Create Response comprising at least one of: QoS Rule(s), QoS Flow level QoS parameters if needed for the QoS Flow(s) associated with the QoS rule(s), PCO including session level information that the V-SMF is not expected to understand, selected PDU Session Type and SSC mode, H-CN Tunnel Info, QFI(s), QoS profile(s), Session-AMBR, Reflective QoS Timer (if available), information needed by V-SMF in case of EPS interworking such as the PDN Connection Type, User Plane Policy Enforcement. The message sent to the V-SMF from the H-SMF may comprise the home charging policy information. The message sent to the V-SMF from the H-SMF may comprise the home roaming charging profile.

In response to the message received from the H-SMF, the V-SMF may determine a visited charging policy information based on the home charging policy information received from the H-SMF. The visited charging policy information may comprise at least one of: an information element indicating a visited charging method/charging type (e.g. online charging, offline charging, or converged charging); an information element indicating at least one visited charging level (e.g. PDU session charging; flow based charging; QoS flow based charging; service level charging; or subsystem level charging (e.g. IMS); an information element indicating at least one visited charging rate (e.g. rating group); an information element indicating a PDU session identified by a PDU session identifier; an information element indicating a QoS flow identified by an QFI; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; or an information element indicating a network slice identified by a S-NSSAI and/or a network slice instance identifier.

As an example, the visited charging policy information may be the same as the home charging policy information. As an example, the visited charging policy information may be different from the home charging policy information. As an example, the V-SMF may determine the visited charging method/charging type (e.g. converged charging) based on the home charging method/charging type (e.g. online charging). As an example, the V-SMF may determine the visited charging level (e.g. PDU session charging) based on the home charging level (e.g. PDU session charging). As an example, the V-SMF may determine the visited charging rate (e.g. a flat rate) based on the home charging rate (e.g. a flat rate). As an example, the V-SMF may determine the visited charging policy information based on the home roaming charging profile. As an example, the V-SMF may determine the visited charging method/charging type (e.g. online charging) based on the set of chargeable events and associated category of the home roaming charging profile. As an example, the V-SMF may determine the visited charging level (e.g. QoS flow based charging) based on a set of thresholds configured in a charging characteristics for QoS flow based charging (QBC) of the first roaming charging profile. As an example, the V-SMF may determine a visited roaming charging profile based on the home roaming charging profile.

The V-SMF may send to the V-CHF a message (e.g. charging data request [update]) comprising at least one of: the visited charging policy information, the home charging policy information, the visited roaming charging profile, or the home roaming charging profile. The V-CHF may send to the V-SMF a message (e.g. charging data response) indicating the V-CHF may accept the visited charging policy information and/or the visited roaming charging profile comprising. As an example, the V-CHF may indicate to the V-SMF that the V-CHF may accept the home charging policy information and/or the home roaming charging profile. The message sent to the V-SMF by the V-CHF may comprise an information element indicating at least one granted unit (e.g. granted volume and/or granted time for online charging or converged charging) and/or an information element indicating final unit action (e.g. redirect the traffic to a web portal when the final granted unit has been consumed by the wireless device).

The V-SMF may interact with the AMF, in an example, the V-SMF may send to the AMF a Namf_Communication_N1N2MessageTransfer message comprising at least one of: a PDU Session ID, an N2 SM information, or an N1 SM container. The N2 SM information may comprise at least one of: PDU Session ID, QFI(s), QoS Profile(s), CN Tunnel Info, S-NSSAI from the Allowed NSSAI, Session-AMBR, PDU Session Type, User Plane Security Enforcement information, or UE Integrity Protection Maximum Data Rate. The N1 SM container may comprise a PDU Session Establishment Accept, wherein the PDU Session Establishment Accept may comprises at least one of: QoS Rule(s) and QoS Flow level QoS parameters if needed for the QoS Flow(s) associated with the QoS rule(s), selected SSC mode, S-NSSAI(s), DNN, allocated IPv4 address, interface identifier, Session-AMBR, selected PDU Session Type, Reflective QoS Timer (if available), or P-CSCF address(es). In an example, the AMF may interact with (R)AN and UE by sending to the (R)AN a N2 PDU Session Request message comprising at least one of: the N2 SM information or a NAS message. The NAS message may comprise at least one of: a PDU Session ID, and the N1 SM container, wherein the N1 SM container may comprise the PDU Session Establishment Accept. The (R)AN may forward the NAS message to the UE. In an example, the (R)AN may send to the AMF a N2 PDU Session Response message comprising at least one of: PDU Session ID or N2 SM information. The N2 SM information may comprise at least one of: PDU Session ID, AN Tunnel Info, or List of accepted/rejected QFI(s), wherein the AN Tunnel Info may be corresponding to an Access Network address of an N3 tunnel corresponding to the PDU Session.

In an example, the AMF may send to the V-SMF a Nsmf PDUSession UpdateSMContext Request message comprising the N2 SM information received from (R)AN. If the list of rejected QFI(s) is included in N2 SM information, the V-SMF may release the rejected QFI(s) associated QoS profiles. In an example, the V-SMF may initiate an N4 Session Modification procedure with the V-UPF. The V-SMF may provide AN Tunnel Info to the V-UPF as well as the corresponding forwarding rules. The V-UPF may send to the V-SMF a response message. As an example, the V-UPF may report resource usage of a PDU session to the V-SMF. As an example, the V-UPF may report resource usage of a wireless device to the V-SMF. by enforcing the charging control rules, the V-SMF may send to the V-CHF a message (e.g. Charging Data Request [update]) comprising resource usage information received from the V-UPF. In an example, the V-SMF may request quota from V-CHF, e.g. "start of service data flow" event may need quota from V-CHF. As an example, for online charging or converged charging, the V-SMF may request quota from V-CHF when allocated quota is consumed or a trigger is met to request a quota. As an example, in the message sent to the V-CHF, the V-SMF may report to the V-CHF counts of rejected QFI(s). In an example, the V-CHF may update CDR for this PDU session. The V-CHF may acknowledge the SMF by sending a Charging Data Response message comprising quota information for the wireless device. In an example, the V-SMF may send to the AMF a Nsmf_PDUSession_UpdateSMContext Response message.

Figure 20:
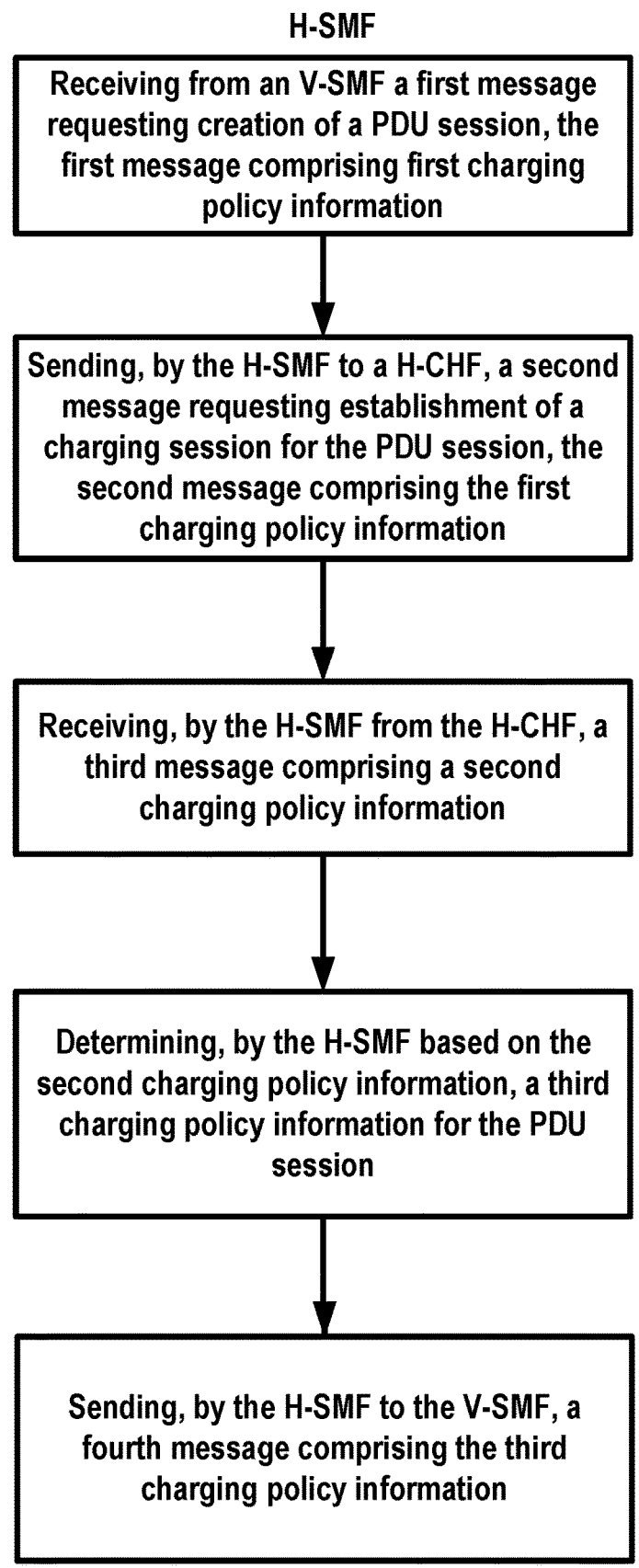
FIG. 20 is an example diagram depicting the procedures of H-SMF as per an aspect of an embodiment of the present disclosure.

The V-SMF may send to the H-SMF a message (e.g. PDU session update request) comprising the rejected QFI(s). The H-SMF may update QoS rules and QoS Flow level QoS parameters accordingly. The H-SMF may update the session with H-UPF (e.g. N4 session). The H-SMF may send to the H-CHF a message (e.g. Charging Data Request [update]) to report that the Counts per rejected QFI(s) may be closed. The H-CHF may update CDR and acknowledge the H-SMF by sending a charging data response [Update] message to the H-SMF. FIG. 20 is an example diagram depicting the procedures of H-SMF as per an aspect of an embodiment of the present disclosure.

Figure 14:
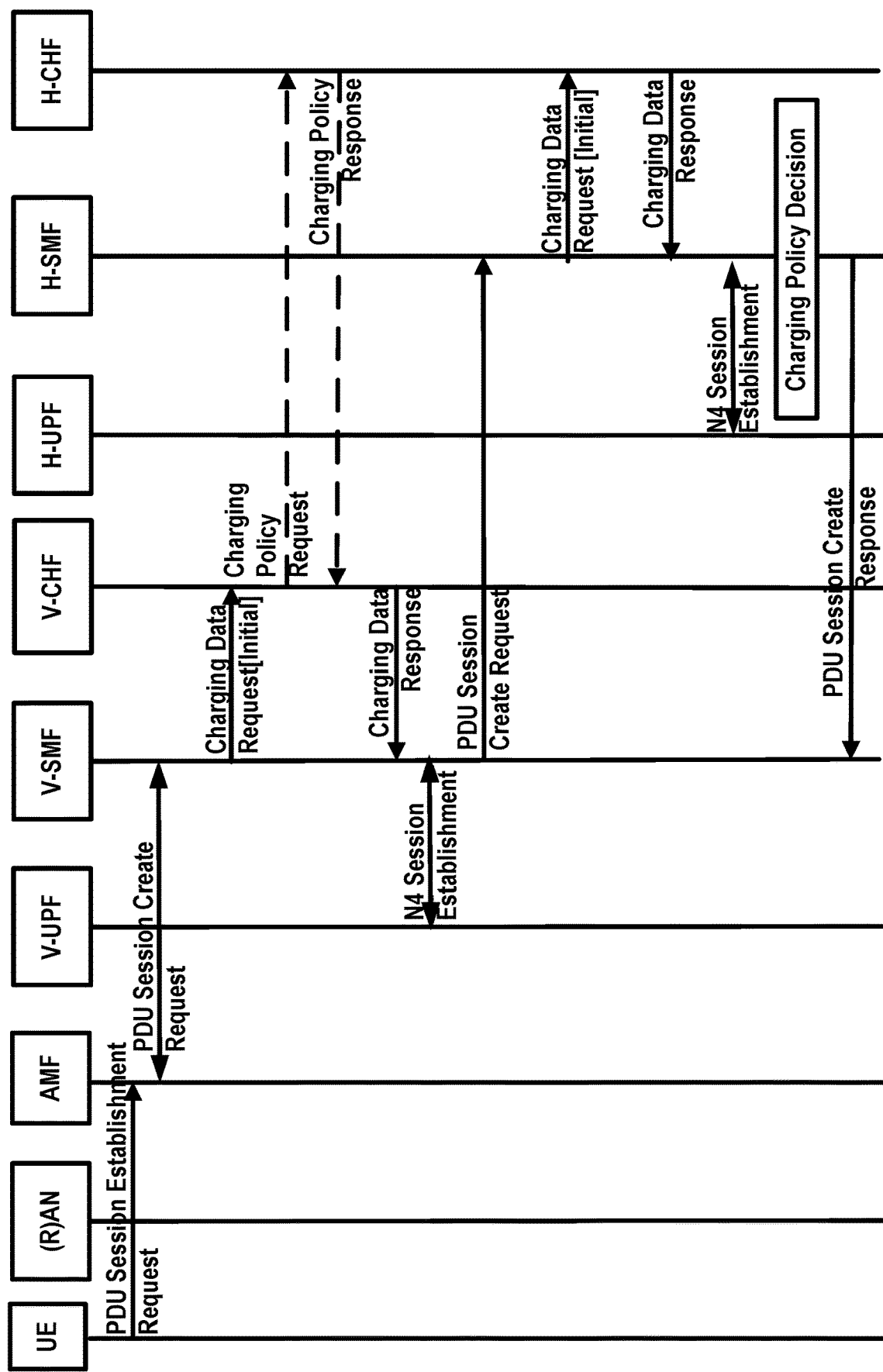
FIG. 14 and FIG. 15 are example call flows of charging policy information negotiation between a V-CHF and a H-CHF as per an aspect of an embodiment of the present disclosure.
Figure 15:
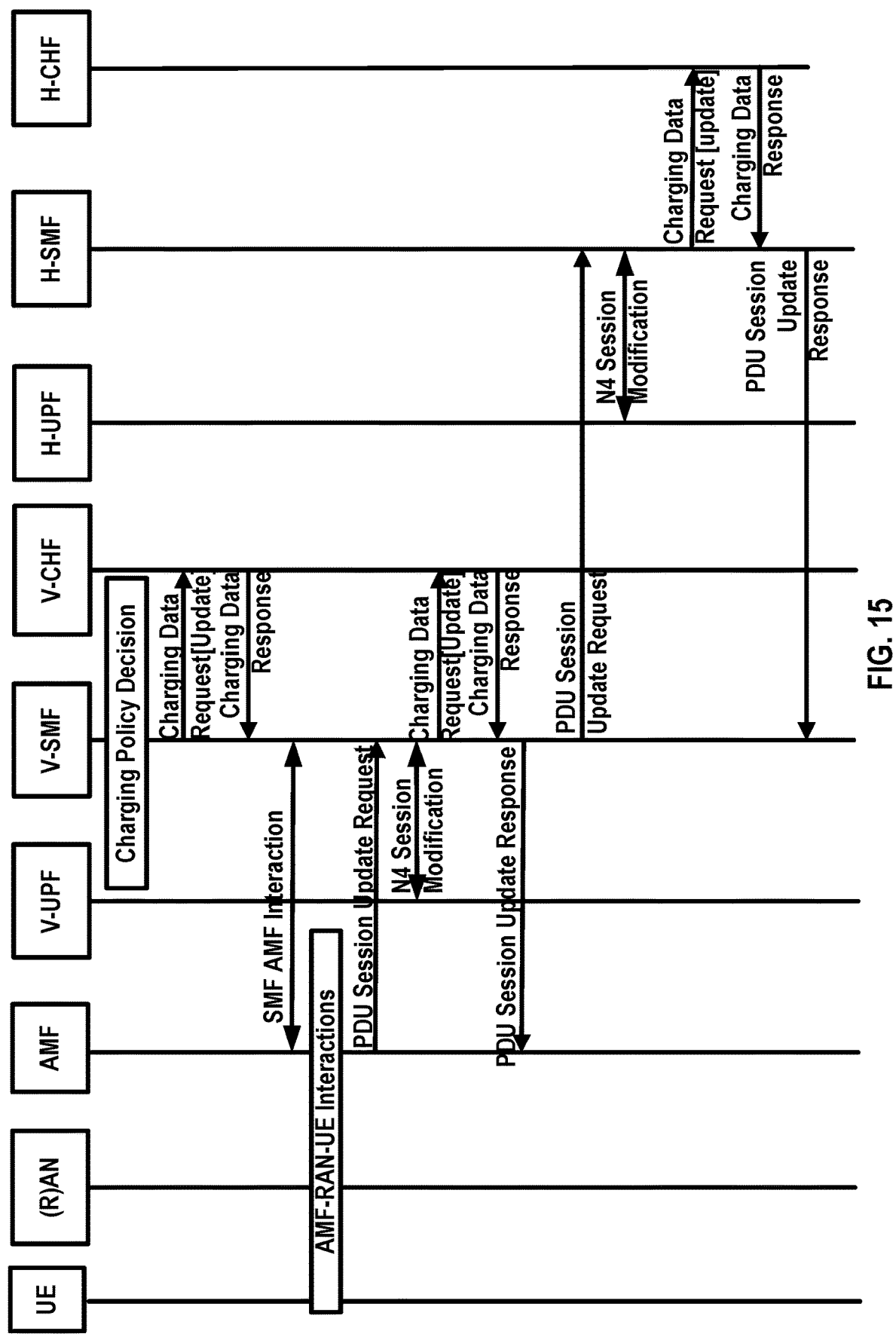

FIG. 14 and FIG. 15 are example call flows of charging policy information negotiation between a V-CHF and a H-CHF as per an aspect of an embodiment of the present disclosure.

A UE may send to an AMF a NAS message comprising at least one of: S-NSSAI(s), DNN, PDU Session ID, Request type, or N1 SM container (PDU session establishment request). The UE may initiate a UE requested PDU session establishment procedure by the transmission of a NAS message comprising a PDU session establishment request message within the N1 SM container. The PDU session establishment request message may comprise at least one of: a PDU session ID, Requested PDU Session Type, or a Requested SSC mode, etc. In response to the message received from the UE, the AMF may select a visited SMF (e.g. V-SMF), the AMF may also select an SMF in HPLMN (e.g. H-SMF) by using the S-NSSAI with the value defined by the HPLMN. The AMF may send to the V-SMF a message (e.g. PDUSession_CreateSMContext Request) comprising at least one of: SUPI, DNN, S-NSSAI(s) and/or network slice instance identifier(s), PDU Session ID, AMF ID, Request Type, visited PCF identifier, home PCF identifier, Priority Access, User location information, Access Type, PEI, or an N1 SM container, wherein the N1 SM container may comprise a PDU Session Establishment Request. As an example, the message sent to the V-SMF may comprise the identity of the H-SMF, and both the S-NSSAI from the Allowed NSSAI and the corresponding Subscribed S-NSSAI. In response to the message received from the AMF, the V-SMF may send to the AMF a response message (e.g. PDUSession_CreateSMContext Response) comprising at least one of: Cause, SM Context ID or N1 SM container (PDU Session Reject (Cause)).

The UE may be identified as a roamer (e.g. PLMN ID of the received SUPI may be different from VPLMN PLMN ID), a visited CHF (e.g. V-CHF) may be selected accordingly. In an example, the V-SMF may select a V-CHF by a Visited NRF (e.g. V-NRF). FIG. 24 is an example call flow of selecting a V-CHF by a V-NRF, which may comprise one or more actions. In an example action, the V-SMF may send to a V-NRF a message (e.g. a CHF Selection Request message, or a Nnrf_NFDiscovery_Request message) comprising an information element indication a request to select a V-CHF. The message sent from the V-SMF to the V-NRF may comprise PDU session related information. The PDU session related information may comprise at least one of: at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); the PLMN identifier; an application identifier; the DNN, the S-NSSAI(s) and/or network slice instance identifier(s), the PDU Session ID, the user location information, or the information of the V-SMF for the PDU session (e.g. V-SMF identifier, IP address and/or FQDN of the V-SMF). In an example action, in response to the message received from the V-SMF, the V-NRF may determine/select at least one V-CHF based on the information received from the V-SMF, and/or the UE subscription information received from a UDR, and/or local configuration and operator policies, and/or other information for the PDU session. As an example, the V-NRF may select a V-CHF based on one or more combination information received from the V-SMF. As an example, the V-NRF may select a V-CHF based on the UE IP address (e.g. UE IPv4 address and/or UE IPv6 network prefix). As an example, the V-NRF may select a CHF based on the Type of PDU Session (e.g. IPv4, IPv6, IPv4v6, Ethernet, Unstructured). As an example, the V-NRF may select a V-CHF based on the PDU Session ID. As an example, the V-NRF may select a V-CHF based on the Access Type and/or the RAT type. As an example, the V-NRF may select a V-CHF based on the application identifier. As an example, the V-NRF may select a V-CHF based on the information of the V-SMF for the PDU session (e.g. V-SMF identifier, IP address or FQDN of the V-SMF). As an example, the V-NRF may select a V-CHF based on the user location information. In an example action, the V-NRF may send to the V-SMF a message (e.g. a CHF Selection Response message, or a Nnrf_NFDiscovery_Request Response message) comprising the information of the at least one selected V-CHF (e.g. V-CHF identifier, IP address and/or FQDN of the at least one selected V-CHF).

The V-SMF may send to the V-CHF a message (e.g. charging policy request, or a charging data request [initial]) requesting at least one charging policy information. The message sent to the V-CHF may comprise PDU session information. The PDU session information may comprise at least one of: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the allocated application instance identifier; the DNN, the S-NSSAI(s) and/or network slice instance identifier(s), the PDU Session ID, the user location information, the information of the V-SMF for the PDU session (e.g. V-SMF identifier, IP address or FQDN of the V-SMF), at least one service data flow filter for at least one service data flow; at least one QFI for at least one QoS flow; or at least one identifier for at least one subsystem (e.g. an identifier of an IMS subsystem). The message sent to the V-CHF may indicate that the UE may be an in-bound roamer.

In response to the message received from the V-SMF, the V-CHF may open a CDR comprising an indication of in-bound roamer. The V-CHF may determine/generate/create/derive a first charging policy information based on the information received from the V-SMF. The first charging policy information may comprise an information element indicating a first charging method/charging type, wherein the first charging method/charging type may comprise at least one of: online charging, offline charging, or converged charging. The first charging policy information may comprise an information element indicating a first charging level, wherein the first charging level may comprise at least one of: an information element indicating a PDU session charging; an information element indicating a flow based charging; an information element indicating a QoS flow based charging; an information element indicating a service level charging; or an information element indicating a subsystem level charging (e.g. IMS). The first charging policy information may comprise an information element indicating at least one first charging rate. The first charging policy information may comprise an information element indicating at least one first identifier or address of a CHF. The first charging policy information may comprise at least one of: the PDU Session ID, the at least one service data flow filter, the at least one QFI, the application identifier; the allocated application instance identifier; the DNN, the S-NSSAI(s) and/or network slice instance identifier(s), or the UE identity. The first charging policy information may be applied to at least one of: a PDU session identified by a PDU session identifier; a service data flow identified by at least one service data flow filter; a QoS flow identified by an QFI; an application identified by an application identifier and/or an application instance identifier; a wireless device identified by at least one UE identity (e.g. SUPI, PEI, and/or GPSI); a data network identified by a DNN; or a network slice identified by a S-NSSAI and/or a network slice instance identifier.

As an example, the V-CHF may determine the first charging policy information based on the UE identity, e.g. the V-CHF may determine an online charging and/or a QoS flow based charging and/or a charging rate and/or an IP address (e.g. IPv4 address and/or IPv6 network prefix) of V-CHF for an SUPI. As an example, the V-CHF may determine the first charging policy information based on the type of PDU session, e.g. the V-CHF may determine an offline charging and/or a PDU session charging and/or a flat charging rate and/or an IPv4 address of V-CHF for an IPv4 type PDU session. As an example, the V-CHF may determine the first charging policy information based on the Access Type and/or the RAT Type, e.g. the V-CHF may determine an online charging and/or a flow based charging and/or a charging rate and/or an IP address (e.g. IPv4 address and/or IPv6 network prefix) of V-CHF for an 3GPP access and/or 3GPP-NR-FDD RAT type. As an example, the V-CHF may determine the first charging policy information based on the PLMN identifier, e.g. the V-CHF may determine an offline charging and/or a PDU session charging and/or a flat charging rate and/or an FQDN of V-CHF for an PLMN identifier "12345". As an example, the V-CHF may determine the first charging policy information based on the application identifier, e.g. the V-CHF may determine an online charging and/or a service level charging and/or a charging rate and/or an identifier of V-CHF for an application identifier "skype". As an example, the V-CHF may determine the first charging policy information based on the DNN, e.g. the V-CHF may determine an offline charging and/or a subsystem level charging and/or a flat charging rate and/or an IPv4 address of V-CHF for an DNN "IMS". As an example, the V-CHF may determine the first charging policy information based on the network slice, e.g. the V-CHF may determine an online charging and/or a PDU session charging and/or a charging rate and/or an IPv6 network prefix of V-CHF for an S-NSSAI and/or network slice instance(s). As an example, the V-CHF may determine the first charging policy information based on the PDU session identifier, e.g. the V-CHF may determine an online charging and/or PDU session charging and/or a charging rate and/or an IPv4 address of V-CHF for an PDU session identifier "PDU session 1". As an example, the V-CHF may determine the first charging policy information based on the user location information, e.g. the V-CHF may determine an offline charging and/or a QoS flow based charging and/or a charging rate and/or an IP address (e.g. IPv4 address and/or IPv6 network prefix) of V-CHF for a wireless device located within "registration area 1". As an example, the V-CHF may determine the first charging policy information based on the information of the V-SMF for the PDU session (e.g. V-SMF identifier, IP address or FQDN of the V-SMF). As an example, the V-CHF may determine a first roaming charging profile based on the information received from the V-SMF. The first roaming charging profile may be applied to a visited PLMN. The first roaming charging profile may comprise at least one of: a set of chargeable events and associated category; a set of thresholds configured in a charging characteristics for QoS flow based charging (QBC); or a default partial record mechanism indicated as the one used by the V-CHF.

The V-CHF may select a home CHF (e.g. H-CHF) based on the PDU session information. The V-CHF may send to H-CHF a message (e.g. charging policy request) requesting charging policy information for the PDU session. The message sent to the H-CHF may comprise the first charging policy information and/or the first roaming charging profile. The message sent to the H-CHF may comprise at least one of: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the allocated application instance identifier; the DNN, the S-NSSAI(s) and/or network slice instance identifier(s), the PDU Session ID, the user location information, the information of the V-SMF for the PDU session (e.g. V-SMF identifier, IP address or FQDN of the V-SMF), at least one service data flow filter for at least one service data flow; at least one QFI for at least one QoS flow; or at least one identifier for at least one subsystem (e.g. an identifier of an IMS subsystem).

In response to the message received from the V-CHF, the H-CHF may determine/generate/create/derive second charging policy information based on the information received from the V-CHF. The second charging policy information may comprise an information element indicating a second charging method/charging type, wherein the second charging method/charging type may comprise at least one of: online charging, offline charging, or converged charging. The second charging policy information may comprise an information element indicating a second charging level, wherein the second charging level may comprise at least one of: an information element indicating a PDU session charging; an information element indicating a flow based charging; an information element indicating a QoS flow based charging; an information element indicating a service level charging; or an information element indicating a subsystem level charging (e.g. IMS). The second charging policy information may comprise an information element indicating at least one second charging rate. The second charging policy information may comprise an information element indicating at least one second identifier or address of a CHF. The second charging policy information may comprise at least one of: the PDU Session ID, the at least one service data flow filter, the at least one QFI, the application identifier; the allocated application instance identifier; the DNN, the S-NSSAI(s) and/or network slice instance identifier(s), or the UE identity. The second charging policy information may be applied to at least one of: a PDU session identified by a PDU session identifier; a service data flow identified by at least one service data flow filter; a QoS flow identified by an QFI; an application identified by an application identifier and/or an application instance identifier; a wireless device identified by at least one UE identity (e.g. SUPI, PEI, and/or GPSI); a data network identified by a DNN; a network slice identified by a S-NSSAI and/or a network slice instance identifier; or at least one identifier for at least one subsystem (e.g. an identifier of an IMS subsystem).

As an example, the H-CHF may determine the second charging policy information (e.g. second charging method/charging type, second charging level, second charging rate) based on the first charging policy information (e.g. first charging method/charging type, first charging level, first charging rate). As an example, the second charging policy information may be the same as the first charging policy information. As an example, the second charging policy information may be different from the first charging policy information. As an example, the H-CHF may determine the second charging method/charging type (e.g. online charging) based on the first charging method/charging type (e.g. converged charging). As an example, the H-CHF may determine the second charging level (e.g. PDU session charging) based on the first charging level (e.g. PDU session charging). As an example, the H-CHF may determine the second charging rate (e.g. a flat rate) based on the first charging rate (e.g. a flat rate). As an example, the H-CHF may determine the second identifier or address of the CHF (e.g. H-CHF) based on the first identifier or address of the CHF (e.g. V-CHF). As an example, the H-CHF may determine the second charging policy information based on the first roaming charging profile. As an example, the H-CHF may determine the second charging method/charging type (e.g. online charging) based on the set of chargeable events and associated category of the first roaming charging profile. As an example, the H-CHF may determine the second charging level (e.g. QoS flow based charging) based on a set of thresholds configured in a charging characteristics for QoS flow based charging (QBC) of the first roaming charging profile. As an example, the H-CHF may determine the second charging policy information based on the UE identity, e.g. the H-CHF may determine an online charging and/or a QoS flow based charging and/or a charging rate and/or an IP address (e.g. IPv4 address and/or IPv6 network prefix) of H-CHF for an SUPI. As an example, the H-CHF may determine the second charging policy information based on the type of PDU session, e.g. the H-CHF may determine an offline charging and/or a PDU session charging and/or a flat charging rate and/or an IPv4 address of H-CHF for an IPv4 type PDU session. As an example, the H-CHF may determine the second charging policy information based on the Access Type and/or the RAT Type, e.g. the H-CHF may determine an online charging and/or a flow based charging and/or a charging rate and/or an IP address (e.g. IPv4 address and/or IPv6 network prefix) of H-CHF for an 3GPP access and/or 3GPP-NR-FDD RAT type. As an example, the H-CHF may determine the second charging policy information based on the PLMN identifier, e.g. the H-CHF may determine an offline charging and/or a PDU session charging and/or a flat charging rate and/or an FQDN of H-CHF for an PLMN identifier "12345". As an example, the H-CHF may determine the second charging policy information based on the application identifier, e.g. the H-CHF may determine an online charging and/or a service level charging and/or a charging rate and/or an identifier of H-CHF for an application identifier "skype". As an example, the H-CHF may determine the second charging policy information based on the DNN, e.g. the H-CHF may determine an offline charging and/or a subsystem level charging and/or a flat charging rate and/or an IPv4 address of H-CHF for an DNN "IMS". As an example, the H-CHF may determine the second charging policy information based on the network slice, e.g. the H-CHF may determine an online charging and/or a PDU session charging and/or a charging rate and/or an IPv6 network prefix of H-CHF for an S-NSSAI and/or network slice instance(s). As an example, the H-CHF may determine the second charging policy information based on the PDU session identifier, e.g. the H-CHF may determine an online charging and/or PDU session charging and/or a charging rate and/or an IPv4 address of H-CHF for an PDU session identifier "PDU session 1". As an example, the H-CHF may determine the second charging policy information based on the user location information, e.g. the H-CHF may determine an offline charging and/or a QoS flow based charging and/or a charging rate and/or an IP address (e.g. IPv4 address and/or IPv6 network prefix) of H-CHF for a wireless device located within "registration area 1". As an example, the H-CHF may determine the second charging policy information based on the V-CHF information (e.g. address of the V-CHF and/or identifier the of V-CHF). As an example, the H-CHF may determine a second roaming charging profile based on the first roaming charging profile.

The H-CHF may send a response message (e.g. charging policy response) to the V-CHF comprising the second charging policy information. The response message sent to the V-CHF may comprise the second roaming charging profile. The message sent to the V-CHF may comprise at least one of: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the DNN, the S-NSSAI(s) and/or network slice instance identifier(s), or the PDU Session ID. As an example, HTTP protocol may be used for the communication between the H-CHF and the V-CHF. FIG. 19 shows example definitions of information element for the charging policy information comprising charging method, charging level, charging rate and address of H-CHF, wherein XML structure of simple elements and/or groups may be used as HTTP message content. As an example, the transaction (e.g. a charging policy request message and a charging policy response message) between V-CHF and H-CHF may establish a charging control session between the V-CHF and the H-CHF. The V-CHF and the H-CHF may establish a charging control session for a wireless device, and/or a PDU session, and/or a DNN, and/or a network slice.

The V-CHF may send a response message (e.g. charging policy response, or a charging data response) to the V-SMF comprising the second charging policy information. The response message sent to the V-SMF may comprise the first roaming charging profile and/or the second roaming charging profile. The message sent to the V-SMF may comprise at least one of: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the allocated application instance identifier; the DNN, the S-NSSAI(s) and/or network slice instance identifier(s), the PDU Session ID, the user location information, the information of the V-SMF for the PDU session (e.g. V-SMF identifier, IP address or FQDN of the V-SMF), at least one service data flow filter for at least one service data flow; at least one QFI for at least one QoS flow; or at least one identifier for at least one subsystem (e.g. an identifier of an IMS subsystem).

As an example, HTTP protocol may be used for the communication between the V-CHF and the V-SMF. FIG. 19 shows example definitions of information element for the first charging policy information comprising charging method, charging level, charging rate and address of V-CHF, wherein XML structure of simple elements and/or groups may be used as HTTP message content. As an example, the transaction (e.g. a charging policy request message and a charging policy response message; or a charging data request message and a charging data response message) between V-SMF and V-CHF may establish a charging control session between the V-SMF and V-CHF. The V-SMF and V-CHF may establish a charging control session for a wireless device, and/or a PDU session, and/or a DNN, and/or a network slice, and/or a QoS flow.

The V-SMF may send to a V-UPF a message (e.g. N4 Session Establishment/Modification Request) comprising packet detection, enforcement and reporting rules to be installed on the V-UPF for the PDU Session. If CN Tunnel Info is allocated by the V-SMF, the CN Tunnel Info may be provided to V-UPF. The V-UPF may acknowledge the V-SMF by sending e.g. an N4 Session Establishment/Modification Response. If CN Tunnel Info is allocated by the V-UPF, the CN Tunnel Info may be provided to the V-SMF.

The V-SMF may send to the H-SMF a message (e.g. Nsmf_PDUSession_Create Request) comprising at least one of: SUPI, GPSI (if available), DNN, S-NSSAI with the value defined by the HPLMN, PDU Session ID, V-SMF ID, V-CN-Tunnel-Info, PDU Session Type, PCO, Number Of Packet Filters, User location information, Access Type, home PCF identifier, SM PDU DN Request Container, or DNN Selection Mode. The message sent to the H-SMF from the V-SMF may comprise the first roaming charging profile and/or the second roaming charging profile. The message sent to the H-SMF from the V-SMF may comprise the first charging policy information and/or the second charging policy information. As an example, the second roaming charging profile sent to the H-SMF may comprise the second charging policy information.

In response to the message received from the V-SMF, the H-SMF may select a H-CHF and may send a message (e.g. charging data request [initial]) to the H-CHF. The message sent to the H-CHF may comprise the second charging policy information. The message sent to the H-CHF may comprise the second roaming charging profile.

In response to the message received from the H-SMF, the H-CHF may verify the information received and determine whether to accept the charging session request. As an example, the H-CHF may accept the request. The H-CHF may update the second charging policy information by determining an accepted/authorized charging policy information (e.g. comprising accepted/authorized charging method/charging type, accepted/authorized charging level, and/or accepted/authorized charging rate, etc.) based on the information received from the H-SMF. As an example, the H-CHF may update the second roaming charging profile by determining an accepted/authorized roaming charging profile based on the information received from the H-SMF.

The H-CHF may send to the H-SMF a response message (e.g. charging data response) comprising the accepted/authorized charging policy information and/or the accepted/authorized roaming charging profile. As an example, the accepted/authorized charging policy information may be the same as the second charging policy information. As an example, the accepted/authorized roaming charging profile may be the same as the second roaming charging profile. As an example, the response message may comprise at least one of: an information element indicating a success cause value to indicate the request is accepted; an information element indicating an accepted/authorized charging method/charging type, wherein the accepted charging method/charging type may comprise at least one of: online charging, offline charging, or converged charging; an information element indicating at least one accepted/authorized charging level (e.g. PDU session charging; flow based charging; QoS flow based charging; service level charging; or subsystem level charging (e.g. IMS); an information element indicating at least one accepted/authorized charging rate (e.g. rating group); an information element indicating at least one granted unit (e.g. granted volume and/or granted time for online charging or converged charging); an information element indicating final unit action (e.g. redirect the traffic to a web portal when the final granted unit has been consumed by the wireless device); an information element indicating a PDU session identified by a PDU session identifier; an information element indicating a QoS flow identified by an QFI; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; or an information element indicating a network slice identified by a S-NSSAI and/or a network slice instance identifier.

As an example, the H-CHF may reject the request, and may send to the H-SMF a response message (e.g. charging data response) comprising a proposed/accepted charging policy information. The response message may comprise at least one of: an information element indicating a reject cause value to indicate the request is rejected; an information element indicating an accepted/proposed charging method/charging type (e.g. online charging, offline charging, or converged charging); an information element indicating at least one accepted/authorized charging level (e.g. PDU session charging; flow based charging; QoS flow based charging; service level charging; or subsystem level charging (e.g. IMS); or an information element indicating at least one accepted/authorized charging rate.

In response to the message received from the H-CHF, the H-SMF may take different actions based on the result of the response. As an example, when receiving a reject response message from the H-CHF, the H-SMF may resend to the H-CHF a second request message (e.g. charging data request [update]) comprising the accepted/authorized charging policy information proposed by the H-CHF. The H-CHF may accept the second request by sending to the H-SMF a second response message (e.g. charging data response) comprising a success cause value indicating the request is accepted. As an example, when receiving a reject response message from the H-CHF, the H-SMF may select a second H-CHF and send a request message (e.g. charging data request) to the second H-CHF to establish a charging session.

As an example, the H-SMF may select a H-UPF and send to the H-UPF a message (e.g. N4 session establishment/modification request) comprising at least one of the following user plane rules: at least one packet detection rule; at least one forwarding action rule; at least one QoS enforcement rule; or at least one usage reporting rule.

In response to the message received from the H-SMF, the H-UPF may install the user plane rules, send to the H-SMF a response message (e.g. N4 session establishment/modification response), and enforce the user plane rules received from the H-SMF.

The H-SMF may determine a home charging policy information based on the accepted/authorized charging policy information received from the H-CHF and/or the first charging policy information received from the V-SMF. The home charging policy information may comprise at least one of: an information element indicating a home charging method/charging type (e.g. online charging, offline charging, or converged charging); an information element indicating at least one home charging level (e.g. PDU session charging; flow based charging; QoS flow based charging; service level charging; or subsystem level charging (e.g. IMS); an information element indicating at least one home charging rate (e.g. rating group); an information element indicating a PDU session identified by a PDU session identifier; an information element indicating a QoS flow identified by an QFI; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; or an information element indicating a network slice identified by a S-NSSAI and/or a network slice instance identifier.

As an example, the home charging policy information may be the same as the accepted/authorized charging policy information. As an example, the home charging policy information may be different from the accepted/authorized charging policy information. As an example, the home charging policy information may be the same as the first charging policy information. As an example, the home charging policy information may be different from the first charging policy information. As an example, the H-SMF may determine the home charging method/charging type (e.g. online charging) based on the accepted/authorized charging method/charging type (e.g. online charging) and/or based on the first charging method/charging type (e.g. converged charging). As an example, the H-SMF may determine the home charging level (e.g. PDU session charging) based on the accepted/authorized charging level (e.g. PDU session charging) and/or the first charging level (e.g. PDU session charging). As an example, the H-SMF may determine the home charging rate (e.g. a charging rate 1) based on the accepted/authorized charging rate (e.g. a flat rate) and/or the first charging rate (e.g. a flat rate). As an example, the H-SMF may determine the home charging policy information based on the first roaming charging profile. As an example, the H-SMF may determine the home charging method/charging type (e.g. online charging) based on the set of chargeable events and associated category of the first roaming charging profile. As an example, the H-SMF may determine the home charging level (e.g. QoS flow based charging) based on a set of thresholds configured in a charging characteristics for QoS flow based charging (QBC) of the first roaming charging profile. As an example, the H-SMF may determine a home roaming charging profile based on the first roaming charging profile and/or the accepted/authorized roaming charging profile.

The H-SMF may send to the V-SMF a response message (e.g. Nsmf_PDUSession_Create Response comprising at least one of: QoS Rule(s), QoS Flow level QoS parameters if needed for the QoS Flow(s) associated with the QoS rule(s), PCO including session level information that the V-SMF is not expected to understand, selected PDU Session Type and SSC mode, H-CN Tunnel Info, QFI(s), QoS profile(s), Session-AMBR, Reflective QoS Timer (if available), information needed by V-SMF in case of EPS interworking such as the PDN Connection Type, User Plane Policy Enforcement. The message sent to the V-SMF from the H-SMF may comprise the home charging policy information. The message sent to the V-SMF from the H-SMF may comprise the home roaming charging profile.

In response to the message received from the H-SMF, the V-SMF may determine a visited charging policy information based on the home charging policy information received from the H-SMF. The visited charging policy information may comprise at least one of: an information element indicating a visited charging method/charging type (e.g. online charging, offline charging, or converged charging); an information element indicating at least one visited charging level (e.g. PDU session charging; flow based charging; QoS flow based charging; service level charging; or subsystem level charging (e.g. IMS); an information element indicating at least one visited charging rate (e.g. rating group); an information element indicating a PDU session identified by a PDU session identifier; an information element indicating a QoS flow identified by an QFI; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; or an information element indicating a network slice identified by a S-NSSAI and/or a network slice instance identifier.

As an example, the visited charging policy information may be the same as the home charging policy information. As an example, the visited charging policy information may be different from the home charging policy information. As an example, the V-SMF may determine the visited charging method/charging type (e.g. converged charging) based on the home charging method/charging type (e.g. online charging). As an example, the V-SMF may determine the visited charging level (e.g. PDU session charging) based on the home charging level (e.g. PDU session charging). As an example, the V-SMF may determine the visited charging rate (e.g. a flat rate) based on the home charging rate (e.g. a flat rate). As an example, the V-SMF may determine the visited charging policy information based on the home roaming charging profile. As an example, the V-SMF may determine the visited charging method/charging type (e.g. online charging) based on the set of chargeable events and associated category of the home roaming charging profile. As an example, the V-SMF may determine the visited charging level (e.g. QoS flow based charging) based on a set of thresholds configured in a charging characteristics for QoS flow based charging (QBC) of the first roaming charging profile. As an example, the V-SMF may determine a visited roaming charging profile based on the home roaming charging profile.

The V-SMF may send to the V-CHF a message (e.g. charging data request [update]) comprising at least one of: the visited charging policy information, the home charging policy information, the visited roaming charging profile, or the home roaming charging profile. The V-CHF may send to the V-SMF a message (e.g. charging data response) indicating the V-CHF may accept the visited charging policy information and/or the visited roaming charging profile comprising. As an example, the V-CHF may indicate to the V-SMF that the V-CHF may accept the home charging policy information and/or the home roaming charging profile. The message sent to the V-SMF by the V-CHF may comprise an information element indicating at least one granted unit (e.g. granted volume and/or granted time for online charging or converged charging) and/or an information element indicating final unit action (e.g. redirect the traffic to a web portal when the final granted unit has been consumed by the wireless device).

The V-SMF may interact with the AMF, in an example, the V-SMF may send to the AMF a Namf_Communication_N1N2MessageTransfer message comprising at least one of: a PDU Session ID, an N2 SM information, or an N1 SM container. The N2 SM information may comprise at least one of: PDU Session ID, QFI(s), QoS Profile(s), CN Tunnel Info, S-NSSAI from the Allowed NSSAI, Session-AMBR, PDU Session Type, User Plane Security Enforcement information, or UE Integrity Protection Maximum Data Rate. The N1 SM container may comprise a PDU Session Establishment Accept, wherein the PDU Session Establishment Accept may comprises at least one of: QoS Rule(s) and QoS Flow level QoS parameters if needed for the QoS Flow(s) associated with the QoS rule(s), selected SSC mode, S-NSSAI(s), DNN, allocated IPv4 address, interface identifier, Session-AMBR, selected PDU Session Type, Reflective QoS Timer (if available), or P-CSCF address(es). In an example, the AMF may interact with (R)AN and UE by sending to the (R)AN a N2 PDU Session Request message comprising at least one of: the N2 SM information or a NAS message. The NAS message may comprise at least one of: a PDU Session ID, and the N1 SM container, wherein the N1 SM container may comprise the PDU Session Establishment Accept. The (R)AN may forward the NAS message to the UE. In an example, the (R)AN may send to the AMF a N2 PDU Session Response message comprising at least one of: PDU Session ID or N2 SM information. The N2 SM information may comprise at least one of: PDU Session ID, AN Tunnel Info, or List of accepted/rejected QFI(s), wherein the AN Tunnel Info may be corresponding to an Access Network address of an N3 tunnel corresponding to the PDU Session.

In an example, the AMF may send to the V-SMF a Nsmf_PDUSession_UpdateSMContext Request message comprising the N2 SM information received from (R)AN. If the list of rejected QFI(s) is included in N2 SM information, the V-SMF may release the rejected QFI(s) associated QoS profiles. In an example, the V-SMF may initiate an N4 Session Modification procedure with the V-UPF. The V-SMF may provide AN Tunnel Info to the V-UPF as well as the corresponding forwarding rules. The V-UPF may send to the V-SMF a response message. As an example, the V-UPF may report resource usage of a PDU session to the V-SMF. As an example, the V-UPF may report resource usage of a wireless device to the V-SMF. by enforcing the charging control rules, the V-SMF may send to the V-CHF a message (e.g. Charging Data Request [update]) comprising resource usage information received from the V-UPF. In an example, the V-SMF may request quota from V-CHF, e.g. "start of service data flow" event may need quota from V-CHF. As an example, for online charging or converged charging, the V-SMF may request quota from V-CHF when allocated quota is consumed or a trigger is met to request a quota. As an example, in the message sent to the V-CHF, the V-SMF may report to the V-CHF counts of rejected QFI(s). In an example, the V-CHF may update CDR for this PDU session. The V-CHF may acknowledge the SMF by sending a Charging Data Response message comprising quota information for the wireless device. In an example, the V-SMF may send to the AMF a Nsmf_PDUSession_UpdateSMContext Response message.

Figure 21:
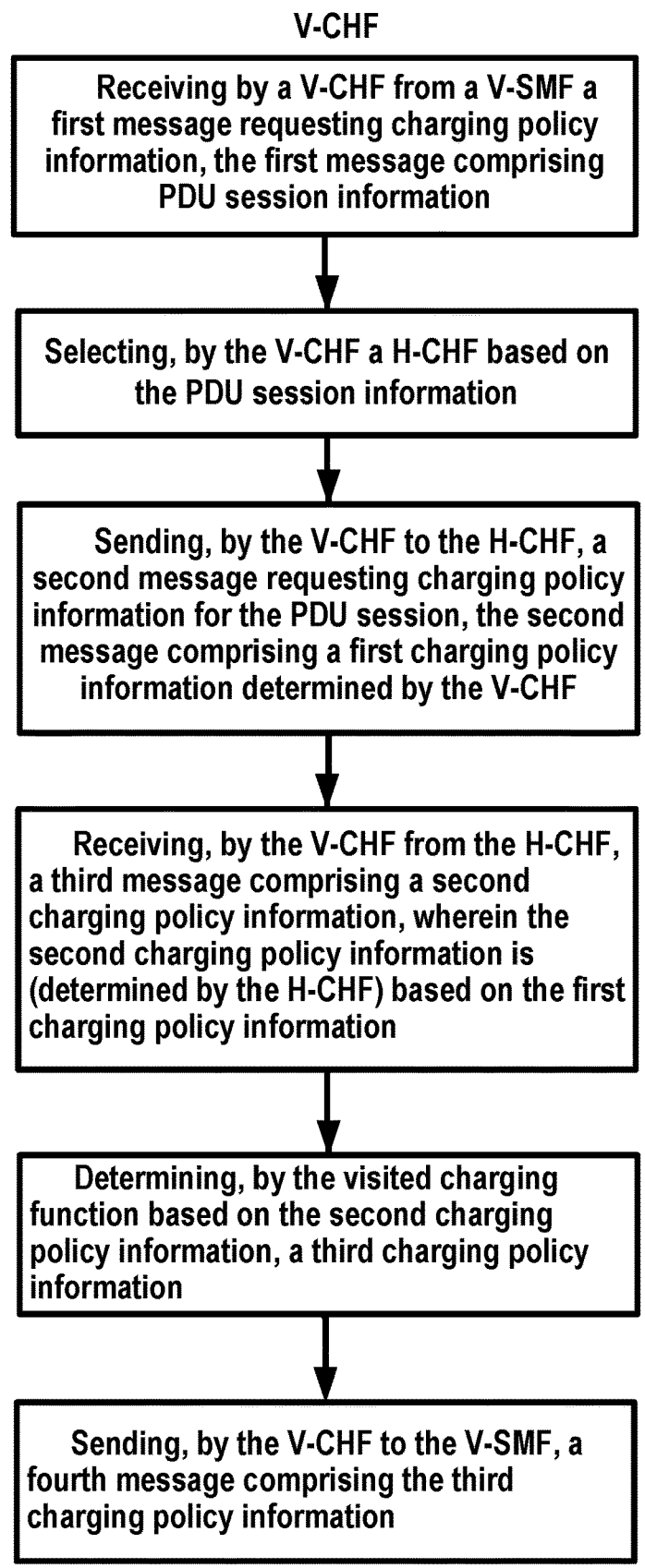
FIG. 21 is an example diagram depicting the procedures of V-CHF as per an aspect of an embodiment of the present disclosure.

The V-SMF may send to the H-SMF a message (e.g. PDU session update request) comprising the rejected QFI(s). The H-SMF may update QoS rules and QoS Flow level QoS parameters accordingly. The H-SMF may update the session with H-UPF (e.g. N4 session). The H-SMF may send to the H-CHF a message (e.g. Charging Data Request [update]) to report that the Counts per rejected QFI(s) may be closed. The H-CHF may update CDR and acknowledge the H-SMF by sending a charging data response [Update] message to the H-SMF. The H-SMF may send to the V-SMF a response message (e.g. PDU session update response). FIG. 21 are example diagram depicting the procedures of V-CHF as per an aspect of an embodiment of the present disclosure.

Figure 16:
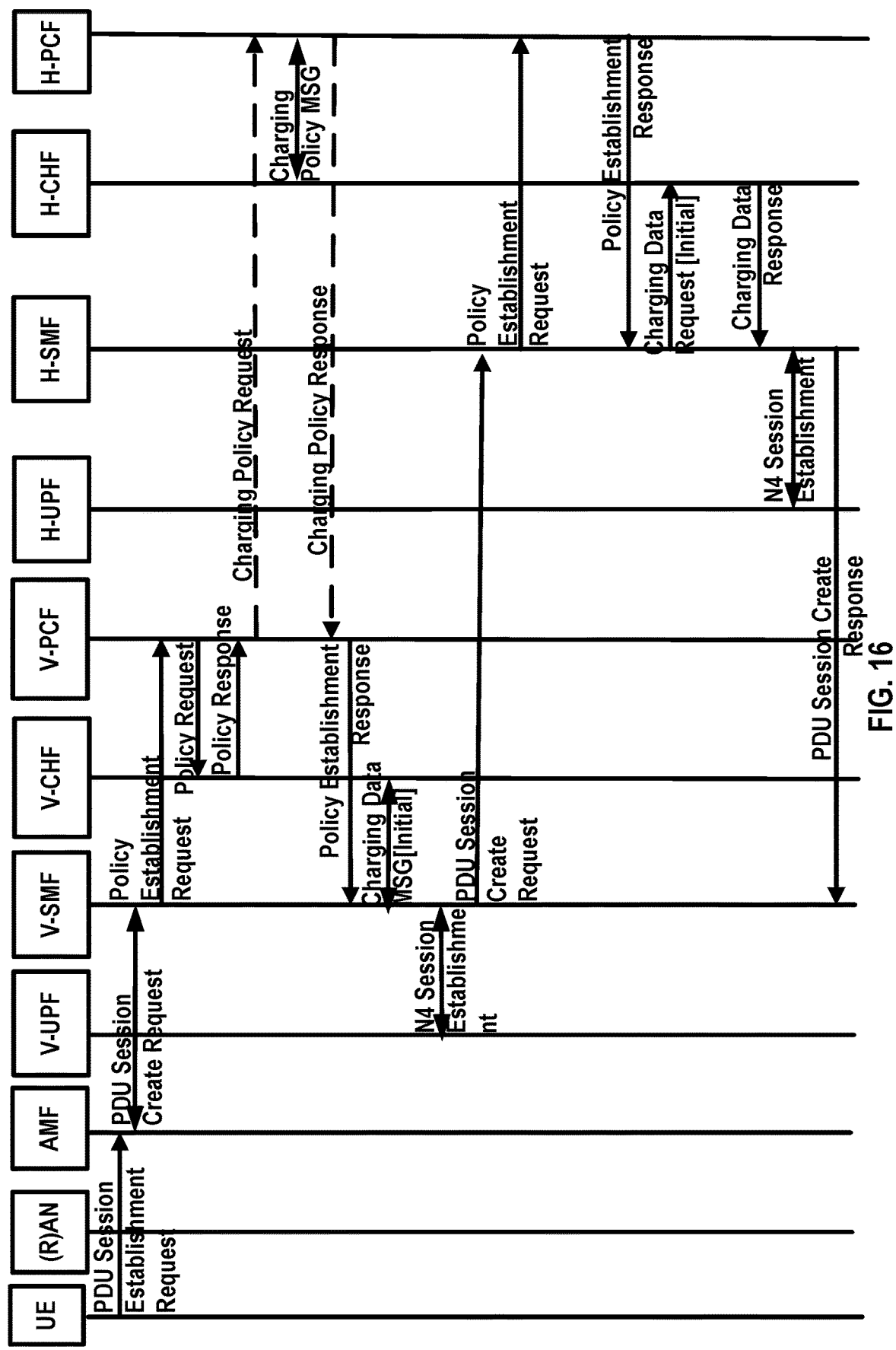
FIG. 16 and FIG. 17 are example call flows of charging policy information negotiation between a V-PCF and a H-PCF as per an aspect of an embodiment of the present disclosure.
Figure 17:
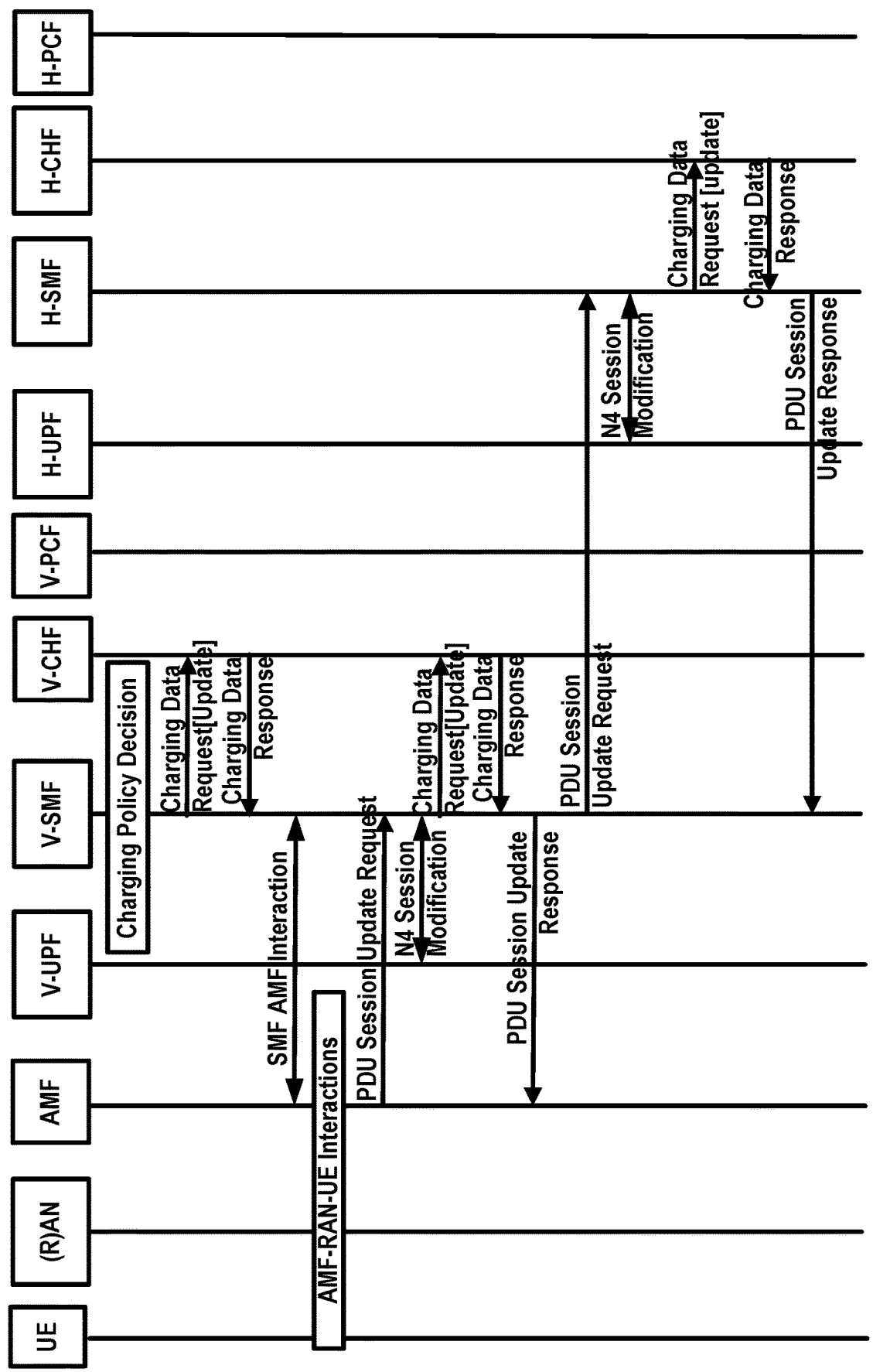

FIG. 16 and FIG. 17 are example call flows of charging policy information negotiation between a V-PCF and a H-PCF as per an aspect of an embodiment of the present disclosure.

A UE may send to an AMF a NAS message comprising at least one of: S-NSSAI(s), DNN, PDU Session ID, Request type, or N1 SM container (PDU session establishment request). The UE may initiate a UE requested PDU session establishment procedure by the transmission of a NAS message comprising a PDU session establishment request message within the N1 SM container. The PDU session establishment request message may comprise at least one of: a PDU session ID, Requested PDU Session Type, or a Requested SSC mode, etc. In response to the message received from the UE, the AMF may select a visited SMF (e.g. V-SMF), the AMF may also select an SMF in HPLMN (e.g. H-SMF) by using the S-NSSAI with the value defined by the HPLMN. The AMF may send to the V-SMF a message (e.g. PDUSession_CreateSMContext Request) comprising at least one of: SUPI, DNN, S-NSSAI(s) and/or network slice instance identifier(s), PDU Session ID, AMF ID, Request Type, visited PCF identifier, home PCF identifier, Priority Access, User location information, Access Type, PEI, or an N1 SM container, wherein the N1 SM container may comprise a PDU Session Establishment Request. As an example, the message sent to the V-SMF may comprise the identity of the H-SMF, and both the S-NSSAI from the Allowed NSSAI and the corresponding Subscribed S-NSSAI. In response to the message received from the AMF, the V-SMF may send to the AMF a response message (e.g. PDUSession_CreateSMContext Response) comprising at least one of: Cause, SM Context ID or N1 SM container (PDU Session Reject (Cause)).

In response to the message received from the AMF and based on the visited PCF identifier, the V-SMF may select a visited PCF (e.g. V-PCF) and send to the V-PCF a message (e.g. policy establishment request) requesting one or more PCC Rules for the PDU session. The PDU session may be identified by the PDU Session ID. The message sent to the V-PCF by the V-SMF may comprise PDU session information. The PDU session information may comprise at least one of: at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; DNN, S-NSSAI(s) and/or network slice instance identifier(s), PDU Session ID, user location information, information of the V-SMF for the PDU session (e.g. V-SMF identifier, IP address or FQDN of the V-SMF), information of the V-PCF for the PDU session (e.g. V-PCF identifier, IP address or FQDN of the V-PCF), information of the H-SMF for the PDU session (e.g. H-SMF identifier, IP address or FQDN of the SMF), or information of the H-PCF for the PDU session (e.g. H-PCF identifier, IP address or FQDN of the H-PCF).

In response to the message received from the V-SMF, the V-PCF may select a V-CHF based on the PDU session information (e.g. V-PCF identifier) received from the V-SMF, and/or the UE subscription information received from a UDR, and/or local configuration and operator policies, and/or other information for the PDU session. As an example, the V-PCF may select a V-CHF based on one or more combination information received from the V-SMF. As an example, the V-PCF may select a V-CHF based on the PLMN identifier received from the V-SMF. As an example, the V-PCF may select a V-CHF based on the network slice information (e.g. S-NSSAI(s) and/or network slice instance identifier(s)). As an example, the V-PCF may select a V-CHF based on the user location information. As an example, the V-PCF may select a V-CHF based on the information of the V-SMF. As an example, the V-PCF may select a V-CHF based on the Access Type and the RAT type received from the V-SMF.

In an example, the V-PCF may select a V-CHF by a V-NRF. FIG. 24 is an example call flow of selecting a V-CHF by a V-NRF, which may comprise one or more actions. In an example action, the V-PCF may send to a V-NRF a message (e.g. a CHF Selection Request message, or a Nnrf_NFDiscovery_Request message) comprising an information element indicating a request to select a V-CHF. The message sent from the V-PCF to the V-NRF may comprise PDU session related information. In an example action, in response to the message received from the V-PCF, the V-NRF may determine/select at least one V-CHF based on the PDU session information received from the V-PCF, and/or the UE subscription information received from a UDR, and/or local configuration and operator policies, and/or other information for the PDU session. In an example action, the V-NRF may send to the V-PCF a message (e.g. a CHF Selection Response message, or a Nnrf_NFDiscovery_Request Response message) comprising the information of the at least one selected V-CHF (e.g. V-CHF identifier, IP address and/or FQDN of the at least one selected V-CHF).

The V-PCF may send to the V-CHF a message (e.g. charging policy request) requesting one or more charging policy information. The message sent to the H-CHF may comprise the PDU session information.

In response to the message received from the V-PCF, the V-CHF may determine/generate/create/derive first charging policy information based on the PDU session information received from the V-PCF. The first charging policy information may comprise an information element indicating a first charging method/charging type, wherein the first charging method/charging type may comprise at least one of: online charging, offline charging, or converged charging. The first charging policy information may comprise an information element indicating a first charging level, wherein the first charging level may comprise at least one of: an information element indicating a PDU session charging; an information element indicating a flow based charging; an information element indicating a QoS flow based charging; an information element indicating a service level charging; or an information element indicating a subsystem level charging (e.g. IMS). The first charging policy information may comprise an information element indicating at least one first charging rate. The first charging policy information may comprise an information element indicating at least one first identifier or address of a CHF. The first charging policy information may comprise at least one of: the PDU Session ID, the at least one service data flow filter, the at least one QFI, the application identifier; the allocated application instance identifier; the DNN, the S-NSSAI(s) and/or network slice instance identifier(s), or the UE identity. The first charging policy information may be applied to at least one of: a PDU session identified by a PDU session identifier; a service data flow identified by at least one service data flow filter; a QoS flow identified by an QFI; an application identified by an application identifier and/or an application instance identifier; a wireless device identified by at least one UE identity (e.g. SUPI, PEI, and/or GPSI); a data network identified by a DNN; or a network slice identified by a S-NSSAI and/or a network slice instance identifier.

As an example, the V-CHF may determine the first charging policy information based on the type of PDU session, e.g. the V-CHF may determine an offline charging and/or a PDU session charging and/or a flat charging rate and/or an IPv4 address of V-CHF for an IPv4 type PDU session. As an example, the V-CHF may determine the first charging policy information based on the Access Type and/or the RAT Type, e.g. the V-CHF may determine an online charging and/or a flow based charging and/or a charging rate and/or an IP address (e.g. IPv4 address and/or IPv6 network prefix) of V-CHF for an 3GPP access and/or 3GPP-NR-FDD RAT type. As an example, the V-CHF may determine the first charging policy information based on the PLMN identifier, e.g. the V-CHF may determine an offline charging and/or a PDU session charging and/or a flat charging rate and/or an FQDN of V-CHF for an PLMN identifier "12345". As an example, the V-CHF may determine the first charging policy information based on the application identifier, e.g. the V-CHF may determine an online charging and/or a service level charging and/or a charging rate and/or an identifier of V-CHF for an application identifier "skype". As an example, the V-CHF may determine the first charging policy information based on the DNN, e.g. the V-CHF may determine an offline charging and/or a subsystem level charging and/or a flat charging rate and/or an IPv4 address of V-CHF for an DNN "IMS". As an example, the V-CHF may determine the first charging policy information based on the network slice, e.g. the V-CHF may determine an online charging and/or a PDU session charging and/or a charging rate and/or an IPv6 network prefix of V-CHF for an S-NSSAI and/or network slice instance(s). As an example, the V-CHF may determine the first charging policy information based on the PDU session identifier, e.g. the V-CHF may determine an online charging and/or PDU session charging and/or a charging rate and/or an IPv4 address of V-CHF for an PDU session identifier "PDU session 1". As an example, the V-CHF may determine the first charging policy information based on the user location information, e.g. the V-CHF may determine an offline charging and/or a QoS flow based charging and/or a charging rate and/or an IP address (e.g. IPv4 address and/or IPv6 network prefix) of V-CHF for a wireless device located within "registration area 1". As an example, the V-CHF may determine the first charging policy information based on the information of the SMF for the PDU session (e.g. V-SMF identifier, IP address or FQDN of the V-SMF). As an example, the V-CHF may determine the first charging policy information based on the V-PCF identifier.

The V-CHF may send a response message (e.g. charging policy response) to the V-PCF comprising the first charging policy information. As an example, HTTP protocol may be used for the communication between the V-CHF and the V-PCF. FIG. 19 shows example definitions of information element for the charging policy information comprising charging method, charging level, charging rate and address of V-CHF, wherein XML structure of simple elements and/or groups may be used as HTTP message content. As an example, the transaction (e.g. a charging policy request message and a charging policy response message) between V-PCF and V-CHF may establish a charging control session between the V-PCF and the V-CHF. The V-PCF and the V-CHF may establish a charging control session for a wireless device, and/or a PDU session, and/or a DNN, and/or a network slice.

In response to the message received from the V-CHF, the V-PCF may select a H-PCF based on the PDU session information (e.g. H-PCF identifier) received from the V-SMF. The V-PCF may send to the H-PCF a message (e.g. charging policy request) requesting at least one charging policy. The message sent to the H-PCF by the V-PCF may comprise the PDU session information. The message sent to the H-PCF may comprise the first charging policy information.

In response to the message received from the V-PCF, the H-PCF may select a H-CHF based on the information received from the V-PCF, and/or the UE subscription information received from a UDR, and/or local configuration and operator policies, and/or other information for the PDU session. As an example, the H-PCF may select a H-CHF based on one or more combination information received from the V-PCF. As an example, the H-PCF may select a H-CHF based on the PLMN identifier received from the V-PCF. As an example, the H-PCF may select a H-CHF based on the network slice information (e.g. S-NSSAI(s) and/or network slice instance identifier(s)). As an example, the H-PCF may select a H-CHF based on the user location information. As an example, the H-PCF may select a H-CHF based on the information of the V-PCF. As an example, the H-PCF may select a H-CHF based on the Access Type and the RAT type received from the H-SMF. As an example, the H-PCF may select a H-CHF based on the first charging policy information. As an example, the H-PCF may select a H-CHF based on a charging method (e.g. online charging; offline charging; or converged charging). As an example, the H-PCF may select a H-CHF based on a charging level (e.g. PDU session charging; flow based charging; QoS flow based charging; service level charging; or subsystem level charging). As an example, the H-PCF may select a H-CHF based on a charging rate.

The H-PCF may send to the H-CHF a message (e.g. charging policy request) requesting one or more charging policy information. The message sent to the H-CHF may comprise the PDU session information received from the V-PCF. The message sent to the H-CHF by the H-PCF may comprise the first charging policy information received from the V-PCF.

In response to the message received from the H-PCF, the H-CHF may determine/generate/create/derive second charging policy information based on the information received from the H-PCF. The second charging policy information may comprise an information element indicating a second charging method/charging type, wherein the second charging method/charging type may comprise at least one of: online charging, offline charging, or converged charging. The second charging policy information may comprise an information element indicating a second charging level, wherein the second charging level may comprise at least one of: an information element indicating a PDU session charging; an information element indicating a flow based charging; an information element indicating a QoS flow based charging; an information element indicating a service level charging; or an information element indicating a subsystem level charging (e.g. IMS). The second charging policy information may comprise an information element indicating at least one second charging rate. The second charging policy information may comprise an information element indicating at least one second identifier or address of a CHF. The second charging policy information may comprise at least one of: the PDU Session ID, the at least one service data flow filter, the at least one QFI, the application identifier; the allocated application instance identifier; the DNN, the S-NSSAI(s) and/or network slice instance identifier(s), or the UE identity. The second charging policy information may be applied to at least one of: a PDU session identified by a PDU session identifier; a service data flow identified by at least one service data flow filter; a QoS flow identified by an QFI; an application identified by an application identifier and/or an application instance identifier; a wireless device identified by at least one UE identity (e.g. SUPI, PEI, and/or GPSI); a data network identified by a DNN; or a network slice identified by a S-NSSAI and/or a network slice instance identifier.

As an example, the H-CHF may determine the second charging policy information (e.g. second charging method/charging type, second charging level, second charging rate) based on the first charging policy information (e.g. first charging method/charging type, first charging level, first charging rate). As an example, the second charging policy information may be the same as the first charging policy information. As an example, the second charging policy information may be different from the first charging policy information. As an example, the H-CHF may determine the second charging method/charging type (e.g. online charging) based on the first charging method/charging type (e.g. converged charging). As an example, the H-CHF may determine the second charging level (e.g. PDU session charging) based on the first charging level (e.g. PDU session charging).

As an example, the H-CHF may determine the second charging rate (e.g. a flat rate) based on the first charging rate (e.g. a flat rate). As an example, the H-CHF may determine the second identifier or address of the CHF (e.g. H-CHF) based on the first identifier or address of the CHF (e.g. V-CHF). As an example, the H-CHF may determine the second charging policy information based on the UE identity, e.g. the H-CHF may determine an online charging and/or a QoS flow based charging and/or a charging rate and/or an IP address (e.g. IPv4 address and/or IPv6 network prefix) of H-CHF for an SUPT. As an example, the H-CHF may determine the second charging policy information based on the type of PDU session, e.g. the H-CHF may determine an offline charging and/or a PDU session charging and/or a flat charging rate and/or an IPv4 address of H-CHF for an IPv4 type PDU session. As an example, the H-CHF may determine the second charging policy information based on the Access Type and/or the RAT Type, e.g. the H-CHF may determine an online charging and/or a flow based charging and/or a charging rate and/or an IP address (e.g. IPv4 address and/or IPv6 network prefix) of H-CHF for an 3GPP access and/or 3GPP-NR-FDD RAT type. As an example, the H-CHF may determine the second charging policy information based on the PLMN identifier, e.g. the H-CHF may determine an offline charging and/or a PDU session charging and/or a flat charging rate and/or an FQDN of H-CHF for an PLMN identifier "12345". As an example, the H-CHF may determine the second charging policy information based on the application identifier, e.g. the H-CHF may determine an online charging and/or a service level charging and/or a charging rate and/or an identifier of H-CHF for an application identifier "skype". As an example, the H-CHF may determine the second charging policy information based on the DNN, e.g. the H-CHF may determine an offline charging and/or a subsystem level charging and/or a flat charging rate and/or an IPv4 address of H-CHF for an DNN "IMS". As an example, the H-CHF may determine the second charging policy information based on the network slice, e.g. the H-CHF may determine an online charging and/or a PDU session charging and/or a charging rate and/or an IPv6 network prefix of H-CHF for an S-NSSAI and/or network slice instance(s). As an example, the H-CHF may determine the second charging policy information based on the PDU session identifier, e.g. the H-CHF may determine an online charging and/or PDU session charging and/or a charging rate and/or an IPv4 address of H-CHF for an PDU session identifier "PDU session 1". As an example, the H-CHF may determine the second charging policy information based on the user location information, e.g. the H-CHF may determine an offline charging and/or a QoS flow based charging and/or a charging rate and/or an IP address (e.g. IPv4 address and/or IPv6 network prefix) of H-CHF for a wireless device located within "registration area 1". As an example, the H-CHF may determine the second charging policy information based on the H-PCF identifier.

The H-CHF may send a response message (e.g. charging policy response) to the H-PCF comprising the second charging policy information.

In response to the message received from the H-CHF, the H-PCF may make policy decision based on the second charging policy information received from the H-CHF, and/or the first charging policy information received from the V-PCF, and/or the PDU session information received from the V-PCF. The H-PCF may determine/generate/create/derive one or more first PCC rules comprising one or more first charging control rules. The one or more first PCC rules and/or the one or more first charging control rules may be applied to at least one PDU session identified by a PDU session identifier, and/or a QoS flow identified by an QFI, and/or at least one service data flow identified by at least one service data flow filter, and/or at least one application identified by an application identifier, and/or a wireless device identified by a UE identity, and/or a data network identified by a DNN, and/or a network slice identified by an S-NSSAI and/or a network slice instance identifier. The one or more first PCC rules determined by the H-PCF may comprise at least one of: one or more first charging control rule; at least one first policy control rule comprising at least one first QoS control rule and/or at least one first gating control rule; at least one first usage monitoring control rule; at least one first application detection and control rule; at least one first traffic steering control rule; or at least one first service data flow detection information (e.g. service data flow template). As an example, the one or more first charging control rule may be used for charging control and may comprise at least one of: an information element indicating a third charging method/charging type, wherein the third charging method/charging type may comprise at least one of: online charging, offline charging, or converged charging; an information element indicating at least one third charging level; an information element indicating at least one third charging rate; an information element indicating at least one third identifier or address of a CHF.

As an example, the H-PCF may determine the one or more first charging control rules based on the second charging policy information received from the H-CHF, and/or the first charging policy information received from the V-PCF, and/or the PDU session information received from the V-PCF.

The H-PCF may send to the V-PCF a response message (e.g. charging policy response) comprising the one or more first PCC rules comprising the one or more first charging control rules. The response message may comprise at least one of the following information elements which the one or more first PCC rules applied to: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the DNN, the S-NSSAI(s) and/or network slice instance identifier(s), or the PDU Session ID.

In response to the message received from the H-PCF, the V-PCF may make policy decision based on the one or more first PCC rules and/or the one or more first charging control rules received from the H-CHF. The V-PCF may determine/generate/create/derive one or more second PCC rules comprising one or more second charging control rules. The one or more second PCC rules and/or the one or more second charging control rules may be applied to at least one PDU session identified by a PDU session identifier, and/or a QoS flow identified by an QFI, and/or at least one service data flow identified by at least one service data flow filter, and/or at least one application identified by an application identifier, and/or a wireless device identified by a UE identity, and/or a data network identified by a DNN, and/or a network slice identified by an S-NSSAI and/or a network slice instance identifier. The one or more second PCC rules determined by the V-PCF may comprise at least one of: one or more second charging control rule; at least one second policy control rule comprising at least one second QoS control rule and/or at least one second gating control rule; at least one second usage monitoring control rule; at least one second application detection and control rule; at least one second traffic steering control rule; or at least one second service data flow detection information (e.g. service data flow template). As an example, the one or more second charging control rule may be used for charging control and may comprise at least one of: an information element indicating a fourth charging method/charging type, wherein the fourth charging method/charging type may comprise at least one of: online charging, offline charging, or converged charging; an information element indicating at least one fourth charging level; an information element indicating at least one fourth charging rate; an information element indicating at least one fourth identifier or address of a CHF.

The V-PCF may send to the V-SMF a message (e.g. policy establishment response) comprising the one or more second PCC rules and/or the one or more second charging control rules.

The V-SMF may send to the V-CHF a message (e.g. a charging data request [Initial] message), indicating the UE may be an in-bound roamer. The V-CHF may open a CDR comprising an indication of in-bound roamer. The V-CHF may send to the V-SMF a response message (e.g. charging data response), and the response message may comprise a first roaming charging profile applied to the visited PLMN. The first roaming charging profile may comprise at least one of: a set of chargeable events and associated category; a set of thresholds configured in a charging characteristics for QoS flow based charging (QBC); or a default partial record mechanism indicated as the one used by the V-CHF.

The V-SMF may send to a V-UPF a message (e.g. N4 Session Establishment/Modification Request) comprising packet detection, enforcement and reporting rules to be installed on the V-UPF for the PDU Session, wherein the packet detection, enforcement and reporting rules may be determined based on the one or more second PCC rules and/or the one or more second charging control rules. If CN Tunnel Info is allocated by the V-SMF, the CN Tunnel Info may be provided to V-UPF. The V-UPF may acknowledge the V-SMF by sending e.g. an N4 Session Establishment/Modification Response. If CN Tunnel Info is allocated by the V-UPF, the CN Tunnel Info may be provided to the V-SMF.

The V-SMF may send to the H-SMF a message (e.g. Nsmf_PDUSession_Create Request) comprising at least one of: SUPI, GPSI (if available), DNN, S-NSSAI with the value defined by the HPLMN, PDU Session ID, V-SMF ID, V-CN-Tunnel-Info, PDU Session Type, PCO, Number Of Packet Filters, User location information, Access Type, home PCF identifier, SM PDU DN Request Container, DNN Selection Mode, or the first roaming charging profile. The message sent to the H-SMF from the V-SMF may comprise the one or more second PCC rules and/or the one or more second charging control rules.

If dynamic PCC is deployed and a home PCF identifier is provided by the V-SMF, the H-SMF may perform PCF selection procedure by selecting a H-PCF (e.g. based on the home PCF identifier received). The H-SMF may perform an SM Policy Association Establishment procedure (e.g. by sending a policy establishment request message to the H-PCF) to establish a PDU Session with the selected H-PCF and get the default PCC Rules for the PDU Session. The PDU session may be identified by the PDU Session ID. The message sent to the H-PCF by the H-SMF may comprise at least one of: at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; DNN, S-NSSAI(s) and/or network slice instance identifier(s), PDU Session ID, user location information, or information of the H-SMF for the PDU session (e.g. H-SMF identifier, IP address or FQDN of the SMF). The message sent to the H-PCF by the H-SMF may comprise the one or more second PCC rules and/or the one or more second charging control rules. The message sent to the H-PCF by the H-SMF may comprise the first roaming charging profile.

In response to the message received from the H-SMF, the H-PCF may verify the one or more second PCC rules and/or the one or more second charging control rules. As an example, the H-PCF may accept the one or more second PCC rules and/or the one or more second charging control rules. As an example, the H-PCF may update the one or more second PCC rules and/or the one or more second charging control rules by determining one or more third PCC rules and/or one or more third charging control rules based on the one or more second PCC rules and/or the one or more second charging control rules. The one or more third PCC rules determined by the H-PCF may comprise at least one of: one or more third charging control rule; at least one third policy control rule comprising at least one third QoS control rule and/or at least one third gating control rule; at least one third usage monitoring control rule; at least one third application detection and control rule; at least one third traffic steering control rule; or at least one third service data flow detection information (e.g. service data flow template). As an example, the one or more third charging control rule may be used for charging control and may comprise at least one of: an information element indicating a fifth charging method/charging type, wherein the fifth charging method/charging type may comprise at least one of: online charging, offline charging, or converged charging; an information element indicating at least one fifth charging level; an information element indicating at least one fifth charging rate; an information element indicating at least one fifth identifier or address of a CHF.

The H-PCF may send to the H-SMF a response message (e.g. policy establishment response) comprising the one or more third PCC rules and/or the one or more third charging control rules.

In response to the message received from the H-PCF, the H-SMF may install the one or more third PCC rules and/or the one or more third charging control rules. The H-SMF may select one of H-CHF and enforce the one or more third charging control rules associated with the H-CHF by comprising one or more actions. In an example action, the H-SMF may select one of H-CHF based on one or more the third identifier or address of CHFs in the one or more third charging control rules. In an example action, the H-SMF may construct a message (e.g. charging data request [initial]) based on the one or more third charging control rules. In an example action, the H-SMF may send the constructed message to the H-CHF to establish a charging session. The message sent to the H-CHF may comprise a requested charging policy information. The requested charging policy information may comprise at least one of: an information element indicating a requested charging method/charging type, wherein the requested charging method/charging type may comprise at least one of: online charging, offline charging, or converged charging; the requested charging method/charging type may be determined by the H-SMF based on the fifth charging method/charging type of the one or more third charging control rules; an information element indicating at least one requested charging level, wherein the requested charging level may be determined by the H-SMF based on the fifth charging level of the one or more third charging control rules; an information element indicating at least one requested charging rate, wherein the at least one requested charging rate may be determined by the H-SMF based on the fifth charging rate of the one or more third charging control rules; an information element indicating a PDU session identified by a PDU session identifier; an information element indicating a QoS flow identified by an QFI; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; an information element indicating a network slice identified by a S-NSSAI and/or a network slice instance identifier. With the requested charging method/charging type, as an example, the H-SMF may indicate to the H-CHF an online charging method; as an example, the H-SMF may indicated to the H-CHF an offline charging method; as an example, the H-SMF may indicate to the H-CHF a converged charging method. The message sent to the H-CHF by the H-SMF may comprise the first roaming charging profile.

In response to the message received from the H-SMF, the H-CHF may verify the information received and determine whether to accept the charging session request. As an example, the H-CHF may accept the request. The H-CHF may determine an accepted/authorized charging policy information based on the requested charging policy information. As an example, the accepted/authorized charging policy information may be the same as the requested charging policy information. As an example, the accepted/authorized charging policy information may be different from the requested charging policy information. As an example, the H-CHF may determine the accepted/authorized charging method/charging type (e.g. online charging) based on the requested charging method/charging type. As an example, the H-CHF may determine the accepted/authorized charging level (e.g. PDU session charging) based on the requested charging level (e.g. QoS flow based charging). As an example, the H-CHF may determine the accepted/authorized charging rate (e.g. a flat rate) based on the requested charging rate (e.g. a charging rate 1). As an example, the H-CHF may determine the accepted/authorized policy information based on the first roaming charging profile. As an example, the H-CHF may determine the accepted/authorized charging method/charging type (e.g. online charging) based on the set of chargeable events and associated category of the first roaming charging profile. As an example, the H-CHF may determine the accepted/authorized charging level (e.g. QoS flow based charging) based on a set of thresholds configured in a charging characteristics for QoS flow based charging (QBC) of the first roaming charging profile. As an example, the H-CHF may determine a second roaming charging profile based on the first roaming charging profile.

The H-CHF may send to the H-SMF a response message (e.g. charging data response). The response message may comprise at least one of: an information element indicating a success cause value to indicate the request is accepted; an information element indicating an accepted/authorized charging method/charging type, wherein the accepted charging method/charging type may comprise at least one of:

online charging, offline charging, or converged charging; an information element indicating at least one accepted/authorized charging level (e.g. PDU session charging; flow based charging; QoS flow based charging; service level charging; or subsystem level charging (e.g. IMS); an information element indicating at least one accepted/authorized charging rate (e.g. rating group); an information element indicating at least one granted unit (e.g. granted volume and/or granted time for online charging or converged charging); an information element indicating final unit action (e.g. redirect the traffic to a web portal when the final granted unit has been consumed by the wireless device); an information element indicating a PDU session identified by a PDU session identifier; an information element indicating a QoS flow identified by an QFI; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; or an information element indicating a network slice identified by a S-NSSAI and/or a network slice instance identifier. The response message sent to the H-SMF may comprise the second roaming charging profile.

As an example, the H-CHF may reject the request, and may send to the H-SMF a response message (e.g. charging data response) comprising a proposed/accepted charging policy information. The response message may comprise at least one of: an information element indicating a reject cause value to indicate the request is rejected; an information element indicating an accepted/proposed charging method/charging type (e.g. online charging, offline charging, or converged charging); an information element indicating at least one accepted/authorized charging level (e.g. PDU session charging; flow based charging; QoS flow based charging; service level charging; or subsystem level charging (e.g. IMS); or an information element indicating at least one accepted/authorized charging rate.

In response to the message received from the H-CHF, the H-SMF may take different actions based on the result of the response. As an example, when receiving a reject response message from the H-CHF, the H-SMF may resend to the H-CHF a second request message (e.g. charging data request [update]) comprising the accepted/authorized charging policy information proposed by the H-CHF. The H-CHF may accept the second request by sending to the H-SMF a second response message (e.g. charging data response) comprising a success cause value indicating the request is accepted. As an example, when receiving a reject response message from the H-CHF, the H-SMF may select a second H-CHF from the information (e.g. charging policy rules) received from the H-PCF and send a request message (e.g. charging data request) to the second H-CHF to establish a charging session. As an example, after receiving a success response message from the H-CHF, the H-SMF may enforce the one or more PCC rules and/or charging control rules received by the H-PCF and/or charging function required by the H-CHF by determining/generating/creating/deriving at least one of the following user plane rules based on the one or more PCC rules and/or the one or more charging control rules received from the H-PCF and/or the information (e.g. charging policy information) received from the H-CHF: at least one packet detection rule; at least one forwarding action rule; at least one QoS enforcement rule; or at least one usage reporting rule.

As an example, the packet detection rule may comprise data/traffic packet detection information, e.g. one or more match fields against which incoming packets are matched and may apply other user plane rules (e.g. forwarding action rule, QoS enforcement rule, and usage reporting rule) to the data/traffic packets matching the packet detection rule. As an example, the forwarding action rule may comprise an apply action parameter, which may indicate whether a UP function may forward, duplicate, drop or buffer the data/traffic packet respectively. As an example, the usage reporting rule may be used to measure the network resources usage in terms of traffic data volume, duration (i.e. time) and/or events, according to a measurement method in the usage reporting rule. As an example, the QoS enforcement rule may comprise instructions to request the UP function to perform QoS enforcement of the user plane traffic. As an example, the H-SMF may determine a packet detection rule based on the service data flow detection information (e.g. service data flow template) received from the H-PCF. As an example, the H-SMF may determine a forwarding action rule based on the policy control rule and/or usage monitoring control rule received from the H-PCF and/or the final unit action received from the H-CHF. As an example, the H-SMF may determine a QoS enforcement rule based on the policy control rule (e.g. QoS control rule) received from the H-PCF. As an example, the H-SMF may determine a usage reporting rule based on the usage monitoring control rule received from the H-PCF and/or the at least one granted unit (e.g. granted volume and/or granted time for online charging or converged charging) received from the H-CHF. As an example, the H-SMF may enforce the one or more PCC rules and/or the one or more charging control rules required by the H-PCF and/or charging function required by the H-CHF by selecting a H-UPF and sending to the H-UPF a message (e.g. N4 session establishment/modification request) comprising the at least one of the following user plane rules: at least one packet detection rule; at least one forwarding action rule; at least one QoS enforcement rule; or at least one usage reporting rule.

In response to the message received from the H-SMF, the H-UPF may install the user plane rules, send to the H-SMF a response message (e.g. N4 session establishment/modification response), and enforce the user plane rules received from the H-SMF. As an example, the H-UPF may enforce the at least one packet detection rule by matching a user data/traffic packet with service data flow template (e.g. service data flow filters and/or application identifiers), and may apply other user plane rules (e.g. forwarding action rule, QoS enforcement rule, and usage reporting rule) to the data/traffic packets matched the packet detection rule. As an example, the H-UPF may enforce the at least one forwarding action rule by forwarding, duplicating, dropping or buffering a data/traffic packet respectively. As an example, the H-UPF may redirect the traffic to a web portal of the operator. As an example, the H-UPF may enforce the at least one usage reporting rule by measuring network resources usage in terms of traffic data volume, duration (i.e. time) and/or events, according to a measurement method in the usage reporting rule; the H-UPF may report the network resources usage to the H-SMF when the quota/threshold reached, and/or event and/or another trigger is (are) met. As an example, the H-UPF may enforce the at least one QoS enforcement rule by applying at least one of QoS parameters: 5QI, ARP, MBR, GBR to a service data flow; as an example, the H-UPF may enforce the at least one QoS enforcement rule by applying at least one of QoS parameters: Session AMBR and default 5QI/ARP combination to a PDU session.

As an example, the H-SMF and/or H-UPF may enforce the charging control rules by performing at least one of the following actions: receiving, by the H-SMF, a charging control rule from a H-PCF; determining, by the H-SMF, at least one user plane rules based on the received charging control rules, and the at least one user plane rules may comprise at least one of: at least one packet detection rule; at least one forwarding action rule; at least one QoS enforcement rule; or at least one usage reporting rule; sending, by the H-SMF to the H-UPF the at least one user plane rules; enforcing, by the H-UPF, the at least one user plane rules; reporting, by the H-UPF, usage report information to the H-SMF; sending, by the H-SMF, the usage report information to the H-CHF. As an example, the usage report information may comprise network resources usage in terms of traffic data volume, duration (i.e. time) applied to at least one of: a wireless device, a PDU session, a service data flow, an application, a network slice, or a data network.

The H-SMF may determine a home charging policy information based on the accepted/authorized charging policy information received from the H-CHF and/or the information received from the V-SMF. The home charging policy information may comprise at least one of: an information element indicating a home charging method/charging type (e.g. online charging, offline charging, or converged charging); an information element indicating at least one home charging level (e.g. PDU session charging; flow based charging; QoS flow based charging; service level charging; or subsystem level charging (e.g. IMS); an information element indicating at least one home charging rate (e.g. rating group); an information element indicating a PDU session identified by a PDU session identifier; an information element indicating a QoS flow identified by an QFI; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; or an information element indicating a network slice identified by a S-NSSAI and/or a network slice instance identifier. As an example, the H-SMF may determine a home roaming charging profile based on the second roaming charging profile.

As an example, the home charging policy information may be the same as the accepted/authorized charging policy information. As an example, the home charging policy information may be different from the accepted/authorized charging policy information. As an example, the H-SMF may determine the home charging method/charging type (e.g. online charging) based on the accepted/authorized charging method/charging type (e.g. online charging). As an example, the H-SMF may determine the home charging level (e.g. PDU session charging) based on the accepted/authorized charging level (e.g. PDU session charging). As an example, the H-SMF may determine the home charging rate (e.g. a charging rate 1) based on the accepted/authorized charging rate (e.g. a flat rate). As an example, the H-SMF may determine a home charging policy information based on the first roaming charging profile. As an example, the H-SMF may determine the home charging method/charging type (e.g. online charging) based on the set of chargeable events and associated category of the first roaming charging profile. As an example, the H-SMF may determine the home charging level (e.g. QoS flow based charging) based on a set of thresholds configured in a charging characteristics for QoS flow based charging (QBC) of the first roaming charging profile. As an example, the H-SMF may determine a home roaming charging profile based on the second roaming charging profile.

The H-SMF may send to the V-SMF a response message (e.g. Nsmf_PDUSession_Create Response comprising at least one of: QoS Rule(s), QoS Flow level QoS parameters if needed for the QoS Flow(s) associated with the QoS rule(s), PCO including session level information that the V-SMF is not expected to understand, selected PDU Session Type and SSC mode, H-CN Tunnel Info, QFI(s), QoS profile(s), Session-AMBR, Reflective QoS Timer (if available), information needed by V-SMF in case of EPS interworking such as the PDN Connection Type, User Plane Policy Enforcement. The message sent to the V-SMF from the H-SMF may comprise the home charging policy information. The message sent to the V-SMF from the H-SMF may comprise the home roaming charging profile.

In response to the message received from the H-SMF, the V-SMF may determine a visited charging policy information based on the home charging policy information received from the H-SMF. The visited charging policy information may comprise at least one of: an information element indicating a visited charging method/charging type (e.g. online charging, offline charging, or converged charging); an information element indicating at least one visited charging level (e.g. PDU session charging; flow based charging; QoS flow based charging; service level charging; or subsystem level charging (e.g. IMS); an information element indicating at least one visited charging rate (e.g. rating group); an information element indicating a PDU session identified by a PDU session identifier; an information element indicating a QoS flow identified by an QFI; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; or an information element indicating a network slice identified by a S-NSSAI and/or a network slice instance identifier.

As an example, the visited charging policy information may be the same as the home charging policy information. As an example, the visited charging policy information may be different from the home charging policy information. As an example, the V-SMF may determine the visited charging method/charging type (e.g. converged charging) based on the home charging method/charging type (e.g. online charging). As an example, the V-SMF may determine the visited charging level (e.g. PDU session charging) based on the home charging level (e.g. PDU session charging). As an example, the V-SMF may determine the visited charging rate (e.g. a flat rate) based on the home charging rate (e.g. a flat rate). As an example, the V-SMF may determine the visited charging policy information based on the home roaming charging profile. As an example, the V-SMF may determine the visited charging method/charging type (e.g. online charging) based on the set of chargeable events and associated category of the home roaming charging profile. As an example, the V-SMF may determine the visited charging level (e.g. QoS flow based charging) based on a set of thresholds configured in a charging characteristics for QoS flow based charging (QBC) of the first roaming charging profile. As an example, the V-SMF may determine a visited roaming charging profile based on the home roaming charging profile.

The V-SMF may send to the V-CHF a message (e.g. charging data request [update]) comprising at least one of: the visited charging policy information, the home charging policy information, the visited roaming charging profile, or the home roaming charging profile. The V-CHF may send to the V-SMF a message (e.g. charging data response) indicating the V-CHF may accept the visited charging policy information and/or the visited roaming charging profile comprising. As an example, the V-CHF may indicate to the V-SMF that the V-CHF may accept the home charging policy information and/or the home roaming charging profile. The message sent to the V-SMF by the V-CHF may comprise an information element indicating at least one granted unit (e.g. granted volume and/or granted time for online charging or converged charging) and/or an information element indicating final unit action (e.g. redirect the traffic to a web portal when the final granted unit has been consumed by the wireless device).

The V-SMF may interact with the AMF, in an example, the V-SMF may send to the AMF a Namf_Communication_N1N2MessageTransfer message comprising at least one of: a PDU Session ID, an N2 SM information, or an N1 SM container. The N2 SM information may comprise at least one of: PDU Session ID, QFI(s), QoS Profile(s), CN Tunnel Info, S-NSSAI from the Allowed NSSAI, Session-AMBR, PDU Session Type, User Plane Security Enforcement information, or UE Integrity Protection Maximum Data Rate. The N1 SM container may comprise a PDU Session Establishment Accept, wherein the PDU Session Establishment Accept may comprises at least one of: QoS Rule(s) and QoS Flow level QoS parameters if needed for the QoS Flow(s) associated with the QoS rule(s), selected SSC mode, S-NSSAI(s), DNN, allocated IPv4 address, interface identifier, Session-AMBR, selected PDU Session Type, Reflective QoS Timer (if available), or P-CSCF address(es). In an example, the AMF may interact with (R)AN and UE by sending to the (R)AN a N2 PDU Session Request message comprising at least one of: the N2 SM information or a NAS message. The NAS message may comprise at least one of: a PDU Session ID, and the N1 SM container, wherein the N1 SM container may comprise the PDU Session Establishment Accept. The (R)AN may forward the NAS message to the UE. In an example, the (R)AN may send to the AMF a N2 PDU Session Response message comprising at least one of: PDU Session ID or N2 SM information. The N2 SM information may comprise at least one of: PDU Session ID, AN Tunnel Info, or List of accepted/rejected QFI(s), wherein the AN Tunnel Info may be corresponding to an Access Network address of an N3 tunnel corresponding to the PDU Session.

In an example, the AMF may send to the V-SMF a Nsmf_PDUSession_UpdateSMContext Request message comprising the N2 SM information received from (R)AN. If the list of rejected QFI(s) is included in N2 SM information, the V-SMF may release the rejected QFI(s) associated QoS profiles. In an example, the V-SMF may initiate an N4 Session Modification procedure with the V-UPF. The V-SMF may provide AN Tunnel Info to the V-UPF as well as the corresponding forwarding rules. The V-UPF may send to the V-SMF a response message. As an example, the V-UPF may report resource usage of a PDU session to the V-SMF. As an example, the V-UPF may report resource usage of a wireless device to the V-SMF. by enforcing the charging control rules, the V-SMF may send to the V-CHF a message (e.g. Charging Data Request [update]) comprising resource usage information received from the V-UPF. In an example, the V-SMF may request quota from V-CHF, e.g. "start of service data flow" event may need quota from V-CHF. As an example, for online charging or converged charging, the V-SMF may request quota from V-CHF when allocated quota is consumed or a trigger is met to request a quota. As an example, in the message sent to the V-CHF, the V-SMF may report to the V-CHF counts of rejected QFI(s). In an example, the V-CHF may update CDR for this PDU session. The V-CHF may acknowledge the SMF by sending a Charging Data Response message comprising quota information for the wireless device. In an example, the V-SMF may send to the AMF a Nsmf_PDUSession_UpdateSMContext Response message.

Figure 22:
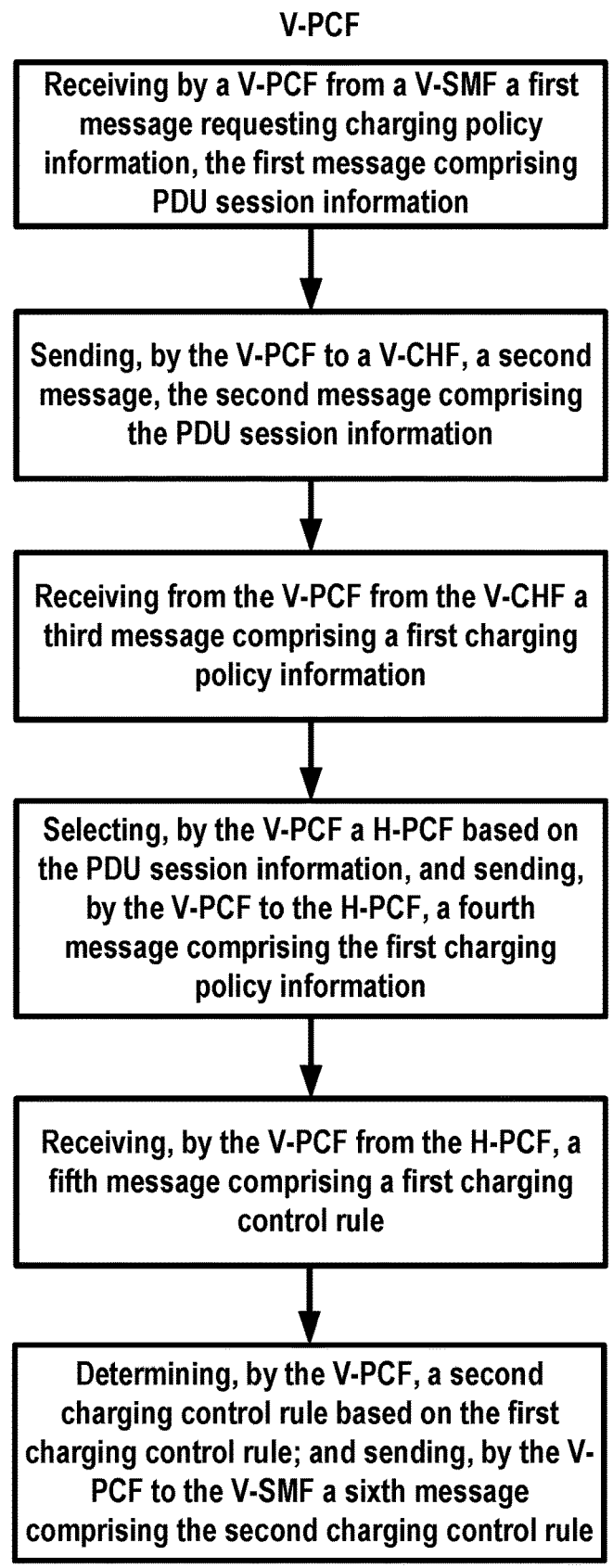
FIG. 22 is an example diagram depicting the procedures of V-PCF as per an aspect of an embodiment of the present disclosure.

The V-SMF may send to the H-SMF a message (e.g. PDU session update request) comprising the rejected QFI(s). The H-SMF may update QoS rules and QoS Flow level QoS parameters accordingly. The H-SMF may update the session with H-UPF (e.g. N4 session). The H-SMF may send to the H-CHF a message (e.g. Charging Data Request [update]) to report that the Counts per rejected QFI(s) may be closed. The H-CHF may update CDR and acknowledge the H-SMF by sending a charging data response [Update] message to the H-SMF. The H-SMF may send to the V-SMF a response message (e.g. PDU session update response). FIG. 22 is an example diagram depicting the procedures of V-PCF as per an aspect of an embodiment of the present disclosure.

Figure 18:
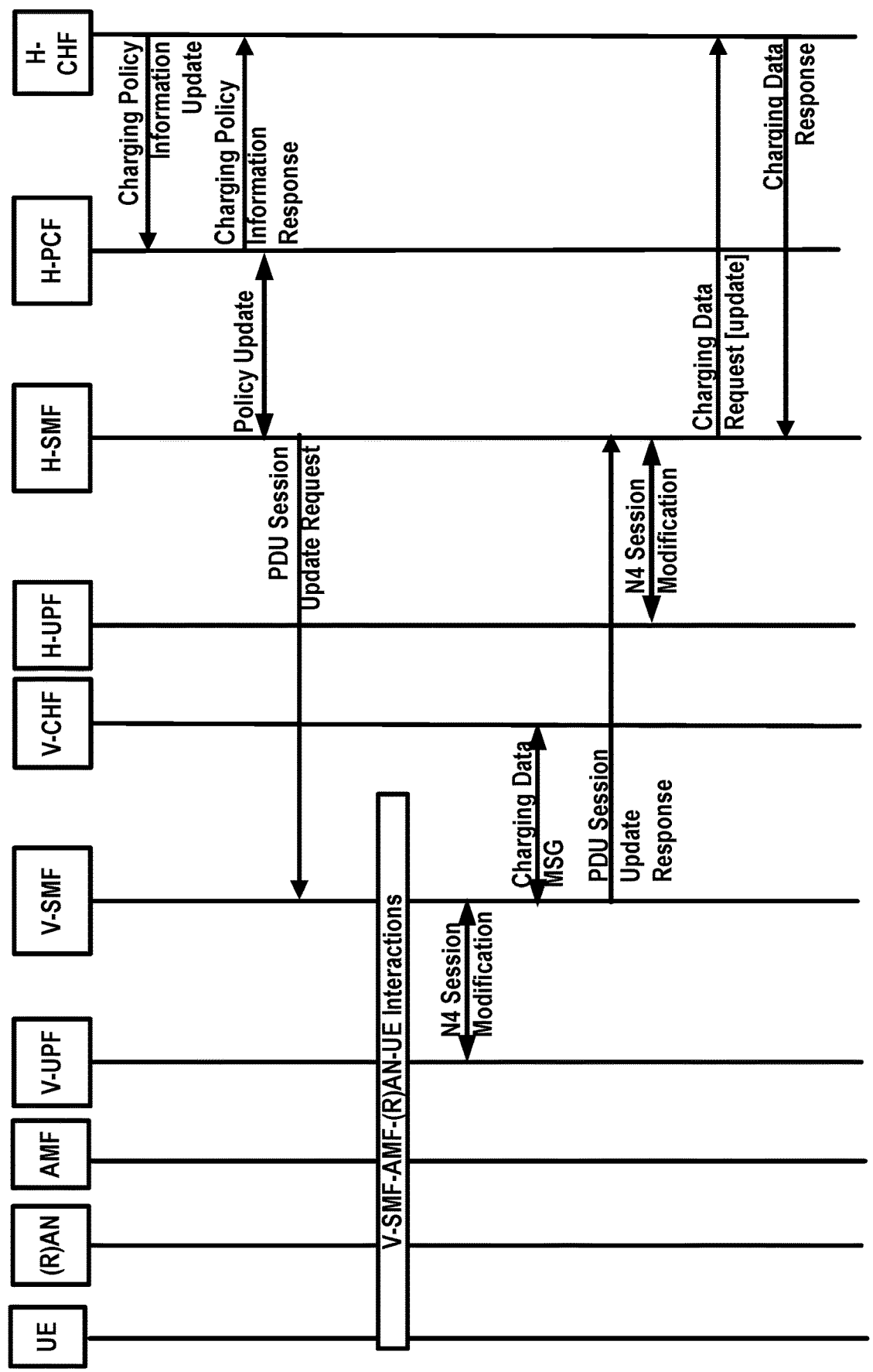
FIG. 18 is an example call flow of H-SMF updates charging policy information as per an aspect of an embodiment of the present disclosure.

FIG. 18 is an example call flow of H-SMF updates charging policy information as per an aspect of an embodiment of the present disclosure.

During a PDU session, a H-CHF may receive a trigger to update charging policy information. As an example, the H-CHF may receive a trigger (e.g. a message) from a billing domain (BD), e.g. the credit of a wireless device has been updated. As an example, the H-CHF may receive a trigger from an OAM. As an example, the H-CHF may receive an internal trigger (e.g. a timer) based on local configuration and operator policies.

In response to the trigger received, the H-CHF may determine and may update charging policy information based on the trigger. The H-CHF may determine a first charging policy information. The first charging policy information may comprise an information element indicating a first charging method/charging type, wherein the first charging method/charging type may comprise at least one of: online charging, offline charging, or converged charging. The first charging policy information may comprise an information element indicating a first charging level, wherein the first charging level may comprise at least one of: an information element indicating a PDU session charging; an information element indicating a flow based charging; an information element indicating a QoS flow based charging; an information element indicating a service level charging; or an information element indicating a subsystem level charging (e.g. IMS). The first charging policy information may comprise an information element indicating at least one first charging rate. The first charging policy information may comprise an information element indicating at least one first identifier or address of a CHF. The first charging policy information may comprise at least one of: the PDU Session ID, the at least one service data flow filter, the at least one QFI, the application identifier; the allocated application instance identifier; the DNN, the S-NSSAI(s) and/or network slice instance identifier(s), or the UE identity. The first charging policy information may be applied to at least one of: a PDU session identified by a PDU session identifier; a service data flow identified by at least one service data flow filter; a QoS flow identified by an QFI; an application identified by an application identifier and/or an application instance identifier; a wireless device identified by at least one UE identity (e.g. SUPI, PEI, and/or GPSI); a data network identified by a DNN; or a network slice identified by a S-NSSAI and/or a network slice instance identifier.

As an example, the H-CHF may update the first charging method/charging type and/or the at least one first charging rate and/or the at least one first identifier or address of a CHF. As an example, the H-CHF may change the first charging method/charging type from converged charging to online charging. As an example, the H-CHF may change the at least one first charging rate from one value to a new value. As an example, the H-CHF may change the address of the H-CHF.

As an example, the applied scope of the charging policy information may be updated. As an example, the existing charging policy information may be applied to a service data flow, however, the updated charging policy information may be applied to a PDU session.

The H-CHF may send a message (e.g. charging policy information provision) to an H-PCF comprising the updated first charging policy information, where the H-PCF may have already established a charging control session with the H-CHF. The message sent to the H-PCF may comprise at least one of: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the DNN, the S-NSSAI(s) and/or network slice instance identifier(s), or the PDU Session ID. In response to the message received from the H-CHF, the H-PCF may send to the H-CHF a response message (e.g. charging policy information provision ack). The H-PCF may make policy decision based on the received updated first charging policy information and may determine/update one or more PCC rules, wherein the one or more PCC rules may comprise one or more charging control rules.

As an example, the H-PCF may determine keeping the existing PCC rules and/or charging control rules unchanged. As an example, the H-PCF may update one or more PCC rules comprising one or more charging control rules. The one or more updated PCC rules may comprise at least one of: one or more updated charging control rules; at least one updated policy control rule comprising at least one updated QoS control rule and/or at least one updated gating control rule; at least one updated usage monitoring control rule; at least one updated application detection and control rule; at least one updated traffic steering control rule; or at least one updated service data flow detection information (e.g. service data flow template). As an example, the H-PCF may update at least one of the following information elements in the one or more updated charging control rules: an information element indicating a second charging method/charging type, wherein the second charging method/charging type may comprise at least one of: online charging, offline charging, or converged charging; an information element indicating at least one second charging level (e.g. PDU session charging; flow based charging; QoS flow based charging; service level charging; or subsystem level charging); an information element indicating at least one second charging rate; an information element indicating at least one second identifier or address of a H-CHF.

The H-PCF may send to the H-SMF a message (e.g. Policy Update Notify) comprising the one or more updated PCC rules and/or the one or more updated charging control rules. In response to the message received from the H-PCF, the H-SMF may send to the H-PCF a response message (Policy Update Notify Response).

The H-SMF may send to a V-SMF a message (e.g. PDU session update request) comprising the one or more updated PCC rules and/or the one or more updated charging control rules.

In response to the message received from the H-SMF, as an example, there may be interactions between V-SMF, AMF, (R)AN and UE for the PDU session update procedures.

The V-SMF may install the one or more updated PCC rules and/or the one or more updated changing control rules and other information received from the H-SMF.

As an example, the V-SMF and/or V-UPF may enforce the one or more updated charging control rules by performing at least one of actions. In an example action, receiving by the V-SMF, one or more updated charging control rule from a H-SMF. In an example action, determining by the V-SMF, at least one user plane rules based on the one or more updated charging control rule received from the H-SMF, and the at least one user plane rules may comprise at least one of: at least one packet detection rule; at least one forwarding action rule; at least one QoS enforcement rule; or at least one usage reporting rule; sending, by the V-SMF to the V-UPF the at least one user plane rules; enforcing, by the V-UPF, the at least one user plane rules; reporting, by the V-UPF, usage report information to the V-SMF. In an example action, sending by the V-SMF, the usage report information to the V-CHF. As an example, the usage report information may comprise network resources usage in terms of traffic data volume, duration (i.e. time) applied to at least one of: a wireless device, a PDU session, a service data flow, an application, a network slice, or a data network.

The V-SMF may enforce the one or more updated changing control rules by comprising one or more actions. In an example action, the V-SMF may construct a message (e.g. charging data request [update]) based on the one or more updated charging control rules and send the constructed message to the V-CHF to modify the charging session. The message sent to the V-CHF may comprise updated changing control rules information. As an example, the message sent to the V-CHF may comprise at least one of: an information element indicating an updated charging method/charging type, wherein the charging method/charging type may comprise at least one of: online charging, offline charging, or converged charging; an information element indicating at least one updated charging level (e.g. PDU session charging; flow based charging; QoS flow based charging; service level charging; or subsystem level charging); an information element indicating at least one updated charging rate; an information element indicating a PDU session identified by a PDU session identifier; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; an information element indicating a network slice identified by a S-NSSAI and/or a network slice instance identifier.

In response to the message received from the V-SMF, the V-CHF may verify the information received and determine whether to accept the charging session request. As an example, the V-CHF may accept the request, and may send to the V-SMF a response message (e.g. charging data response). The response message may comprise at least one of: an information element indicating a success cause value to indicate the session updating is success; an information element indicating an accepted charging method/charging type, wherein the accepted charging method/charging type may comprise at least one of: online charging, offline charging, or converged charging; as an example, the accepted charging method/charging type may be the same as the updated charging method/charging type; an information element indicating an accepted charging level, as an example, the accepted charging level may be the same as the updated charging level; an information element indicating at least one charging rate (e.g. rating group); an information element indicating at least one granted unit (e.g. granted volume and/or granted time for online charging or converged charging); an information element indicating final unit action (e.g. redirect the traffic to a web portal when the final granted unit has been consumed by the wireless device); an information element indicating a PDU session identified by a PDU session identifier; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; an information element indicating a network slice identified by a S-NSSAI and/or a network slice instance identifier.

The V-SMF may send to the H-SMF a response message (e.g. PDU session update response) indicating that the one or more updated PCC rules and/or the one or more updated charging control rules may have been enforced successfully.

As an example, the H-SMF and/or H-UPF may enforce the one or more updated charging control rules by performing at least one of actions. In an example action, receiving by the H-SMF, one or more updated charging control rule from a H-PCF. In an example action, determining by the H-SMF, at least one user plane rules based on the one or more updated charging control rule received from the H-PCF, and the at least one user plane rules may comprise at least one of: at least one packet detection rule; at least one forwarding action rule; at least one QoS enforcement rule; or at least one usage reporting rule; sending, by the H-SMF to the H-UPF the at least one user plane rules; enforcing, by the H-UPF, the at least one user plane rules; reporting, by the H-UPF, usage report information to the H-SMF. In an example action, sending by the H-SMF, the usage report information to the H-CHF. As an example, the usage report information may comprise network resources usage in terms of traffic data volume, duration (i.e. time) applied to at least one of: a wireless device, a PDU session, a service data flow, an application, a network slice, or a data network.

The H-SMF may enforce the one or more updated changing control rules by comprising one or more actions. In an example action, the H-SMF may construct a message (e.g. charging data request [update]) based on the one or more updated charging control rules and send the constructed message to the H-CHF to modify the charging session. The message sent to the H-CHF may comprise updated changing control rules information. As an example, the message sent to the H-CHF may comprise at least one of: an information element indicating an updated charging method/charging type, wherein the charging method/charging type may comprise at least one of: online charging, offline charging, or converged charging; an information element indicating at least one updated charging level (e.g. PDU session charging; flow based charging; QoS flow based charging; service level charging; or subsystem level charging); an information element indicating at least one updated charging rate; an information element indicating a PDU session identified by a PDU session identifier; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; an information element indicating a network slice identified by a S-NSSAI and/or a network slice instance identifier.

Figure 23:
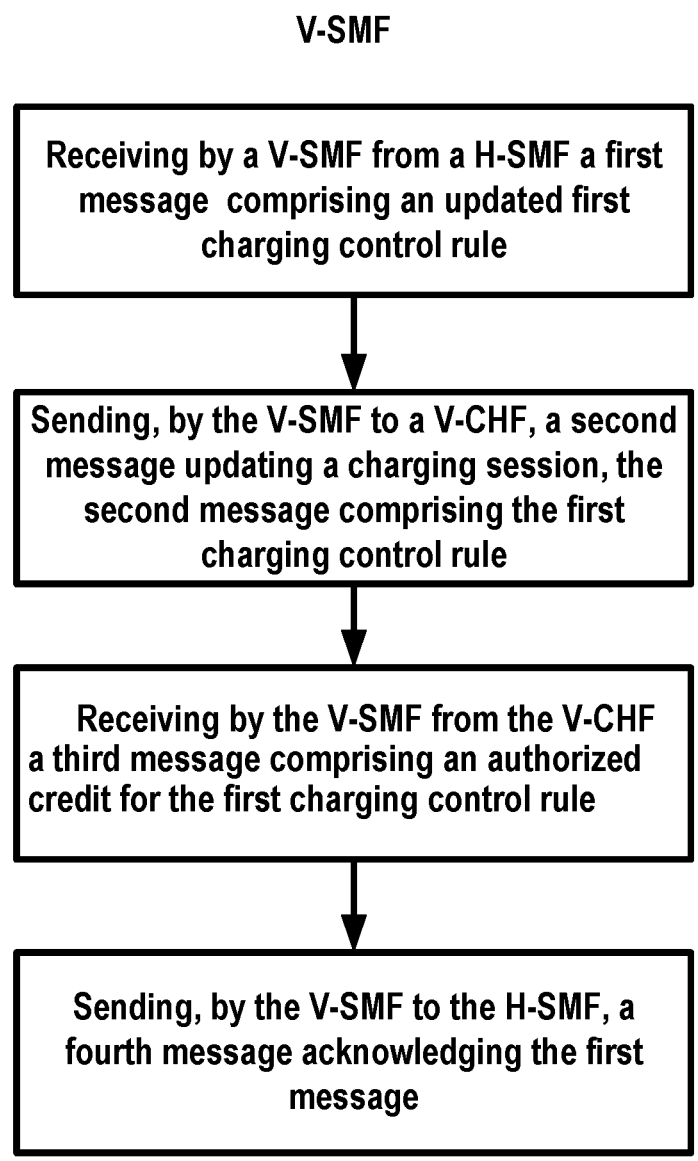
FIG. 23 is an example diagram depicting the procedures of V-SMF as per an aspect of an embodiment of the present disclosure.

In response to the message received from the H-SMF, the H-CHF may verify the information received and determine whether to accept the charging session request. As an example, the V-CHF may accept the request, and may send to the V-SMF a response message (e.g. charging data response). The response message may comprise at least one of: an information element indicating a success cause value to indicate the session updating is success; an information element indicating an accepted charging method/charging type, wherein the accepted charging method/charging type may comprise at least one of: online charging, offline charging, or converged charging; as an example, the accepted charging method/charging type may be the same as the updated charging method/charging type; an information element indicating an accepted charging level, as an example, the accepted charging level may be the same as the updated charging level; an information element indicating at least one charging rate (e.g. rating group); an information element indicating at least one granted unit (e.g. granted volume and/or granted time for online charging or converged charging); an information element indicating final unit action (e.g. redirect the traffic to a web portal when the final granted unit has been consumed by the wireless device); an information element indicating a PDU session identified by a PDU session identifier; an information element indicating at least one service data flow identified by at least one service data flow filter; an information element indicating an application identified by an application identifier; an information element indicating a wireless device identified by at least one user identity (e.g. SUPI, PEI, and/or GPSI); an information element indicating a data network identified by a DNN; an information element indicating a network slice identified by a S-NSSAI and/or a network slice instance identifier. FIG. 23 is an example diagram depicting the procedures of V-SMF as per an aspect of an embodiment of the present disclosure.

In an example, a home session management function may receive from a visited session management function, a first message requesting creation of a packet data unit (PDU) session of a wireless device, the first message may comprise first charging policy information. In an example, the home session management function may send to a home charging function, a second message requesting establishment of a charging session for the PDU session, the second message may comprise the first charging policy information. In an example, the home session management function may receive from the home charging function, a third message comprising a second charging policy information, wherein the second charging policy information may be determined by the home charging function based on the first charging policy information. In an example, the home session management function may determine based on the second charging policy information, a third charging policy information for the PDU session; wherein the third charging policy information may comprise: a charging method; a charging level; and/or a charging rate. In an example, the home session management function may send to the visited session management function, a fourth message comprising the third charging policy information.

In an example, the visited session management function may determine based on the third charging policy information, a fourth charging policy information for the PDU session; wherein the fourth charging policy information may comprise at least one of: a charging method; a charging level; or a charging rate. In an example, the home session management function may send to a home policy control function, a fifth message requesting a charging control rule for the PDU session, the fifth message may comprise the first charging policy information. In an example, the home session management function may receive from the home policy control function, a sixth message comprising at least one charging control rule. In an example, the at least one charging control rule may comprise at least one of: a charging policy; a quality of service policy; or a gating policy.

In an example, the home policy control function may send to the home charging function, a seventh message comprising the first charging policy information. In an example, the home policy control function may receive from the home charging function, an eighth message comprising the second charging policy information. In an example, the home policy control function may determine based on the second charging policy information, at least one charging control rule for the PDU session; wherein the at least one charging control rule may comprise at least one of: an information element indicating a charging method applicable for the PDU session; an information element indicating a charging level applicable for the PDU session; an information element indicating a charging rate applicable for the PDU session; or an information element indicating an address of the charging function. In an example, the home charging function may determine the second charging policy information based on the first charging policy information.

In an example, the visited session management function may receive from a visited access and mobility management function, a fifth message requesting creation of the PDU session. In an example, the visited access and mobility management function may receive from a wireless device, an eighth message requesting creation of the PDU session. In an example, the visited session management function may send to a visited charging function, a sixth message requesting creation of a charging session. In an example, the visited session management function may receive from the visited charging function, a seventh message comprising a charging policy information. In an example, the visited session management function may determine based on the charging policy information, the first charging policy information.

In an example, the first charging policy information, the second charging policy information, and/or the third charging policy information may comprise at least one of: a charging method; a charging level; or a charging rate. In an example, the charging method may comprise at least one of: an information element indicating that an online charging is applicable for the PDU session; an information element indicating that an offline charging is applicable for the PDU session; or an information element indicating that a converged charging is applicable for the PDU session. In an example, the charging level may comprise at least one of: an information element indicating a PDU session charging; an information element indicating a flow based charging; an information element indicating a QoS flow based charging; an information element indicating a service level charging; or an information element indicating a subsystem level charging.

In an example, the home session management function may send to a home user plane function, a fifth message requesting to establish or modify a N4 session, the fifth message may comprise at least one charging control rule for the PDU session. In an example, the home session management function may receive from the home user plane function, a sixth message in response to the fifth message. In an example, the visited session management function may send to a visited user plane function, a fifth message requesting to establish or modify a N4 session, the fifth message comprising at least one charging control rule for the PDU session. In an example, the visited session management function may receive from the visited user plane function, a sixth message in response to the fifth message. In an example, the first message may comprise at least one of: an identifier of the wireless device; or an identifier of the packet data unit session. In an example, the home charging function may determine an authorized credit for the PDU session based on the first charging policy information. In an example, the home charging function may determine an authorized credit for the PDU session based on the first charging policy information. In an example, the authorized credit comprises at least one of: a time quota; or a volume quota.

In an example, the home session management function may receive from the visited session management function, a PDU session update request message. In an example, the home session management function may send to the visited session management function, a PDU session update response message. In an example, the visited session management function may send to a visited charging function, a first message requesting creation of a charging session for a packet data unit (PDU) session. In an example, the visited session management function may receive from the visited charging function, a second message comprising first charging policy information. In an example, the visited session management function may send to a home session management function, a third message requesting creation of the PDU session, the third message may comprise the first charging policy information. In an example, the visited session management function may receive from the home session management function, a fourth message comprising a second charging policy information, wherein the second charging policy information may be determined by the home session management function based on the first charging policy information. In an example, the visited session management function may determine based on the second charging policy information, a third charging policy information, wherein the third charging policy information may comprise: a charging method; a charging level; and/or a charging rate. In an example, the visited session management function may send to the visited charging function, a fifth message comprising the third charging policy information.

In an example, a visited charging function may receive from a visited session management function, a first message requesting charging policy information for a packet data unit (PDU) session of a wireless device, the first message may comprise PDU session information. In an example, the visited charging function may select based on the PDU session information, a home charging function. In an example, the visited charging function may send to the home charging function, a second message requesting charging policy information for the PDU session, the second message may comprise a first charging policy information determined by the visited charging function. In an example, the visited charging function may receive from the home charging function, a third message comprising a second charging policy information, wherein the second charging policy information may be determined by the home charging function based on the first charging policy information. In an example, the visited charging function may determine based on the second charging policy information, a third charging policy information for the PDU session, wherein the third charging policy information may comprise: a charging method; a charging level; and/or a charging rate. In an example, the visited charging function may send to the visited session management function, a fourth message comprising the third charging policy information.

In an example, a visited policy control function may receive from a visited session management function, a first message requesting charging policy information for a packet data unit (PDU) session of a wireless device, the first message may comprise PDU session information. In an example, the visited policy control function may send to a visited charging function a second message, the second message may comprise the PDU session information. In an example, the visited policy control function may receive from the visited charging function, a third message comprising a first charging policy information; wherein the first charging policy information may be determined by the visited charging function based on the PDU session information. In an example, the visited policy control function may select a home policy control function based on the PDU session information. In an example, the visited policy control function may send to the home policy control function, a fourth message comprising the first charging policy information. In an example, the visited policy control function may receive from the home policy control function, a fifth message comprising at least one first charging control rule, wherein the first charging control rule may be determined by the home policy control function based on the first charging policy information. In an example, the visited policy control function may determine based on the at least one first charging control rule, at least one second charging control rule for the PDU session, wherein the at least one second charging control rule may comprise: a charging method; a charging level; and/or a charging rate. In an example, the visited policy control function may send to the visited session management function, a sixth message comprising the at least one second charging control rule.

In an example, a visited session management function may receive from a home session management function, a first message comprising an updated first charging control rule for a packet data unit (PDU) session; wherein the first charging control rule may comprise: a charging method; a charging level; and/or a charging rate. In an example, the visited session management function may send to a visited charging function, a second message updating a charging session for the PDU session, the second message may comprise the first charging control rule. In an example, the visited session management function may receive from the visited charging function, a third message comprising an authorized credit for the first charging control rule. In an example, the visited session management function may send to the home session management function, a fourth message acknowledging the first message.

In an example, a first session management function may receive from a second session management function, a first message requesting creation of a packet data unit (PDU) session of a wireless device, the first message may comprise a first charging policy information. In an example, the first session management function may send to a home charging function, a second message requesting establishment of a charging session for the PDU session, the second message may comprise the first charging policy information. In an example, the first session management function may receive from the home charging function, a third message comprising a second charging policy information, wherein the second charging policy information may be determined by the home charging function based on the first charging policy information. In an example, the first session management function may determine based on the second charging policy information, a third charging policy information for the PDU session; wherein the third charging policy information may comprise: a charging method; a charging level; and a charging rate. In an example, the first session management function may send to the second session management function, a fourth message comprising the third charging policy information.

According to various embodiments, one or more devices such as, for example, a wireless device, off-network wireless device, a base station, a core network device, and/or the like, may be employed in a system. One or more of the devices may be configured to perform particular operations or actions by virtue of having software, firmware, hardware, or a combination of them installed on the one or more of the devices, that in operation causes or cause the one or more devices to perform the actions. One or more computer programs can be configured to perform particular operations or actions by virtue of including instructions that, when executed by data processing apparatus, cause the apparatus to perform the actions. Embodiments of example actions are illustrated in the accompanying figures and specification. Features from various embodiments may be combined to create yet further embodiments.

Figure 25:
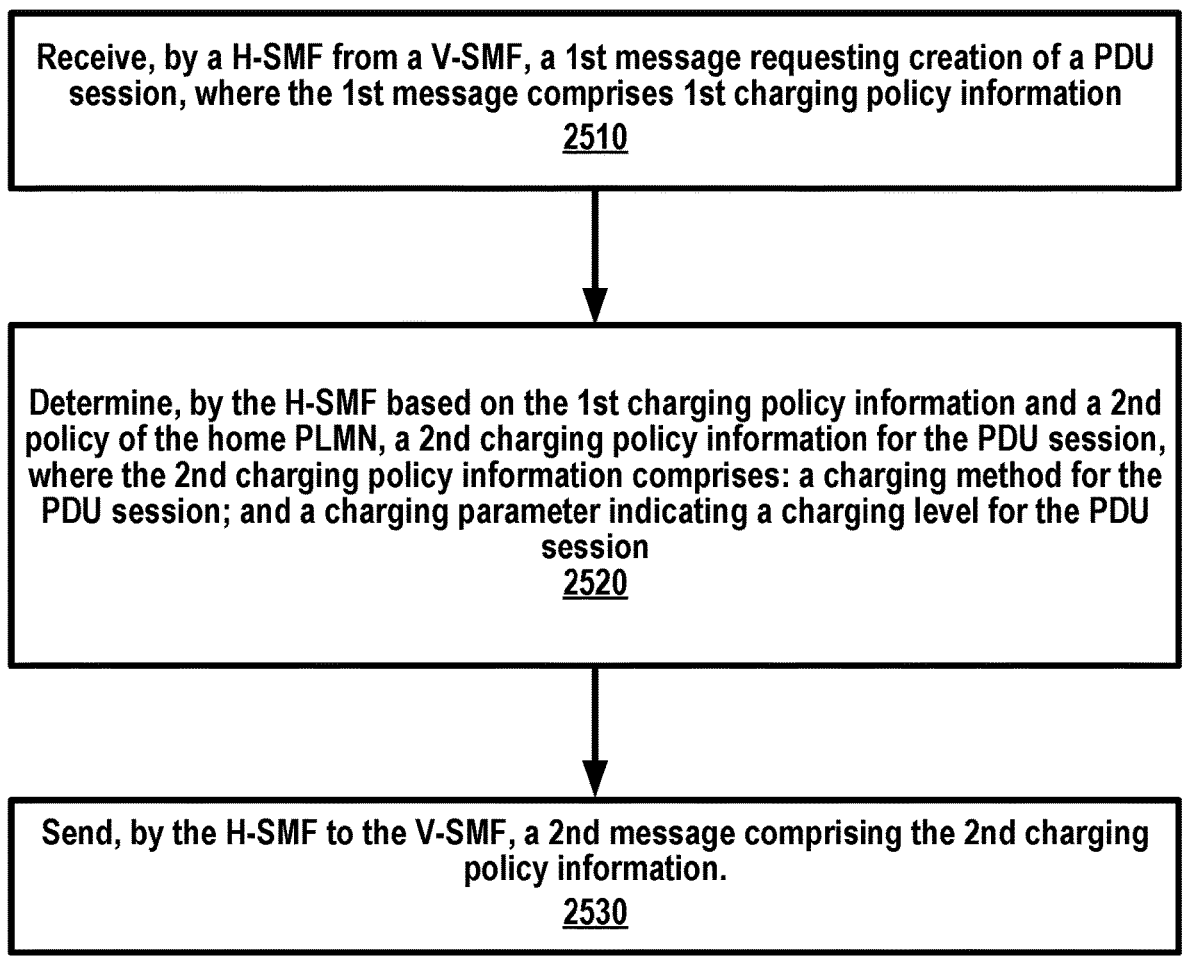
FIG. 25 is a flow diagram as per an aspect of an example embodiment of the present disclosure.

FIG. 25 is a flow diagram of an aspect of an embodiment of the present disclosure. At 2510, a home session management function (SMF) of a home public land mobile network (PLMN) may receive a first message from a visited SMF of a visited PLMN. The first message may request creation of a packet data unit (PDU) session of a wireless device. The first message may comprise first charging policy information determined based on a first policy of the visited PLMN. At 2520, based on the first charging policy information and a second policy of the home PLMN, the home SMF may determine a second charging policy information for the PDU session. The second charging policy information may comprise a charging method for the PDU session. The second charging policy information may comprise a charging parameter indicating a charging level for the PDU session. At 2530, the home SMF may send a second message to the visited SMF. The second message may comprise the second charging policy information.

According to an example embodiment, the second charging policy information may comprise a charging rate. According to an example embodiment, based on the second charging policy information, the visited SMF may determine a third charging policy information for the PDU session. The third charging policy information may comprise charging method. The third charging policy information may comprise a charging level. The third charging policy information may comprise a charging rate.

According to an example embodiment, the home SMF may send a charging data request (CDR) message to a home charging function (CHF). The CDR message may request establishment of a charging session for the PDU session. The CDR message may comprise the first charging policy information. According to an example embodiment, the home SMF may receive a charging data response message from the home CHF. The charging data response message may comprise a fourth charging policy information. The fourth charging policy information may be determined by the home CHF based on the first charging policy information. According to an example embodiment, the home SMF may determine the second charging policy information based on the fourth charging policy information.

According to an example embodiment, the home charging function may determine an authorized credit for the PDU session based on the first charging policy information. The authorized credit may comprise a time quota. The authorized credit may comprise a volume quota. According to an example embodiment, the home SMF may send a policy request message to a home policy control function (PCF). The policy request message may request a charging control rule for the PDU session. The policy request message may comprise the first charging policy information. According to an example embodiment, the home SMF may receive a policy response message from the home PCF. The policy response message may comprise a policy and charging control rule. According to an example embodiment, the policy and charging control rule may comprise a charging policy. According to an example embodiment, the policy and charging control rule may comprise a quality of service policy. According to an example embodiment, the policy and charging control rule may comprise a gating policy.

According to an example embodiment, the home PCF may send to a home CHF a charging policy request message. The charging policy request message may comprise the first charging policy information. According to an example embodiment, the home CHF may determine a fifth charging policy information based on the first charging policy information. According to an example embodiment, the home PCF may receive from the home CHF, a charging policy response message comprising the fifth charging policy information.

According to an example embodiment, based on the fifth charging policy information, the home PCF may determine at least one charging control rule for the PDU session. The at least one charging control rule may comprise an information element indicating a charging method applicable for the PDU session. The at least one charging control rule may comprise an information element indicating a charging level applicable for the PDU session. The at least one charging control rule may comprise an information element indicating a charging rate applicable for the PDU session. The at least one charging control rule may comprise an information element indicating an address of the home charging function.

According to an example embodiment, the visited SMF may receive a PDU session create request message from a visited access and mobility management function (AMF). The PDU session create request message may request creation of the PDU session. According to an example embodiment, the visited AMF may receive from a wireless device, an PDU session establishment request message requesting establishment of the PDU session. According to an example embodiment, the visited SMF may send to a visited charging function, a charging policy request message requesting creation of a charging session. According to an example embodiment, the visited SMF may receive from the visited charging function, a charging policy response message comprising a visited charging policy information. According to an example embodiment, based on the visited charging policy information, the visited SMF may determine the first charging policy information.

According to an example embodiment, the first charging policy information may comprise a charging method. According to an example embodiment, the first charging policy information may comprise a charging level. According to an example embodiment, the first charging policy information may comprise a charging rate. According to an example embodiment, the charging method may comprise an information element indicating that an online charging for the PDU session. According to an example embodiment, the charging method may comprise an information element indicating that an offline charging for the PDU session. According to an example embodiment, the charging method may comprise an information element indicating that a converged charging for the PDU session. According to an example embodiment, charging level may comprise an information element indicating a flow based charging. According to an example embodiment, charging level may comprise an information element indicating a QoS flow based charging. According to an example embodiment, charging level may comprise an information element indicating a service level charging. According to an example embodiment, charging level may comprise an information element indicating a subsystem level charging.

According to an example embodiment, the home SMF may send to a home user plane function (UPF) an N4 request message requesting to establish or modify an N4 session. The N4 request message may comprise at least one charging control rule for the PDU session. According to an example embodiment, the home SMF may receive from the home UPF an N4 response message in response to the N4 request message. According to an example embodiment, the visited SMF may send an N4 request message to a visited user plane function (UPF). The N4 request message may request to establish or modify an N4 session. The N4 request message may comprise at least one charging control rule for the PDU session. According to an example embodiment, the visited SMF may receive from the visited UPF a N4 response message in response to the N4 request message. According to an example embodiment, the first message may comprise an identifier of the wireless device. According to an example embodiment, the first message may comprise an identifier of the PDU session.

Figure 26:
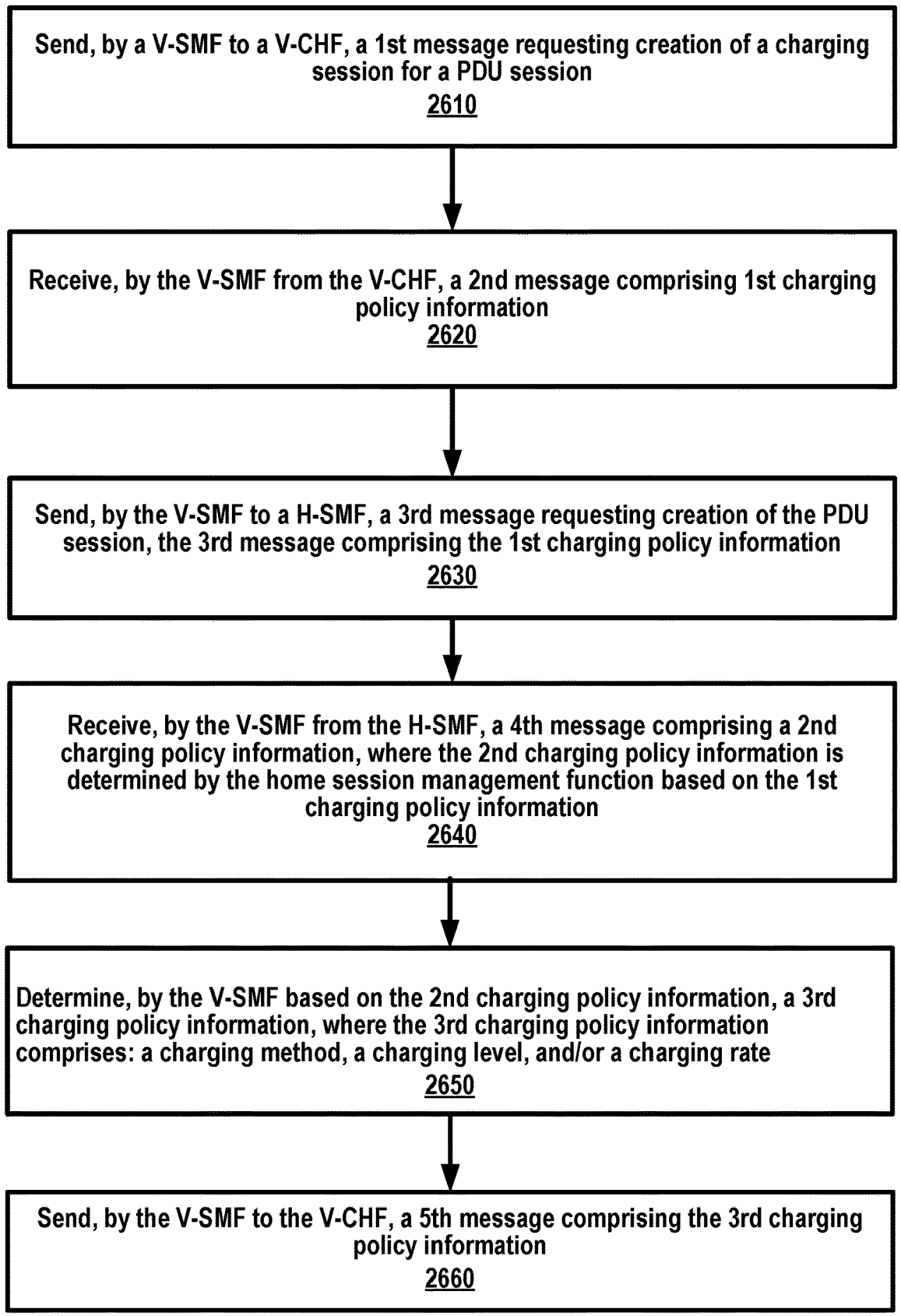
FIG. 26 is a flow diagram as per an aspect of an example embodiment of the present disclosure.

FIG. 26 is a flow diagram of an aspect of an embodiment of the present disclosure. At 2610, a visited session management function may send a first message to a visited charging function. The first message may request creation of a charging session for a packet data unit (PDU) session. At 2620, the visited session management function may receive from the visited charging function a second message. The second message may comprise first charging policy information. At 2630, the visited session management function may send to a home session management function a third message requesting creation of the PDU session. The third message may comprise the first charging policy information. At 2640, the visited session management function may receive from the home session management function a fourth message. The fourth message may comprise a second charging policy information. The second charging policy information may be determined by the home session management function based on the first charging policy information. At 2650, based on the second charging policy information, the visited session management function may determine a third charging policy information. The third charging policy information may comprise a charging method. The third charging policy information may comprise a charging level. The third charging policy information may comprise a charging rate. At 2660, the visited session management function may send to the visited charging function a fifth message. The fifth message may comprise the third charging policy information.

FIG. 27 is a flow diagram of an aspect of an embodiment of the present disclosure. At 2710, a visited charging function may receive a first message from a visited session management function. The first message may request charging policy information for a packet data unit (PDU) session of a wireless device. The first message may comprise PDU session information. At 2720, based on the PDU session information, the visited charging function may select a home charging function. At 2730, the visited charging function may send to the home charging function a second message requesting charging policy information for the PDU session. The second message may comprise a first charging policy information determined by the visited charging function. At 2740, the visited charging function may receive from the home charging function a third message. The third message may comprise a second charging policy information. The second charging policy information may be determined by the home charging function based on the first charging policy information. At 2750, based on the second charging policy information, the visited charging function may determine a third charging policy information for the PDU session. The third charging policy information may comprise a charging method. The third charging policy information may comprise a charging level. The third charging policy information may comprise a charging rate. At 2760, the visited charging function may send to the visited session management function a fourth message. The fourth message may comprise the third charging policy information.

FIG. 28 is a flow diagram of an aspect of an embodiment of the present disclosure. At 2810, a visited policy control function may receive a first message from a visited session management function. The first message may request charging policy information for a packet data unit (PDU) session of a wireless device. The first message may comprise PDU session information. At 2820, the visited policy control function may send to a visited charging function a second message. The second message may comprise the PDU session information. At 2830, the visited policy control function may receive from the visited charging function a third message. The third message may comprise a first charging policy information. The first charging policy information may be determined by the visited charging function based on the PDU session information. At 2840, the visited policy control function may select a home policy control function based on the PDU session information. The visited policy control function may send to the home policy control function a fourth message comprising the first charging policy information. At 2850, the visited policy control function may receive a fifth message from the home policy control function. The fifth message may comprise at least one first charging control rule. The first charging control rule may be determined by the home policy control function based on the first charging policy information. At 2860, based on the at least one first charging control rule, the visited policy control function may determine at least one second charging control rule for the PDU session. The at least one second charging control rule may comprise a charging method. The at least one second charging control rule may comprise a charging level. The at least one second charging control rule may comprise a charging rate. At 2870, the visited policy control function may send to the visited session management function a sixth message. The sixth message may comprise the at least one second charging control rule.

FIG. 29 is a flow diagram of an aspect of an embodiment of the present disclosure. At 2910, a visited session management function may receive a first message from a home session management function. The first message may comprise an updated charging control rule for a packet data unit (PDU) session. The updated charging control rule may comprise a charging method. The updated charging control rule may comprise a charging level. The updated charging control rule may comprise a charging rate. At 2920, the visited session management function may send to a visited charging function a second message updating a charging session for the PDU session, the second message may comprise the updated charging control rule. At 2930, the visited session management function may receive a third message from the visited charging function. The third message may comprise an authorized credit for the updated charging control rule. At 2940, the visited session management function may send to the home session management function a fourth message acknowledging the first message.

FIG. 30 is a flow diagram of an aspect of an embodiment of the present disclosure. At 3010, a first session management function may receive a first message from a second session management function. The first message may request creation of a packet data unit (PDU) session of a wireless device. The first message may comprise a first charging policy information. At 3020, the first session management function may send a second message to a home charging function. The second message may request establishment of a charging session for the PDU session. The second message may comprise the first charging policy information. At 3030, the first session management function may receive a third message from the home charging function. The third message may comprise a second charging policy information. The second charging policy information may be determined by the home charging function based on the first charging policy information. At 3040, based on the second charging policy information, the first session management function may determine a third charging policy information for the PDU session. The third charging policy information may comprise a charging method. The third charging policy information may comprise a charging method a charging level. The third charging policy information may comprise a charging method a charging rate. At 3050, the first session management function may send a fourth message to the second session management function. The fourth message may comprise the third charging policy information.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various Examples. If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}.

In this specification, various Examples are disclosed. Limitations, features, and/or elements from the disclosed example Examples may be combined to create further Examples within the scope of the disclosure.

In this specification, various Examples are disclosed. Limitations, features, and/or elements from the disclosed example Examples may be combined to create further Examples within the scope of the disclosure.

In this specification, parameters (Information elements: IEs) may comprise one or more objects, and one of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example, when one or more messages comprise a plurality of parameters, it implies that a parameter in the plurality of parameters is in at least one of the one or more messages, but does not have to be in one of the one or more messages.

Many of the elements described in the disclosed Examples may be implemented as modules. A module is defined here as an isolatable element that performs a defined function and has a defined interface to other elements. The modules described in this disclosure may be implemented in hardware, software in combination with hardware, firmware, wetware (e.g. hardware with a biological element) or a combination thereof, some of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various Examples have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative Examples. Thus, the present Examples should not be limited by any of the above described exemplary Examples. In particular, it should be noted that, for example purposes, the above explanation has focused on the example(s) using 5G AN. However, one skilled in the art will recognize that Examples of the invention may be implemented in a system comprising one or more legacy systems or LTE. The disclosed methods and systems may be implemented in wireless or wireline systems. The features of various Examples presented in this invention may be combined. One or many features (method or system) of one Example may be implemented in other Examples. A limited number of example combinations are shown to indicate to one skilled in the art the possibility of features that may be combined in various Examples to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a home session management function (SMF) of a home public land mobile network (PLMN) from a visited SMF of a visited PLMN, a request for creation of a packet data unit (PDU) session of a wireless device, the request comprising first charging policy information corresponding to a first policy of the visited PLMN;
   sending, by the home SMF to a home policy control function (PCF), a charging policy request message comprising the first charging policy information;
   receiving, by the home SMF from the home PCF, a charging policy response message comprising second charging policy information determined based on the first charging policy information; and
   sending, by the home SMF to the visited SMF, the second charging policy information, wherein the second charging policy information comprises:
   a charging method for the PDU session; and
   a charging parameter indicating a charging level for the PDU session.

2. The method of claim 1, wherein the second charging policy information further comprises a charging rate.

3. The method of claim 1, further comprising:
   sending, by the home SMF to a home charging function (CHF), a charging data request (CDR) message requesting establishment of a charging session for the PDU session, the CDR message comprising the first charging policy information;
   receiving, by the home SMF from the home CHF, a charging data response message comprising a fourth charging policy information, wherein the fourth charging policy information is determined by the home CHF based on the first charging policy information; and determining, by the home SMF, the second charging policy information based on the fourth charging policy information.

4. The method of claim 1, wherein the charging policy request message further comprises a charging control rule indicating at least one of:
a charging policy;
a quality of service policy; or
a gating policy.

5. The method of claim 1, wherein the first charging policy information comprises at least one of:
a first charging method;
a first charging level; or
a first charging rate.

6. The method of claim 1, wherein the charging method comprises at least one of:
an information element indicating that an online charging for the PDU session;
an information element indicating that an offline charging for the PDU session; or
an information element indicating that a converged charging for the PDU session.

7. The method of claim 1, wherein the charging level comprises at least one of:
an information element indicating a PDU session charging;
an information element indicating a flow based charging;
an information element indicating a QoS flow based charging;
an information element indicating a service level charging; or
an information element indicating a subsystem level charging.

8. The method of claim 1, further comprising:
sending, by the home SMF to a home user plane function (UPF), a N4 request message requesting to establish or modify a N4 session, the N4 request message comprising at least one charging control rule for the PDU session; and
receiving, by the home SMF from the home UPF, a N4 response message in response to the N4 request message.

9. The method of claim 1, wherein the request comprises at least one of:
an identifier of the wireless device; or
an identifier of the PDU session.

10. An apparatus comprising:
one or more processors; and
memory storing instructions that, when executed by the one or more processors, cause a home session management function (SMF) of a home public land mobile network (PLMN) to:
receive, from a visited SMF of a visited PLMN from a visited SMF of a visited PLMN, a request for creation of a packet data unit (PDU) session of a wireless device, the request comprising first charging policy information corresponding to a first policy of the visited PLMN; and
send, to a home policy control function (PCF), a charging policy request message comprising the first charging policy information;
receive, from the home PCF, a charging policy response message comprising second charging policy information determined based on the first charging policy information; and send, to the visited SMF, the second charging policy information, wherein the second charging policy information comprises:
a charging method for the PDU session; and
a charging parameter indicating a charging level for the PDU session.

11. The apparatus of claim 10, wherein the second charging policy information further comprises a charging rate.

12. The apparatus of claim 10, wherein the instructions, when executed by the one or more processors, further cause the home SMF to:
send, to a home charging function (CHF), a charging data request (CDR) message requesting establishment of a charging session for the PDU session, the CDR message comprising the first charging policy information;
receive, from the home CHF, a charging data response message comprising a fourth charging policy information, wherein the fourth charging policy information is determined by the home CHF based on the first charging policy information; and
determine the second charging policy information based on the fourth charging policy information.

13. The apparatus of claim 10, wherein the charging policy request message further comprises a charging control rule indicating at least one of:
a charging policy;
a quality of service policy; or
a gating policy.

14. The apparatus of claim 10, wherein the first charging policy information comprises at least one of:
a first charging method;
a first charging level; or
a first charging rate.

15. The apparatus of claim 10, wherein the charging method comprises at least one of:
an information element indicating that an online charging for the PDU session;
an information element indicating that an offline charging for the PDU session; or
an information element indicating that a converged charging for the PDU session.

16. The apparatus of claim 10, wherein the charging level comprises at least one of:
an information element indicating a PDU session charging;
an information element indicating a flow based charging;
an information element indicating a QoS flow based charging;
an information element indicating a service level charging; or
an information element indicating a subsystem level charging.

17. The apparatus of claim 10, wherein the instructions, when executed by the one or more processors, further cause the home SMF to:
send, to a home user plane function (UPF), a N4 request message requesting to establish or modify a N4 session, the N4 request message comprising at least one charging control rule for the PDU session; and
receive, from the home UPF, a N4 response message in response to the N4 request message.

18. A system comprising:
a visited session management function (SMF) of a visited public land mobile network (PLMN); and a home SMF of a home PLMN comprising:
one or more processors; and
memory storing instructions that, when executed by the one or more processors, cause the home SMF to:
receive, from a visited SMF of a visited PLMN from a visited SMF of a visited PLMN, a request for creation of a packet data unit (PDU) session of a wireless device, the request comprising first charging policy information corresponding to a first policy of the visited PLMN; and
send, to a home policy control function (PCF), a charging policy request message comprising the first charging policy information;
receive, from the home PCF, a charging policy response message comprising second charging policy information determined based on the first charging policy information; and
send, to the visited SMF, the second charging policy information, wherein the second charging policy information comprises:
a charging method for the PDU session; and
a charging parameter indicating a charging level for the PDU session.

\* \* \* \* \*